US012556962B2

(12) United States Patent
Chai

(10) Patent No.: US 12,556,962 B2
(45) Date of Patent: Feb. 17, 2026

(54) DATA TRANSMISSION METHOD, TERMINAL, AND NETWORK NODE

(71) Applicants: China Mobile Communication Co., Ltd Research Institute, Beijing (CN); China Mobile Communications Group Co., Ltd., Beijing (CN)

(72) Inventor: Li Chai, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 448 days.

(21) Appl. No.: 18/040,713

(22) PCT Filed: Jul. 30, 2021

(86) PCT No.: PCT/CN2021/109866
§ 371 (c)(1),
(2) Date: Feb. 6, 2023

(87) PCT Pub. No.: WO2022/028338
PCT Pub. Date: Feb. 10, 2022

(65) Prior Publication Data
US 2024/0129785 A1 Apr. 18, 2024

(30) Foreign Application Priority Data
Aug. 6, 2020 (CN) .......................... 202010785400.3

(51) Int. Cl.
H04J 1/16 (2006.01)
H04W 28/02 (2009.01)
(Continued)

(52) U.S. Cl.
CPC ....... H04W 28/0268 (2013.01); H04W 28/08 (2013.01); H04W 36/02 (2013.01);
(Continued)

(58) Field of Classification Search
USPC ........................................... 370/235
See application file for complete search history.

(56) References Cited

U.S. PATENT DOCUMENTS

2005/0238051 A1 10/2005 Yi et al.
2011/0216688 A1 9/2011 Katori
(Continued)

FOREIGN PATENT DOCUMENTS

CN 101047881 A1 10/2007
CN 104756587 A 7/2015
(Continued)

OTHER PUBLICATIONS

OPPO, Left issues on RLC, PDCP and SDAP for NR-V2X, 3GPP TSG-RAN WG2 Meeting #107bis, R2-1912069, Oct. 14-Oct. 18, 2019, Chongqing, China.

Primary Examiner — Chuong T Ho
(74) Attorney, Agent, or Firm — Price Heneveld LLP

(57) ABSTRACT

The present disclosure relates to a data transmission method, a UE and a network node. The method performed by a network node includes: configuring a first and/or second radio channel for a first PDU session, or configuring a first and/or second radio channel for at least one same QoS flow of a first PDU session. The first radio channel is configured to transmit first data to a UE; the second radio channel is configured to transmit second data to the UE; the first and second radio channels are one of a unicast radio channel, a broadcast or multicast radio channel; the first data represents first data of the first PDU session or first data of at least one QoS flow of the first PDU session; the second data represents second data of the first PDU session or second data of at least one Qos flow of the first PDU session.

20 Claims, 19 Drawing Sheets

(51) Int. Cl.
  *H04W 28/08* (2023.01)
  *H04W 36/02* (2009.01)
  *H04W 72/30* (2023.01)
  *H04W 76/15* (2018.01)
  *H04W 80/02* (2009.01)
(52) U.S. Cl.
  CPC ........... *H04W 72/30* (2023.01); *H04W 76/15* (2018.02); *H04W 80/02* (2013.01)

(56) References Cited

U.S. PATENT DOCUMENTS

| | | |
|---|---|---|
| 2014/0177504 A1 | 6/2014 | Sayeed et al. |
| 2017/0013421 A1 | 1/2017 | Kodaypak et al. |
| 2018/0359802 A1 | 12/2018 | Cho et al. |
| 2019/0149857 A1* | 5/2019 | Lo ..................... H04N 21/8545 709/219 |
| 2020/0323024 A1 | 10/2020 | Huang et al. |
| 2021/0218817 A1* | 7/2021 | Lou ...................... H04W 76/12 |
| 2022/0038866 A1* | 2/2022 | Kadiri .................... H04L 1/1816 |
| 2022/0124550 A1* | 4/2022 | Yang ..................... H04W 76/12 |
| 2022/0150997 A1 | 5/2022 | Xu et al. |
| 2023/0042357 A1* | 2/2023 | Xu ............................. H04L 1/08 |
| 2023/0254666 A1* | 8/2023 | Qi ..................... H04W 28/0268 370/329 |
| 2023/0262734 A1* | 8/2023 | Qi ......................... H04L 12/189 455/414.1 |

FOREIGN PATENT DOCUMENTS

| | | |
|---|---|---|
| CN | 108353039 A | 7/2018 |
| CN | 109982266 A | 7/2019 |
| JP | 2021508968 A | 3/2021 |
| KR | 20200073118 A | 6/2020 |
| WO | 2010061483 A1 | 6/2010 |
| WO | 2017128704 A1 | 8/2017 |
| WO | 2019129212 A1 | 7/2019 |
| WO | 2020035795 A1 | 2/2020 |
| WO | 2021013127 A1 | 1/2021 |

* cited by examiner configuring a first radio channel and/or a second radio channel for a first PDU session, or configuring a first radio channel and/or a second radio channel for at least one same QoS flow of a first PDU session — 11

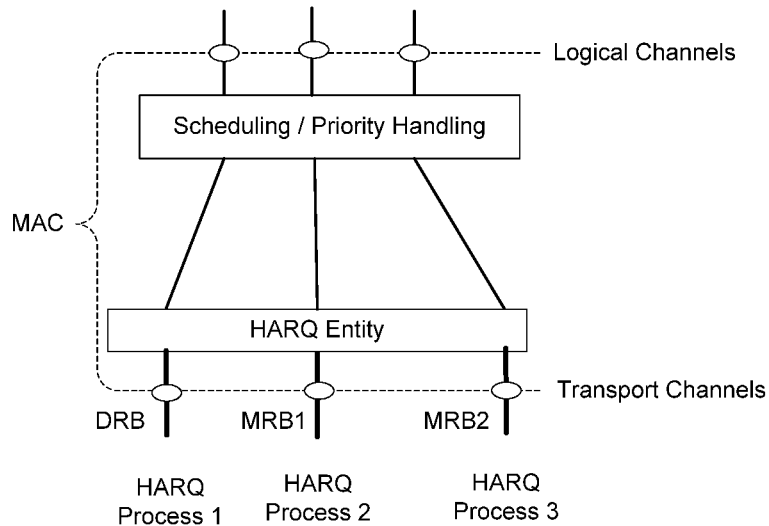

FIG. 14 receiving PDSCH transmitted by a network node, where the PDSCH includes a first transport block and a second transport block, the first transport block is used to transmit data of a unicast service, and the second transport block is used to transmit data of a broadcast or multicast service — 151

FIG. 15 transmitting data of a unicast service to a UE through a first BWP, and transmitting data of a broadcast or multicast service to the UE through a second BWP. — 161

FIG. 16 receiving data of a unicast service transmitted by a network node through a first BWP, and data of a broadcast or multicast service transmitted through a second BWP — 191
FIG. 19
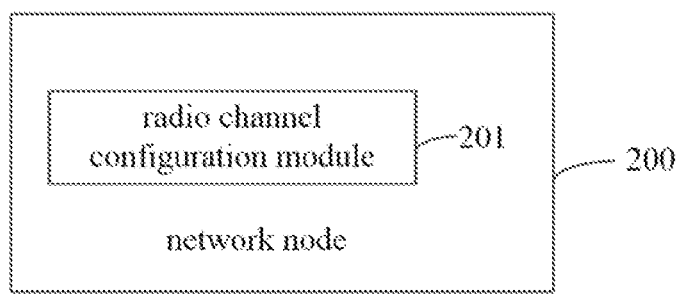
FIG. 20
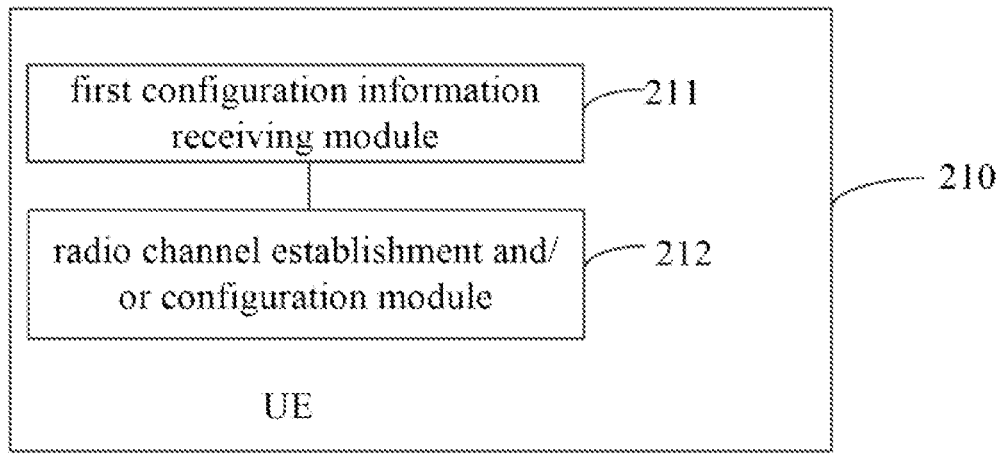
FIG. 21
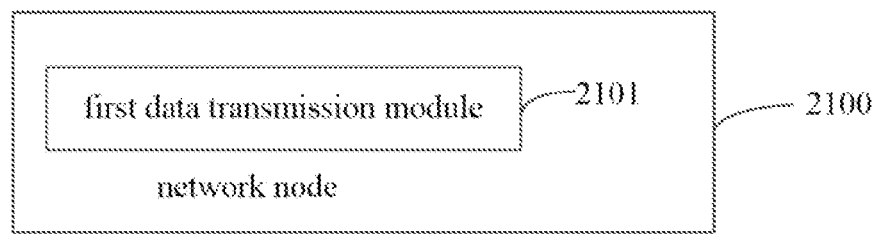
FIG. 21a

DATA TRANSMISSION METHOD, TERMINAL, AND NETWORK NODE

CROSS-REFERENCE TO RELATED APPLICATION

This application is the U.S. national phase of PCT Application PCT/CN2021/109866 filed on Jul. 30, 2021, which is based on and claims the priority of Chinese Application No. 202010785400.3, filed on Aug. 6, 2020, the disclosure of which is incorporated in its entirety by reference herein.

TECHNICAL FIELD

The present application relates to the field of wireless communication technologies, and in particular to a data transmission method, a terminal, and a network node.

BACKGROUND

In the long term evolution (LTE) system, multimedia broadcast multicast service single frequency network (MBSFN) mode is used to transmit multimedia broadcast multicast service (MBMS) services. The MBMS service is a point-to-multipoint service, such as mobile TV. MBSFN service transmission requires evolved NodeBs (eNBs) of multiple cells in a certain MBSFN area to simultaneously transmit the same data, so that user equipment (UE) will not suffer from inter-cell interference when adjacent cells transmit data, and also benefit from superposition of signals from multiple cells. The UE receives and combines signals from multiple eNBs, thereby improving signal-to-noise ratio and effectively improving transmission efficiency of MBMS services. In the current LTE technology, UE with MBMS capability is only required to support receiving only one MBMS service (i.e., business) at one time point. The related art does not support simultaneous transmission of unicast and multicast/broadcast services (alternatively called broadcast or multicast services, multicast or broadcast services) to users.

A research topic of single-cell MBMS is proposed in LTE-A, in which single-cell MBMS services are transmitted on physical downlink shared channel (PDSCH). The MBMS service is identified with a temporary mobile group identity (TMGI). The TMGI is allocated by a broadcast multicast-service center (BM-SC). An application server uses an application layer signaling to notify the UE of relevant service description information such as TMGI, service start time. Single cell point-to-multipoint (SC-PTM) is another method of using PDSCH to transmit broadcast services. Core networks of MBSFN and SC-PTM are the same. In the access network, Multicell/multicast coordination entity (MCE) determines to use MBSFN or SC-PTM to send broadcast services over air interfaces. In the related art, the UE does not support simultaneous reception of unicast and multicast/broadcast services, and the transmission mode of one multicast/broadcast service is fixed.

SUMMARY

In view of this, embodiments of the present disclosure provide a data transmission method, a UE and a network node, which is used to solve the problems of not supporting simultaneous transmission of unicast and multicast/broadcast services to the UE, and transmission mode of a multicast/broadcast service is fixed.

In order to solve the above technical problems, one embodiment of the present disclosure provides a data transmission method, performed by a network node, including:
configuring a first radio channel and/or a second radio channel for a first PDU session, or configuring a first radio channel and/or a second radio channel for at least one same QoS flow of a first PDU session;
wherein the first radio channel is configured to transmit first data to a UE;
the second radio channel is configured to transmit second data to the UE;
the first radio channel is one of a unicast radio channel, a broadcast or multicast radio channel, and the second radio channel is the other one of the unicast radio channel and the broadcast or multicast radio channel;
the first data represents first data of the first PDU session or first data of at least one QoS flow of the first PDU session;
the second data represents second data of the first PDU session or second data of at least one QoS flow of the first PDU session.

Optionally, the second data is the same as the first data, or, the second data is a subset of the first data, or, the second data and the first data have no intersection, or, the second data is partially the same as the first data.

Optionally, the configuring a first radio channel and/or a second radio channel for a first PDU session, or configuring a first radio channel and/or a second radio channel for at least one same QoS flow of a first PDU session, includes:
configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel;
wherein at least the first physical configuration is different from the second physical configuration;
the first radio channel and the second radio channel share one radio bearer or two independent radio bearers.

Optionally, the configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel, includes:
configuring the first SDAP configuration, the first PDCP configuration, the first RLC configuration, the first MAC configuration and the first physical configuration corresponding to the first radio channel, and configuring the second PDCP configuration, the second RLC configuration, the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second PDCP configuration, the second RLC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second RLC configuration, the second MAC configuration and the second physical configuration corresponding to the second radio channel; or, configuring the first SDAP configuration, the first PDCP configuration, the first RLC configuration, the first MAC configuration and the first physical configuration corresponding to the first radio channel, and configuring the second RLC configuration and the second physical configuration corresponding to the second radio channel; or, configuring the first SDAP configuration, the first PDCP configuration, the first RLC configuration, the first MAC configuration and the first physical configuration corresponding to the first radio channel, and configuring the second MAC configuration and the second physical configuration corresponding to the second radio channel; or, configuring the first SDAP configuration, the first PDCP configuration, the first RLC configuration, the first MAC configuration and the first physical configuration corresponding to the first radio channel, and configuring the second physical configuration corresponding to the second radio channel.

Optionally, the configuring a first radio channel and/or a second radio channel for a first PDU session, or configuring a first radio channel and/or a second radio channel for at least one same QoS flow of a first PDU session, includes at least one of the following:

indicating first type information of the first PDU session and/or at least one QoS flow of the first PDU session of the UE;

indicating second type information of the first PDU session and/or at least one QoS flow of the first PDU session of the UE;

indicating a first type of the first radio channel and/or the second radio channel of the UE; or, indicating a second type of the first radio channel and/or the second radio channel of the UE;

where the first type refers to a service type of unicast, broadcast or multicast;

the second type refers to a transmission mode type of unicast, broadcast or multicast.

Optionally, when the second radio channel and the first radio channel belong to the same cell and/or different cells of the same network node, relevant parameters of the first PDCP layer and the second PDCP layer are the same; the relevant parameters include at least one of security context information, security key, integrity protection configuration information, header compression algorithm and header compression context information.

Optionally, relevant parameters of PDCP layers corresponding to unicast radio channels of multiple first UEs are the same; the relevant parameters include at least one of security context information, security key, integrity protection configuration information, header compression algorithm and header compression context information; the first UE is a UE that receives data of the broadcast or multicast radio channel.

Optionally, bandwidth parts (BWPs) corresponding to the broadcast or multicast radio channel include a first BWP and/or a second BWP;

the first BWP is a dedicated BWP, and the second BWP is an initial BWP; or, both the first BWP and the second BWP are initial BWPs;

configurations of the initial BWP include: an initial downlink BWP broadcast in SIB1, and/or, an initial downlink BWP in a serving cell configuration, and/or, an initial BWP corresponding to control resource set (coreset) 0.

Optionally, the method further includes at least one of the following:

activating the first radio channel or the second radio channel through an RRC message, MAC CE and/or physical control signaling;

activating the first radio channel and the second radio channel through an RRC message, MAC CE and/or physical control signaling;

activating the first radio channel and deactivating the second radio channel through an RRC message, MAC CE and/or physical control signaling;

simultaneously configuring the first radio channel and the second radio channel of the first PDU session or the first radio channel and the second radio channel of at least one QoS flow of the first PDU session, through an RRC message;

configuring the first radio channel or the second radio channel of the first PDU session, or the first radio channel or the second radio channel of at least one QoS flow of the first PDU session, through an RRC message;

using an RRC message to configure the first radio channel of the first PDU session and delete the second radio channel, or to configure the first radio channel of at least one QoS flow of the first PDU session and delete the second radio channel of at least one QoS flow of the first PDU session; or, using an RRC message to configure the second radio channel of the first PDU session, or the second radio channel of at least one QoS flow of the first PDU session, and delete the first radio channel.

Optionally, before transmitting the second data to the UE through the second radio channel, the method further includes: obtaining a PDCP transmission status report of the first radio channel.

Optionally, transmitting the second data to the UE through the second radio channel, includes: within a preset time period of starting to transmit the second data through the second radio channel, transmitting a first PDCP PDU including an IR packet, wherein the first PDCP PDU is used to carry the second data.

Optionally, transmitting the second data to the UE through the second radio channel, includes: transmitting a second PDCP PDU configured to carry the second data; wherein a packet header of the second PDCP PDU includes information for indicating encryption with a new key; or, the second PDCP PDU is packaged using a logical channel identifier corresponding to the second radio channel;

or, when the second radio channel and the first radio channel belong to different cells, before transmitting the second data to the UE through the second radio channel, the method further includes: transmitting an end packet to the UE, wherein the end packet is used to indicate that data of the first PDU session or data of at least one QoS flow of the first PDU session has been switched from the first radio channel to the second radio channel and is carried by the second radio channel.

Optionally, the method further includes: configuring, at the network node, synchronization function entity;

wherein the synchronization function entity is configured for:

transmitting and/or interacting, through signaling, time information associated with data packet transmission; and/or, adding time information associated with data packet transmission into a data packet;

wherein the time information is absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between a core network and/or application layer and network nodes, and/or network nodes;

the synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or, the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell; the first cell is a cell to which the first radio channel belongs, and the second cell is a cell to which the second radio channel belongs; the method further includes at least one of the following:

the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;

the base station of the second cell informs, the base station of the first cell, of sequence indexes of the next one or more packets to be transmitted and/or sequence indexes of packets still stored in an cache;

the base station of the second cell informs, the base station of the first cell, of sequence indexes of the next one or more packets to be transmitted and/or sequence indexes of packets still stored in an cache, together with carrying time information corresponding to transmission of the packets;

according to the received information, the base station of the first cell forwards packets which are out of sync between the first cell and the second cell;

according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

Optionally, the method further includes:

transmitting first indication information and/or second indication information to the UE; wherein the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;

receiving the concurrent demand information transmitted by the UE according to the first indication information and/or the second indication information; and allocating resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, before transmitting the second data to the UE through the second radio channel, the method further includes at least one of the following:

determining whether there is a condition or factor for switching between the first radio channel and the second radio channel, wherein the condition or factor includes at least one of the following:

the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node;

in case that most of participating UEs of a multicast or broadcast are concentrated in a first beam and a second beam, if one or more UEs are unable to receive information on the first beam and the second beam, a unicast radio channel is used for these UEs which are unable to receive information on the first beam and the second beam;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

One embodiment of the present disclosure provides a data transmission method, performed by a UE, including:

receiving first configuration information transmitted by a network node; and according to the first configuration information, establishing and/or configuring a first radio channel and/or a second radio channel for a first PDU session, or, establishing and/or configuring a first radio channel and/or a second radio channel for at least one QoS flow of the first PDU session;

wherein the first radio channel is configured to receive first data transmitted by the network node through the first radio channel;

the second radio channel is configured to receive second data transmitted by the network node through the second radio channel;

the first radio channel is one of a unicast radio channel, a broadcast or multicast radio channel, and the second radio channel is the other one of the unicast radio channel and the broadcast or multicast radio channel;

the first data represents first data of the first PDU session or first data of at least one QoS flow of the first PDU session;

the second data represents second data of the first PDU session or second data of at least one QoS flow of the first PDU session.

Optionally, wherein the second data is the same as the first data, or the second data is a subset of the first data, or, the second data and the first data have no intersection, or, the second data is partially the same as the first data.

Optionally, the method further includes:

establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel;

wherein at least the first physical configuration is independent from the second physical configuration;

the first radio channel and the second radio channel share one radio bearer or two independent radio bearers.

Optionally, the establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel, includes:

establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second physical configuration corresponding to the second radio channel.

Optionally, according to the first configuration information, establishing and/or configuring a first radio channel and/or a second radio channel for a first PDU session, or, establishing and/or configuring a first radio channel and/or a second radio channel for at least one QoS flow of the first PDU session, includes at least one of the following:
  receiving first type information of the first PDU session and/or at least one QoS flow of the first PDU session of the UE, transmitted by the network;
  receiving second type information of the first PDU session and/or at least one QoS flow of the first PDU session of the UE, transmitted by the network;
  receiving a first type of the first radio channel and/or the second radio channel of the UE, transmitted by the network; or,
  receiving a second type of the first radio channel and/or the second radio channel of the UE, transmitted by the network;
  where the first type refers to a service type of unicast, broadcast or multicast;
  the second type refers to a transmission mode type of unicast, broadcast or multicast.

Optionally, when the second radio channel and the first radio channel belong to the same cell, relevant parameters of the first PDCP layer and the second PDCP layer are the same; the relevant parameters include at least one of security context information, security key, integrity protection configuration information, header compression algorithm and header compression context information.

Optionally, relevant parameters of PDCP layers corresponding to unicast radio channels of the UE are the same as those of a first UE; the relevant parameters include at least one of security context information, security key, integrity protection configuration information, header compression algorithm and header compression context information; the first UE and the UE are UEs corresponding to the broadcast or multicast radio channel.

Optionally, bandwidth parts (BWPs) corresponding to the broadcast or multicast radio channel include a first BWP and a second BWP;
  the first BWP is a dedicated BWP, and the second BWP is an initial BWP; or, both the first BWP and the second BWP are initial BWPs;
  configurations of the initial BWP include: an initial downlink BWP broadcast in SIB1, and/or, an initial downlink BWP in a serving cell configuration, and/or, an initial BWP corresponding to control resource set (coreset) 0.

Optionally, the method further includes at least one of the following:
  receiving an RRC message, MAC CE and/or physical control signaling, which is transmitted by the network node and is used to activate the first radio channel or the second radio channel, and activating the first radio channel or the second radio channel;
  receiving an RRC message, MAC CE and/or physical control signaling, which is transmitted by the network node and is used to activate the first radio channel and the second radio channel, and activating the first radio channel and the second radio channel;
  receiving an RRC message, MAC CE and/or physical control signaling, which is transmitted by the network node and is used to activate the first radio channel and deactivate the second radio channel, and activating the first radio channel and deactivating the second radio channel;
  receiving an RRC message which is transmitted by the network node and is used to simultaneously establish and/or configure the first radio channel and the second radio channel of the first PDU session, and simultaneously establishing and/or configuring the first radio channel and the second radio channel of the first PDU session;
  receiving an RRC message which is transmitted by the network node and is used to establish and/or configure the first radio channel or the second radio channel of the first PDU session, and establishing and/or configuring the first radio channel or the second radio channel of the first PDU session;
  receiving an RRC message which is transmitted by the network node and is used to establish and/or configure the first radio channel of the first PDU session and delete the second radio channel, and establishing and/or configuring the first radio channel of the first PDU session and deleting the second radio channel;
  receiving an RRC message which is transmitted by the network node and is used to establish and/or configure the second radio channel of the first PDU session and delete the first radio channel, and establishing and/or configuring the second radio channel of the first PDU session and deleting the first radio channel.

Optionally, before receiving the second data transmitted by the network node through the second radio channel, the method further includes: transmitting a PDCP status report of the first radio channel.

Optionally, the receiving the second data transmitted by the network node through the second radio channel, includes:
  within a preset time period of starting to receive the second data through the second radio channel, receiving a first PDCP PDU including an IR packet, wherein the first PDCP PDU is used to carry the second data.

Optionally, in case that the second radio channel and the first radio channel belong to different cells, the receiving the second data transmitted by the network node to the UE through the second radio channel, includes:
  receiving a second PDCP PDU configured to carry the second data; wherein a packet header of the second PDCP PDU includes information for indicating encryption with a new key; or, the second PDCP PDU is packaged using a logical channel identifier corresponding to the second radio channel;
  or,
  in case that the second radio channel and the first radio channel belong to different cells, before receiving the second data transmitted by the network node to the UE through the second radio channel, the method further includes:
  receiving an end packet transmitted by the network node, wherein the end packet is used to indicate that data of the first PDU session or data of at least one QoS flow of the first PDU session has been switched from the first radio channel to the second radio channel and is carried by the second radio channel.

One embodiment of the present disclosure provides a data transmission method, performed by a network node, including:
  transmitting first data to a UE through a first radio channel;
  wherein the first radio channel is configured for a first PDU session; or, the first radio channel is configured for at least one QoS flow of the first PDU session;
  the first radio channel is one of a unicast radio channel, a broadcast or multicast radio channel;
  the first data represents first data of the first PDU session or first data of at least one QoS flow of the first PDU session.

Optionally, transmitting the first data to the UE through the first radio channel, includes:
configuring at least one of a first SDAP configuration, a first PDCP configuration, a first RLC configuration, a first MAC configuration or a first physical configuration corresponding to the first radio channel.

Optionally, bandwidth parts (BWPs) corresponding to the broadcast or multicast radio channel include a first BWP and/or a second BWP;
the first BWP is a dedicated BWP, and the second BWP is an initial BWP; or, both the first BWP and the second BWP are initial BWPs;
configurations of the initial BWP include: an initial downlink BWP broadcast in SIB1, and/or, an initial downlink BWP in a serving cell configuration, and/or, an initial BWP corresponding to control resource set (coreset) 0.

Optionally, the method further includes at least one of the following:
activating the first radio channel through an RRC message, MAC CE and/or physical control signaling;
deactivating the first radio channel through an RRC message, MAC CE and/or physical control signaling;
configuring the first radio channel through an RRC message; or,
deleting the first radio channel through an RRC message.

Optionally, before transmitting the first data to the UE through the first radio channel, the method further includes:
obtaining relevant information of the second radio channel;
wherein the second radio channel and the first radio channel are corresponding to the same PDU session configuration or at least one QoS flow of the same PDU session; and other network radio node transmits data of the same PDU session corresponding to the first radio channel or at least one QoS flow of the same PDU session through the second radio channel.

Optionally, the obtaining relevant information of the second radio channel, includes:
obtaining data packet transmission status information of the second radio channel.

Optionally, transmitting the first data to the UE through the first radio channel, includes: transmitting a first PDCP PDU, wherein the first PDCP PDU is configured to carry the first data, a packet header of the first PDCP PDU includes information for indicating encryption with a new key; or, the first PDCP PDU is packaged using a logical channel identifier corresponding to the first radio channel;
or,
before transmitting the first data to the UE through the first radio channel, the method further includes:
transmitting an end packet to the UE, wherein the end packet is used to indicate that data of the first PDU session or data of at least one QoS flow of the first PDU session has been switched from the first radio channel to the second radio channel and is carried by the second radio channel.

Optionally, the method further includes:
configuring, at the network node, synchronization function entity;
wherein the synchronization function entity is configured for:
transmitting and/or interacting, through signaling, time information associated with data packet transmission; and/or,
adding time information associated with data packet transmission into a data packet;

wherein the time information is absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes;
the synchronization function entity is an independent protocol layer, or the synchronization function entity is located in at least one of protocol layers of SDAP, PDCP, RLC and MAC.

Optionally, the time information is time information transmitted from an application layer or a core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell; the first cell is a cell to which the first radio channel belongs, and the second cell is a cell to which the second radio channel belongs; the method further includes at least one of the following:
the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
the base station of the second cell informs, the base station of the first cell, of sequence indexes of the next one or more packets to be transmitted and/or sequence indexes of packets still stored in an cache;
the base station of the second cell informs, the base station of the first cell, of sequence indexes of the next one or more packets to be transmitted and/or sequence indexes of packets still stored in an cache, together with carrying time information corresponding to transmission of the packets;
according to the received information, the base station of the first cell forwards packets which are out of sync between the first cell and the second cell;
according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

One embodiment of the present disclosure provides a data transmission method, performed by a network node, including:

establishing two or more protocol data unit (PDU) sessions for a second service;

wherein a first PDU session is configured to transmit third data of the second service to a UE;

a second PDU session is configured to transmit fourth data of the second service to the UE;

the second service is a broadcast or multicast service;

the first PDU session is one of a unicast PDU session and a broadcast or multicast PDU session; and the second PDU session is the other one of the unicast PDU session and the broadcast or multicast PDU session;

the unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Optionally, the network node includes a core network; and transmitting the third data of the second service to the UE through the first PDU session and transmitting the fourth data of the second service to the UE through the second PDU session, includes:

determining, by the core network, a UE in a broadcast or multicast group, which uses a multicast PDU session established for broadcast or multicast services to receive data, and a UE which uses a unicast PDU session established for broadcast or multicast services to receive data; and/or, determining, by the core network, in a broadcast or multicast service, data received by using the broadcast or multicast PDU session of the broadcast or multicast service, data received by using the unicast PDU session; and/or, determining, by the core network, some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network; and transmitting the third data of the second service to the UE through the first PDU session and transmitting the fourth data of the second service to the UE through the second PDU session, includes:

informing, by the core network, the UE of relationship between the first PDU session and the second PDU session;

informing, by the core network, the UE and the base station respectively of relationship between the first PDU session and the second PDU session, when the core network configures a broadcast or multicast PDU session and a unicast PDU session of the same broadcast or multicast service for the UE to receive data; or, informing, by the core network, a base station of relationship between the first PDU session and the second PDU session; and then, informing, by the base station, the UE of the relationship between the first PDU session and the second PDU session; or, informing, by the core network, a base station of relationship between the first PDU session and the second PDU session; or, informing, by the core network, the UE of relationship between the first PDU session and the second PDU session.

Optionally, the network node includes a core network; and transmitting the third data of the second service to the UE through the first PDU session and transmitting the fourth data of the second service to the UE through the second PDU session, includes:

informing, by the core network, the UE of a reception mode of the first PDU session and the second PDU session;

determining, by the core network, some or all UEs in a broadcast or multicast group, which can not only use a broadcast or multicast PDU session established for a broadcast or multicast service to receive data, but also use a unicast PDU session established for the broadcast or multicast service to receive data;

wherein the data received by the UE from the broadcast or multicast PDU session established for the broadcast or multicast service and the data received by the UE from the unicast PDU session established for the broadcast or multicast service are simultaneous or time-sharing.

Optionally, the network node includes a core network; and transmitting the third data of the second service to the UE through the first PDU session and transmitting the fourth data of the second service to the UE through the second PDU session, includes:

according to quality requirements of a service, and/or arrival characteristics of the service, and/or new radio channel, selecting for the UE, by the core network, a PDU session type and/or specific time for receiving the broadcast or multicast service;

wherein the core network obtains specific information from the UE, the base station and/or the network management side; the specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets; the specific time is in the time form of bitmap format or absolute/relative time information.

Optionally, the network node includes a core network; and transmitting the third data of the second service to the UE through the first PDU session and transmitting the fourth data of the second service to the UE through the second PDU session, includes:

informing, by the core network, a base station of a PDU session type selected for the UE to receive broadcast or multicast services, so that the base station informs the UE of the PDU session type which is selected by the network node for the UE to receive broadcast or multicast service; or, informing, by the core network, a base station of specific time and a PDU session type selected for the UE to receive broadcast or multicast services, so that the base station informs the UE of the specific time and the PDU session type which is selected by the network node for the UE to receive broadcast or multicast service; or, informing, by the core network, a base station of a PDU session type selected for the UE to receive broadcast or multicast services; or, informing, by the core network, the UE of a PDU session type selected for the UE to receive broadcast or multicast services; or, informing, by the core network, a base station of specific time and a PDU session type selected for the UE to receive broadcast or multicast services; or, informing, by the core network, the UE of specific time and a PDU session type selected for the UE to receive broadcast or multicast services.

Optionally, transmitting the third data of the second service to the UE through the first PDU session and transmitting the fourth data of the second service to the UE through the second PDU session, includes:

establishing, by the network node, a broadcast or multicast PDU session and a unicast PDU session for the same broadcast or multicast service, for the UE to receive data; and using signaling or a special data packet to activate a to-be-used broadcast or multicast PDU session and/or unicast PDU session established for the same broadcast or multicast service;

and/or, using, by the network node, signaling or a special data packet to deactivate the broadcast or multicast PDU session and/or unicast PDU session established for the same broadcast or multicast service;

wherein the network node is a node on core network side and/or radio access network side.

Optionally, transmitting the third data of the second service to the UE through the first PDU session and transmitting the fourth data of the second service to the UE through the second PDU session, includes:

transmitting the broadcast or multicast PDU session established for the broadcast or multicast service at the network node on the radio access network side, to the UE by using a point-to-point (PTP) and/or point-to-multipoint (PTM) transmission mode; or, receiving a PDU session type reported by the UE, wherein the PDU session type is determined by the UE itself for receiving the multicast service according to quality requirements of a service, and/or arrival characteristics of the service, and/or new radio channel.

One embodiment of the present disclosure provides a data transmission method, performed by a UE, including:

receiving second configuration information transmitted by a network node;

establishing two or more PDU sessions for the second service according to the second configuration information;

wherein the first PDU session is configured to transmit third data of the second service to the UE;

the second PDU session is configured to transmit fourth data of the second service to the UE;

the second service is a broadcast or multicast service;

the first PDU session is one of a unicast PDU session and a broadcast or multicast PDU session; and the second PDU session is the other one of the unicast PDU session and the broadcast or multicast PDU session;

the unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

One embodiment of the present disclosure provides a data transmission method, performed by a network node, including:

transmitting PDSCH to a UE; wherein the PDSCH includes a first transport block and a second transport block, the first transport block is configured to transmit data of a unicast service, and the second transport block is configured to transmit data of a broadcast or multicast service data.

Optionally, before transmitting the PDSCH to the UE, the method further includes:

transmitting first information to the UE, wherein the first information is used to determine a first HARQ feedback resource and a second HARQ feedback resource; and/or, transmitting second information to the UE, wherein the second information is used to determine a first slot interval and a second slot interval;

wherein the first slot interval is a time domain interval between the first HARQ feedback resource and the PDSCH, and the second slot interval is a time domain interval between the second HARQ feedback resource and the PDSCH;

the first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

wherein the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a data transmission method, performed by a UE, including:

receiving PDSCH transmitted by a network node, wherein the PDSCH includes a first transport block and a second transport block, the first transport block is used to transmit data of a unicast service, and the second transport block is used to transmit data of a broadcast or multicast service.

Optionally, before receiving the PDSCH transmitted by the network node, the method further includes:
  receiving first information transmitted by the network node, wherein the first information is used to determine a first HARQ feedback resource and a second HARQ feedback resource; and/or,
  receiving second information transmitted by the network node, where the second information is used to determine a first slot interval and a second slot interval;
  wherein the first slot interval is a time domain interval between the first HARQ feedback resource and the PDSCH, and the second slot interval is a time domain interval between the second HARQ feedback resource and the PDSCH;
  the first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or,
  the first information includes information of the first PUCCH set and offset information between the first PUCCH set and the second PUCCH set;
  wherein the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a data transmission method, performed by a network node, including:
  transmitting data of a unicast service to a UE through a first BWP, and transmitting data of a broadcast or multicast service to the UE through a second BWP.

Optionally, the first BWP is one or more dedicated activation BWPs;
  the second BWP is an initial BWP, or the second BWP is a BWP that is associated with an initial BWP;
  configurations of the initial BWP include: an initial downlink BWP broadcast in SIB1, and/or, an initial downlink BWP in a serving cell configuration, and/or, an initial BWP corresponding to coreset 0.

Optionally, before transmitting data of a unicast service to a UE through a first BWP, and transmitting data of a broadcast or multicast service to the UE through a second BWP, the method further includes:
  in case that the second BWP is a BWP that has an association relationship with the initial BWP, transmitting a system message including third information;
  wherein the third information is used to indicate the association relationship between the second BWP and the initial BWP.

One embodiment of the present disclosure provides a data transmission method, performed by a UE, including:
  receiving data of a unicast service transmitted by a network node through a first BWP, and data of a broadcast or multicast service transmitted through a second BWP.

Optionally, the first BWP is one or more dedicated activation BWPs;
  the second BWP is an initial BWP, or the second BWP is a BWP that is associated with an initial BWP;
  configurations of the initial BWP include: an initial downlink BWP broadcast in SIB1, and/or, an initial downlink BWP in a serving cell configuration, and/or, an initial BWP corresponding to coreset 0.

Optionally, before receiving data of a unicast service transmitted by a network node through a first BWP, and data of a broadcast or multicast service transmitted through a second BWP, the method further includes:
  receiving a system message including third information;
  wherein the third information is used to indicate an association relationship between the second BWP and the initial BWP.

One embodiment of the present disclosure provides a network node, including:
  a radio channel configuration module configured to configure a first radio channel and/or a second radio channel for a first PDU session, or configure a first radio channel and/or a second radio channel for at least one same QoS flow of a first PDU session;
  wherein the first radio channel is configured to transmit first data to a UE;
  the second radio channel is configured to transmit second data to the UE;
  the first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or,
  the second data and the first data have no intersection, or,
  the second data is partially the same as the first data.

Optionally, the radio channel configuration module is configured to configure at least one of a first SDAP configuration, a first PDCP configuration, a first RLC configuration, a first MAC configuration or a first physical configuration corresponding to the first radio channel; configure at least one of a second SDAP configuration, a second PDCP configuration, a second RLC configuration, a second MAC configuration or a second physical configuration corresponding to the second radio channel;
  where at least the first physical configuration is different from the second physical configuration.

The first radio channel and the second radio channel share one radio bearer or two independent radio bearers.

Optionally, the radio channel configuration module is configured to configure the first SDAP configuration, the first PDCP configuration, the first RLC configuration, the first MAC configuration and the first physical configuration corresponding to the first radio channel, and configure the second PDCP configuration, the second RLC configuration, the second MAC configuration and the second physical configuration corresponding to the second radio channel; or,
  the radio channel configuration module is configured to configure the first SDAP configuration, the first PDCP configuration, the first RLC configuration, the first MAC configuration and the first physical configuration corresponding to the first radio channel, and configure the second PDCP configuration, the second RLC configuration and the second physical configuration corresponding to the second radio channel; or,
  the radio channel configuration module is configured to configure the first SDAP configuration, the first PDCP configuration, the first RLC configuration, the first MAC configuration and the first physical configuration corresponding to the first radio channel, and configure the second RLC configuration, the second MAC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second RLC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second MAC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second physical configuration corresponding to the second radio channel.

Optionally, the radio channel configuration module is configured to configure the first radio channel and/or the second radio channel for the first PDU session or configure the first radio channel and/or the at least one QoS flow of the first PDU session in a manner of at least one of the following:

indicating first type information of the first PDU session and/or at least one QoS flow of the first PDU session of the UE;

indicating second type information of the first PDU session and/or at least one QoS flow of the first PDU session of the UE;

indicating a first type of the first radio channel and/or the second radio channel of the UE; or, indicating a second type of the first radio channel and/or the second radio channel of the UE;

where the first type refers to a service type of unicast, broadcast or multicast;

the second type refers to a transmission mode type of unicast, broadcast or multicast.

Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes at least one of the following:

a first activation module configured to activate the first radio channel or the second radio channel through an RRC message, MAC CE and/or physical control signaling;

a second activation module configured to activate the first radio channel and the second radio channel through an RRC message, MAC CE and/or physical control signaling;

a third activation module configured to activate the first radio channel and deactivate the second radio channel through an RRC message, MAC CE and/or physical control signaling;

a first configuration module configured to simultaneously configure the first radio channel and/or the second radio channel of the first PDU session or the first radio channel and the second radio channel of at least one QoS flow of the first PDU session, through an RRC message;

a second configuration module configured to configure the first radio channel and/or the second radio channel of the first PDU session, or the first radio channel or the second radio channel of at least one QoS flow of the first PDU session, through an RRC message;

a third configuration module configured to use an RRC message to configure the first radio channel and/or the second radio channel of the first PDU session, or the first radio channel of at least one QoS flow of the first PDU session, and delete the second radio channel of at least one QoS flow of the first PDU session; or, a fourth configuration module configured to use an RRC message to configure the first radio channel and/or the second radio channel of the first PDU session, or the second radio channel of at least one QoS flow of the first PDU session, and delete the first radio channel of at least one QoS flow of the first PDU session.

Optionally, the network node further includes: a status report obtaining module configured to obtain a PDCP transmission status report of the first radio channel.

Optionally, the second data transmission module is configured to, within a preset time period of starting to transmit the second data through the second radio channel, transmit a first PDCP PDU including an IR packet, where the first PDCP PDU is used to carry the second data.

Optionally, the second data transmission module is configured to transmit a second PDCP PDU configured to carry the second data; where a packet header of the second PDCP PDU includes information for indicating encryption with a new key; or, the second PDCP PDU is packaged using a logical channel identifier corresponding to the second radio channel;

or, the first data transmission module is configured to, when the second radio channel and the first radio channel belong to different cells, transmit an end packet to the UE, where the end packet is used to indicate that data of the first PDU session or data of at least one QoS flow of the first PDU session has been switched from the first radio channel to the second radio channel and is carried by the second radio channel.

Optionally, the network node further includes:
a function entity configuration module configured to configure, at the network node, synchronization function entity.

The synchronization function entity is configured for:
transmitting and/or interacting, through signaling, time information associated with data packet transmission; and/or,
adding time information associated with data packet transmission into a data packet;
where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs.

The base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell.

The base station of the second cell informs, the base station of the first cell, of sequence indexes of the next one or more packets to be transmitted and/or sequence indexes of packets still stored in an cache.

The base station of the second cell informs, the base station of the first cell, of sequence indexes of the next one or more packets to be transmitted and/or sequence indexes of packets still stored in an cache, together with carrying time information corresponding to transmission of the packets.

According to the received information, the base station of the first cell forwards packets which are out of sync between the first cell and the second cell.

According to the received information, the base station of the first cell forwards packets which are out of sync between the first cell and the second cell and which are not stored in a cache of the second cell.

The UE informs, the base station of the second cell, of sequence indexes of data packets successfully received in the first cell, and then the base station of the second cell uses a unicast connection to transmit to the UE, packets which are out of sync between the first cell and the second cell.

The UE maintains connection with the first cell and the second cell at the same time, and does not interrupt the connection with the first cell until the UE has received, from the first cell, packets which are out of sync between the first cell and the second cell.

The base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell.

After the UE switches to the second cell, the UE continues to maintain the connection with the first cell and does not interrupt the connection with the first cell until the UE finds that packets received in the second cell are continuous or repeated with packets received from the first cell.

Optionally, the network node further includes:
an indication information transmission module configured to transmit first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;
receive the concurrent demand information transmitted by the UE according to the first indication information and/or the second indication information; and
allocate resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, the network node further includes:
a determination module configured to determine whether there is a condition or factor for switching between the first radio channel and the second radio channel, where the condition or factor includes at least one of the following:

the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node;

in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

One embodiment of the present disclosure provides a UE, including:

a configuration information receiving module configured to receive first configuration information transmitted by a network node;

an establishment and/or configuration module configured to, according to the first configuration information, establish and/or configure a first radio channel and/or a second radio channel for a first PDU session, or, establish and/or configure a first radio channel and/or a second radio channel for at least one QoS flow of the first PDU session;

wherein the first radio channel is configured to receive first data transmitted by the network node through the first radio channel;

the second radio channel is configured to receive second data transmitted by the network node through the second radio channel;

the first radio channel is one of a unicast radio channel, a broadcast or multicast radio channel, and the second radio channel is the other one of the unicast radio channel and the broadcast or multicast radio channel;

the first data represents first data of the first PDU session or first data of at least one QoS flow of the first PDU session;

the second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the UE further includes:

an establishment and/or configuration module configured to establish and/or configure at least one of a first SDAP entity, a first PDCP configuration, a first RLC entity, a first MAC entity or a first physical layer, to be corresponding to the first radio channel; establish and/or configure at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

Optionally, the establishment and/or configuration module is configured to establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second physical configuration corresponding to the second radio channel.

Optionally, the radio channel establishment and/or configuration module is configured to, according to the first configuration information, establish and/or configure a first radio channel and/or a second radio channel for a first PDU session, or, establishing and/or configuring a first radio channel and/or a second radio channel for at least one QoS flow of the first PDU session, in a manner of at least one of the following:
  receiving first type information of the first PDU session and/or at least one QoS flow of the first PDU session of the UE, transmitted by the network;
  receiving second type information of the first PDU session and/or at least one QoS flow of the first PDU session of the UE, transmitted by the network;
  receiving a first type of the first radio channel and/or the second radio channel of the UE, transmitted by the network; or,
  receiving a second type of the first radio channel and/or the second radio channel of the UE, transmitted by the network;
  where the first type refers to a service type of unicast, broadcast or multicast;
  the second type refers to a transmission mode type of unicast, broadcast or multicast.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to coreset 0.

Optionally, the UE further includes: a first processing module.

The first processing module is configured to receive an RRC message, MAC CE and/or physical control signaling, which is transmitted by the network node and is used to activate the first radio channel or the second radio channel, and activate the first radio channel or the second radio channel;
  the first processing module is configured to receive an RRC message, MAC CE and/or physical control signaling, which is transmitted by the network node and is used to activate the first radio channel and the second radio channel, and activate the first radio channel and the second radio channel;
  the first processing module is configured to receive an RRC message, MAC CE and/or physical control signaling, which is transmitted by the network node and is used to activate the first radio channel and deactivate the second radio channel, and activate the first radio channel and deactivating the second radio channel;
  the first processing module is configured to receive an RRC message which is transmitted by the network node and is used to simultaneously establish and/or configure the first radio channel and/or the second radio channel of the first PDU session, and simultaneously establish and/or configure the first radio channel and/or the second radio channel of the first PDU session;
  the first processing module is configured to receive an RRC message which is transmitted by the network node and is used to establish and/or configure the first radio channel or the second radio channel of the first PDU session, and establish and/or configure the first radio channel or the second radio channel of the first PDU session;
  the first processing module is configured to receive an RRC message which is transmitted by the network node and is used to establish and/or configure the first radio channel of the first PDU session and delete the second radio channel, and establish and/or configure the first radio channel of the first PDU session and deleting the second radio channel;
  the first processing module is configured to receive an RRC message which is transmitted by the network node and is used to establish and/or configure the second radio channel of the first PDU session and delete the first radio channel, and establish and/or configure the second radio channel of the first PDU session and deleting the first radio channel.

Optionally, the UE further includes:
  a status report transmission module configured to transmit a PDCP status report of the first radio channel.

The receiving the second data of the first service transmitted by the network node through the second radio channel, includes:
  within a preset time period of starting to receive the second data through the second radio channel, receiving a first PDCP PDU including an IR packet, where the first PDCP PDU is used to carry the second data.

Optionally, the second data receiving module is configured to receive a second PDCP PDU configured to carry the second data; where a packet header of the second PDCP PDU includes information for indicating encryption with a new key; or, the second PDCP PDU is packaged using a logical channel identifier corresponding to the second radio channel;
  or, the UE further includes:
  an end packet receiving module configured to receive an end packet transmitted by the network node, where the end packet is used to indicate that data of the first PDU session or data of at least one QoS flow of the first PDU session has been switched from the first radio channel to the second radio channel and is carried by the second radio channel.

One embodiment of the present disclosure provides a network node, including:
  a first data transmission module configured to transmit first data to a UE through a first radio channel;
  where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

Optionally, the network node further includes: a configuration module configured to configure at least one of a first SDAP configuration, a first PDCP configuration, a first RLC configuration, a first MAC configuration or a first physical configuration corresponding to the first radio channel.

Optionally, bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the network node further includes a second processing module.

The second processing module is configured to activate the first radio channel through an RRC message, MAC CE and/or physical control signaling; and/or, the second processing module is configured to deactivate the first radio channel through an RRC message, MAC CE and/or physical control signaling; and/or, the second processing module is configured to configure the first radio channel through an RRC message; and/or, the second processing module is configured to delete the first radio channel through an RRC message.

Optionally, the network node further includes:

an obtaining module configured to obtain relevant information of the second radio channel;

where the second radio channel and the first radio channel are corresponding to the same PDU session configuration or at least one QoS flow of the same PDU session, and the second radio channel is on another network radio node.

Optionally, the obtaining module is configured to obtain data packet transmission status information of the second radio channel.

Optionally, the first data transmission module is configured to transmit a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel;

or, the network node further includes:

an end packet transmission module configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the network node further includes:

a synchronization function entity configuration module configured to configure, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or, the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs.

The base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell.

The base station of the second cell informs, the base station of the first cell, of sequence indexes of the next one or more packets to be transmitted and/or sequence indexes of packets still stored in an cache.

The base station of the second cell informs, the base station of the first cell, of sequence indexes of the next one or more packets to be transmitted and/or sequence indexes of packets still stored in an cache, together with carrying time information corresponding to transmission of the packets.

According to the received information, the base station of the first cell forwards packets which are out of sync between the first cell and the second cell.

According to the received information, the base station of the first cell forwards packets which are out of sync between the first cell and the second cell and which are not stored in a cache of the second cell.

The UE informs, the base station of the second cell, of sequence indexes of data packets successfully received in the first cell, and then the base station of the second cell uses a unicast connection to transmit to the UE, packets which are out of sync between the first cell and the second cell.

The UE maintains connection with the first cell and the second cell at the same time, and does not interrupt the connection with the first cell until the UE has received, from the first cell, packets which are out of sync between the first cell and the second cell.

The base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell.

After the UE switches to the second cell, the UE continues to maintain the connection with the first cell and does not interrupt the connection with the first cell until the UE finds that packets received in the second cell are continuous or repeated with packets received from the first cell.

One embodiment of the present disclosure provides a network node, including:
a session establishment module configured to establish two or more protocol data unit (PDU) sessions for a second service;
wherein a first PDU session is configured to transmit third data of the second service to a UE;
a second PDU session is configured to transmit fourth data of the second service to the UE;
the second service is a broadcast or multicast service;
the first PDU session is one of a unicast PDU session and a broadcast or multicast PDU session; and the second PDU session is the other one of the unicast PDU session and the broadcast or multicast PDU session;
the unicast PDU session is separately established for all or part of UE which receive the second service.

Optionally, the fourth data is the same as the third data, or the fourth data is a subset of the third data, or,
the fourth data and the third data have no intersection, or, the fourth data is partially the same as the third data.

Optionally, the network node includes a core network, and the core network includes a decision module.

The decision module is configured to determine a UE in a broadcast or multicast group, which uses a multicast PDU session established for broadcast or multicast services to receive data, and a UE which uses a unicast PDU session established for broadcast or multicast services to receive data; and/or,
the decision module is configured to determine, in a broadcast or multicast service, data received by using the broadcast or multicast PDU session of the broadcast or multicast service, data received by using the unicast PDU session; and/or, The decision module is configured to determine some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network, and the core network includes:
a first notification module configured to inform the UE of relationship between the first PDU session and the second PDU session;
a second notification module configured to inform the UE and the base station respectively of relationship between the first PDU session and the second PDU session, when the core network configures a broadcast or multicast PDU session and a unicast PDU session of the same broadcast or multicast service for the UE to receive data; or,
a third notification module configured to inform a base station of relationship between the first PDU session and the second PDU session; and then, inform, by the base station, the UE of the relationship between the first PDU session and the second PDU session; or,
a fourth notification module configured to inform a base station of relationship between the first PDU session and the second PDU session; or, inform, by the core network, the UE of relationship between the first PDU session and the second PDU session.

Optionally, the network node includes a core network, and the core network includes:
a fifth notification module configured to inform the UE of a reception mode of the first PDU session and the second PDU session;
a decision module configured to determine some or all UEs in a broadcast or multicast group, which can not only use a broadcast or multicast PDU session established for a broadcast or multicast service to receive data, but also use a unicast PDU session established for the broadcast or multicast service to receive data;
where the data received by the UE from the broadcast or multicast PDU session established for the broadcast or multicast service and the data received by the UE from the unicast PDU session established for the broadcast or multicast service may be simultaneous or time-sharing.

Optionally, the network node includes a core network, and the core network includes:
a selection module configured to, according to quality requirements of a service, and/or arrival characteristics of the service, and/or new radio channel, select for the UE a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

Optionally, the network node includes a core network, and the core network includes:
a sixth notification module configured to inform a base station of a PDU session type selected for the UE to receive broadcast or multicast services, so that the base station informs the UE of the PDU session type which is selected by the network node for the UE to receive broadcast or multicast service; or,
a seventh notification module configured to inform a base station of specific time and a PDU session type selected for the UE to receive broadcast or multicast services, so that the base station informs the UE of the specific time and the PDU session type which is selected by the network node for the UE to receive broadcast or multicast service; or,
an eighth notification module configured to inform a base station of a PDU session type selected for the UE to receive broadcast or multicast services; or, inform the UE of a PDU session type selected for the UE to receive broadcast or multicast services; or, a ninth notification module configured to inform a base station of specific time and a PDU session type selected for the UE to receive broadcast or multicast services; or, inform the UE of specific time and a PDU session type selected for the UE to receive broadcast or multicast services.

Optionally, the network node includes:

an establishment module configured to establish a broadcast or multicast PDU session and a unicast PDU session for the same broadcast or multicast service, for a UE to receive data; and use signaling or a special data packet to activate a to-be-used broadcast or multicast PDU session and/or unicast PDU session established for the same broadcast or multicast service;

and/or, a deactivation module configured to use signaling or a special data packet to deactivate the broadcast or multicast PDU session and/or unicast PDU session established for the same broadcast or multicast service;

where the network node may be a node on core network side and/or radio access network side.

Optionally, the network node includes:

a transmission module configured to transmit the broadcast or multicast PDU session established for the broadcast or multicast service at the network node on the radio access network side, to the UE by using a point-to-point (PTP) and/or point-to-multipoint (PTM) transmission mode; or, a receiving module configured to receive a PDU session type reported by the UE, where the PDU session type is determined by the UE itself for receiving the multicast service according to quality requirements of a service, and/or arrival characteristics of the service, and/or new radio channel.

One embodiment of the present disclosure provides a UE, including:

a second configuration information receiving module configured to receive second configuration information transmitted by a network node;

a session establishment module configured to establish two or more PDU sessions for a second service according to the second configuration information;

wherein a first PDU session is configured to transmit third data of the second service to the UE;

a second PDU session is used to transmit fourth data of the second service to the UE;

the second service is a broadcast or multicast service;

the first PDU session is one of a unicast PDU session and a broadcast or multicast PDU session; and the second PDU session is the other one of the unicast PDU session and the broadcast or multicast PDU session;

the unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

One embodiment of the present disclosure provides a network node, including:

a simultaneous transmission module configured to transmit PDSCH to a UE; wherein the PDSCH includes a first transport block and a second transport block, the first transport block is used to transmit data of a unicast service, and the second transport block is used to transmit data of a broadcast or multicast service data.

Optionally, the network node further includes:

a first information transmission module configured to transmit first information to the UE, where the first information is used to determine a first HARQ feedback resource and a second HARQ feedback resource; and/or, a second information transmission module configured to transmit second information to the UE, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a UE, including:

a simultaneous reception module configured to receive PDSCH transmitted by a network node, wherein the PDSCH includes a first transport block and a second transport block, the first transport block is used to transmit data of a unicast service, and the second transport block is used to transmit data of a broadcast or multicast service.

Optionally, the network node further includes:

a first information reception module configured to receive first information transmitted by the network node, where the first information is used to determine a first HARQ feedback resource and a second HARQ feedback resource; and/or, a second information reception module configured to receive second information transmitted by the network node, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a network node, including:
a frequency division transmission module configured to transmit data of a unicast service to a UE through a first BWP, and transmit data of a broadcast or multicast service to the UE through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes:
a third information transmission module configured to, in case that the second BWP is a BWP that has an association relationship with the initial BWP, transmit a system message including third information;
where the third information is used to indicate the association relationship between the second BWP and the initial BWP.

One embodiment of the present disclosure provides a UE, including:
a frequency division reception module configured to receive data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes:
a third information reception module configured to receive a system message including third information;
where the third information is used to indicate an association relationship between the second BWP and the initial BWP.

One embodiment of the present disclosure provides a network node, including:
a transceiver and a processor;
wherein the transceiver is configured to configure a first radio channel and/or a second radio channel for a first PDU session, or configure a first radio channel and/or a second radio channel for at least one same QoS flow of a first PDU session;
the first radio channel is configured to transmit first data to a UE;
the second radio channel is configured to transmit second data to the UE;
the first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or,
the second data and the first data have no intersection, or,
the second data is partially the same as the first data.

Optionally, the transceiver is configured to configure at least one of a first SDAP configuration, a first PDCP configuration, a first RLC configuration, a first MAC configuration or a first physical configuration corresponding to the first radio channel; configure at least one of a second SDAP configuration, a second PDCP configuration, a second RLC configuration, a second MAC configuration or a second physical configuration corresponding to the second radio channel;
where at least the first physical configuration is different from the second physical configuration.

The first radio channel and the second radio channel share one radio bearer or two independent radio bearers.

Optionally, the transceiver is configured to configure the first SDAP configuration, the first PDCP configuration, the first RLC configuration, the first MAC configuration and the first physical configuration corresponding to the first radio channel, and configure the second PDCP configuration, the second RLC configuration, the second MAC configuration and the second physical configuration corresponding to the second radio channel; or,
configure the first SDAP configuration, the first PDCP configuration, the first RLC configuration, the first MAC configuration and the first physical configuration corresponding to the first radio channel, and configure the second PDCP configuration, the second RLC configuration and the second physical configuration corresponding to the second radio channel; or,
configure the first SDAP configuration, the first PDCP configuration, the first RLC configuration, the first MAC configuration and the first physical configuration corresponding to the first radio channel, and configure the second RLC configuration, the second MAC configuration and the second physical configuration corresponding to the second radio channel; or,
configure the first SDAP configuration, the first PDCP configuration, the first RLC configuration, the first MAC configuration and the first physical configuration corresponding to the first radio channel, and configure the second RLC configuration and the second physical configuration corresponding to the second radio channel; or,
configure the first SDAP configuration, the first PDCP configuration, the first RLC configuration, the first MAC configuration and the first physical configuration corresponding to the first radio channel, and configure the second MAC configuration and the second physical configuration corresponding to the second radio channel; or,
configure the first SDAP configuration, the first PDCP configuration, the first RLC configuration, the first MAC configuration and the first physical configuration corresponding to the first radio channel, and configure the second physical configuration corresponding to the second radio channel.

Optionally, the transceiver is configured to configure a first radio channel and/or a second radio channel for a first PDU session, or configure a first radio channel and/or a second radio channel for at least one same QoS flow of a first PDU session, in a manner of at least one of the following:

indicating first type information of the first PDU session and/or at least one QoS flow of the first PDU session of the UE;

indicating second type information of the first PDU session and/or at least one QoS flow of the first PDU session of the UE;

indicating a first type of the first radio channel and/or the second radio channel of the UE; or, indicating a second type of the first radio channel and/or the second radio channel of the UE;

where the first type refers to a service type of unicast, broadcast or multicast;

the second type refers to a transmission mode type of unicast, broadcast or multicast.

Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the transceiver is configured to perform at least one of the following:

activating the first radio channel or the second radio channel through an RRC message, MAC CE and/or physical control signaling;

activating the first radio channel and the second radio channel through an RRC message, MAC CE and/or physical control signaling;

activating the first radio channel and deactivating the second radio channel through an RRC message, MAC CE and/or physical control signaling;

simultaneously configuring the first radio channel and/or the second radio channel of the first PDU session or the first radio channel and the second radio channel of at least one QoS flow of the first PDU session, through an RRC message;

configuring the first radio channel and/or the second radio channel of the first PDU session, or the first radio channel or the second radio channel of at least one QoS flow of the first PDU session, through an RRC message;

using an RRC message to configure the first radio channel and/or the second radio channel of the first PDU session, or the first radio channel of at least one QoS flow of the first PDU session, and delete the second radio channel of at least one QoS flow of the first PDU session; or, using an RRC message to configure the first radio channel and/or the second radio channel of the first PDU session, or the second radio channel of at least one QoS flow of the first PDU session, and delete the first radio channel of at least one QoS flow of the first PDU session.

Optionally, the transceiver is configured to obtain a PDCP transmission status report of the first radio channel.

Optionally, the transceiver is configured to, within a preset time period of starting to transmit the second data through the second radio channel, transmit a first PDCP PDU including an IR packet, where the first PDCP PDU is used to carry the second data.

Optionally, the transceiver is configured to transmit a second PDCP PDU configured to carry the second data; where a packet header of the second PDCP PDU includes information for indicating encryption with a new key; or, the second PDCP PDU is packaged using a logical channel identifier corresponding to the second radio channel;

or, the transceiver is configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the transceiver is configured to configure, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or, the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The transceiver is configured to perform at least one of the following:

- the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
- the base station of the second cell informs, the base station of the first cell, of sequence indexes of the next one or more packets to be transmitted and/or sequence indexes of packets still stored in an cache;
- the base station of the second cell informs, the base station of the first cell, of sequence indexes of the next one or more packets to be transmitted and/or sequence indexes of packets still stored in an cache, together with carrying time information corresponding to transmission of the packets;
- according to the received information, the base station of the first cell forwards packets which are out of sync between the first cell and the second cell;
- according to the received information, the base station of the first cell forwards packets which are out of sync between the first cell and the second cell and which are not stored in a cache of the second cell;
- the UE informs, the base station of the second cell, of sequence indexes of data packets successfully received in the first cell, and then the base station of the second cell uses a unicast connection to transmit to the UE, packets which are out of sync between the first cell and the second cell;
- the UE maintains connection with the first cell and the second cell at the same time, and does not interrupt the connection with the first cell until the UE has received, from the first cell, packets which are out of sync between the first cell and the second cell;
- the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;
- after the UE switches to the second cell, the UE continues to maintain the connection with the first cell and does not interrupt the connection with the first cell until the UE finds that packets received in the second cell are continuous or repeated with packets received from the first cell.

Optionally, the transceiver is configured to transmit first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;

- receive the concurrent demand information transmitted by the UE according to the first indication information and/or the second indication information; and
- allocate resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, the processor is configured to determine whether there is a condition or factor for switching between the first radio channel and the second radio channel, where the condition or factor includes at least one of the following:

- the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node;
- in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam;
- the number of data packets that the UE fails to receive is greater than or equal to a certain threshold or the number of data packets that the UE successfully receives is less than or equal to the certain threshold, multicast transmission is switched to unicast transmission; or,
- if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

- the number of participating UEs, channel quality information, status of UE receiving data packets, and selected transmission mode information.

One embodiment of the present disclosure provides a UE, including: a transceiver and a processor;

- wherein the transceiver is configured to receive first configuration information transmitted by a network node;
- the transceiver is configured to, according to the first configuration information, establish and/or configure a first radio channel and/or a second radio channel for a first PDU session, or, establish and/or configure a first radio channel and/or a second radio channel for at least one QoS flow of the first PDU session;

the first radio channel is configured to receive first data transmitted by the network node through the first radio channel;

the second radio channel is configured to receive second data transmitted by the network node through the second radio channel;

the first radio channel is one of a unicast radio channel, a broadcast or multicast radio channel, and the second radio channel is the other one of the unicast radio channel and the broadcast or multicast radio channel;

the first data represents first data of the first PDU session or first data of at least one QoS flow of the first PDU session;

the second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the processor is configured to establish and/or configure at least one of a first SDAP entity, a first PDCP configuration, a first RLC entity, a first MAC entity or a first physical layer, to be corresponding to the first radio channel; establish and/or configure at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

Optionally, the processor is configured to establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second physical configuration corresponding to the second radio channel.

Optionally, the transceiver is configured to, according to the first configuration information, establishing and/or configuring a first radio channel and/or a second radio channel for a first PDU session, or, establishing and/or configuring a first radio channel and/or a second radio channel for at least one QoS flow of the first PDU session, in a manner of at least one of the following:

receiving first type information of the first PDU session and/or at least one QoS flow of the first PDU session of the UE, transmitted by the network;

receiving second type information of the first PDU session and/or at least one QoS flow of the first PDU session of the UE, transmitted by the network;

receiving a first type of the first radio channel and/or the second radio channel of the UE, transmitted by the network; or, receiving a second type of the first radio channel and/or the second radio channel of the UE, transmitted by the network;

where the first type refers to a service type of unicast, broadcast or multicast;

the second type refers to a transmission mode type of unicast, broadcast or multicast.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the transceiver is configured to receive an RRC message, MAC CE and/or physical control signaling, which is transmitted by the network node and is used to activate the first radio channel or the second radio channel, and activate the first radio channel or the second radio channel; or, receive an RRC message, MAC CE and/or physical control signaling, which is transmitted by the network node and is used to activate the first radio channel and the second radio channel, and activate the first radio channel and the second radio channel;

receive an RRC message, MAC CE and/or physical control signaling, which is transmitted by the network node and is used to activate the first radio channel and deactivate the second radio channel, and activate the first radio channel and deactivate the second radio channel;

receive an RRC message which is transmitted by the network node and is used to simultaneously establish and/or configure the first radio channel and/or the second radio channel of the first PDU session, and simultaneously establish and/or configure the first radio channel and/or the second radio channel of the first PDU session;

receive an RRC message which is transmitted by the network node and is used to establish and/or configure the first radio channel or the second radio channel of the first PDU session, and establish and/or configure the first radio channel or the second radio channel of the first PDU session;

receive an RRC message which is transmitted by the network node and is used to establish and/or configure the first radio channel of the first PDU session and delete the second radio channel, and establish and/or configure the first radio channel of the first PDU session and delete the second radio channel;

receive an RRC message which is transmitted by the network node and is used to establish and/or configure the second radio channel of the first PDU session and delete the first radio channel, and establish and/or configure the second radio channel of the first PDU session and delete the first radio channel.

Optionally, the transceiver is configured to transmit a PDCP status report of the first radio channel.

Optionally, the transceiver is configured to, within a preset time period of starting to receive the second data through the second radio channel, receive a first PDCP PDU including an IR packet, where the first PDCP PDU is used to carry the second data.

Optionally, the transceiver is configured to receive a second PDCP PDU configured to carry the second data; where a packet header of the second PDCP PDU includes information for indicating encryption with a new key; or, the second PDCP PDU is packaged using a logical channel identifier corresponding to the second radio channel;

or, when the second radio channel and the first radio channel belong to different cells, before receiving the second data transmitted by the network node to the UE through the second radio channel, the transceiver is further configured to:

receive an end packet transmitted by the network node, where the end packet is used to indicate that data of the first PDU session or data of at least one QoS flow of the first PDU session has been switched from the first radio channel to the second radio channel and is carried by the second radio channel.

One embodiment of the present disclosure provides a network node, including: a transceiver and a processor;

the transceiver is configured to transmit first data to a UE through a first radio channel;

where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

Optionally, the transceiver is configured to configure at least one of a first SDAP configuration, a first PDCP configuration, a first RLC configuration, a first MAC configuration or a first physical configuration corresponding to the first radio channel.

Optionally, bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the transceiver is configured to activate the first radio channel through an RRC message, MAC CE and/or physical control signaling; and/or, deactivate the first radio channel through an RRC message, MAC CE and/or physical control signaling; and/or, configure the first radio channel through an RRC message; or, delete the first radio channel through an RRC message.

Optionally, the transceiver is configured to obtain relevant information of the second radio channel;

where the second radio channel and the first radio channel are corresponding to the same PDU session configuration or at least one QoS flow of the same PDU session, and the second radio channel is on another network radio node.

Optionally, the transceiver is configured to obtain data packet transmission status information of the second radio channel.

Optionally, the transceiver is configured to transmit a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel;

or, the transceiver is configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the transceiver is configured to configure, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The network node further performs at least one of the following:
the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
the base station of the second cell informs, the base station of the first cell, of sequence indexes of the next one or more packets to be transmitted and/or sequence indexes of packets still stored in an cache;
the base station of the second cell informs, the base station of the first cell, of sequence indexes of the next one or more packets to be transmitted and/or sequence indexes of packets still stored in an cache, together with carrying time information corresponding to transmission of the packets;
according to the received information, the base station of the first cell forwards packets which are out of sync between the first cell and the second cell;
according to the received information, the base station of the first cell forwards packets which are out of sync between the first cell and the second cell and which are not stored in a cache of the second cell;
the UE informs, the base station of the second cell, of sequence indexes of data packets successfully received in the first cell, and then the base station of the second cell uses a unicast connection to transmit to the UE, packets which are out of sync between the first cell and the second cell;
the UE maintains connection with the first cell and the second cell at the same time, and does not interrupt the connection with the first cell until the UE has received, from the first cell, packets which are out of sync between the first cell and the second cell;
the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;
after the UE switches to the second cell, the UE continues to maintain the connection with the first cell and does not interrupt the connection with the first cell until the UE finds that packets received in the second cell are continuous or repeated with packets received from the first cell.

One embodiment of the present disclosure provides a network node, including: a transceiver and a processor;
wherein the transceiver is configured to establish two or more protocol data unit (PDU) sessions for a second service;
wherein a first PDU session is used to transmit third data of the second service to a UE;
a second PDU session is used to transmit fourth data of the second service to the UE;
the second service is a broadcast or multicast service;
the first PDU session is one of a unicast PDU session and a broadcast or multicast PDU session; and the second PDU session is the other one of the unicast PDU session and the broadcast or multicast PDU session;
the unicast PDU session is separately established for all or part of UE which receive the second service.

Optionally, the fourth data is the same as the third data, or the fourth data is a subset of the third data, or,
the fourth data and the third data have no intersection, or, the fourth data is partially the same as the third data.

Optionally, the network node includes a core network; and the processor is configured to determine a UE in a broadcast or multicast group, which uses a multicast PDU session established for broadcast or multicast services to receive data, and a UE which uses a unicast PDU session established for broadcast or multicast services to receive data; and/or,
determine, in a broadcast or multicast service, data received by using the broadcast or multicast PDU session of the broadcast or multicast service, data received by using the unicast PDU session; and/or,
determine, some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network; and the transceiver is configured to inform the UE of relationship between the first PDU session and the second PDU session;
  inform the UE and the base station respectively of relationship between the first PDU session and the second PDU session, when the core network configures a broadcast or multicast PDU session and a unicast PDU session of the same broadcast or multicast service for the UE to receive data; or,
  inform a base station of relationship between the first PDU session and the second PDU session, so that the base station informs the UE of the relationship between the first PDU session and the second PDU session; or,
  inform a base station of relationship between the first PDU session and the second PDU session; or, inform the UE of relationship between the first PDU session and the second PDU session.

Optionally, the network node includes a core network, and the transceiver is configured to inform the UE of a reception mode of the first PDU session and the second PDU session.

The processor is configured to determine some or all UEs in a broadcast or multicast group, which can not only use a broadcast or multicast PDU session established for a broadcast or multicast service to receive data, but also use a unicast PDU session established for the broadcast or multicast service to receive data;
  where the data received by the UE from the broadcast or multicast PDU session established for the broadcast or multicast service and the data received by the UE from the unicast PDU session established for the broadcast or multicast service may be simultaneous or time-sharing.

Optionally, the network node includes a core network; and the processor is configured to, according to quality requirements of a service, and/or arrival characteristics of the service, and/or new radio channel, select for the UE, a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

Optionally, the network node includes a core network; and the transceiver is configured to inform a base station of a PDU session type selected for the UE to receive broadcast or multicast services, so that the base station informs the UE of the PDU session type which is selected by the network node for the UE to receive broadcast or multicast service; or,
  inform a base station of specific time and a PDU session type selected for the UE to receive broadcast or multicast services, so that the base station informs the UE of the specific time and the PDU session type which is selected by the network node for the UE to receive broadcast or multicast service; or,
  inform a base station of a PDU session type selected for the UE to receive broadcast or multicast services; or, inform the UE of a PDU session type selected for the UE to receive broadcast or multicast services; or,
  inform a base station of specific time and a PDU session type selected for the UE to receive broadcast or multicast services; or, inform the UE of specific time and a PDU session type selected for the UE to receive broadcast or multicast services.

Optionally, the transceiver is configured to establish a broadcast or multicast PDU session and a unicast PDU session for the same broadcast or multicast service, for a UE to receive data; and use signaling or a special data packet to activate a to-be-used broadcast or multicast PDU session and/or unicast PDU session established for the same broadcast or multicast service;
  and/or,
  the transceiver is configured to use signaling or a special data packet to deactivate the broadcast or multicast PDU session and/or unicast PDU session established for the same broadcast or multicast service;
  where the network node may be a node on core network side and/or radio access network side.

Optionally, the transceiver is configured to transmit the broadcast or multicast PDU session established for the broadcast or multicast service at the network node on the radio access network side, to the UE by using a point-to-point (PTP) and/or point-to-multipoint (PTM) transmission mode; or,
  receive a PDU session type reported by the UE, where the PDU session type is determined by the UE itself for receiving the multicast service according to quality requirements of a service, and/or arrival characteristics of the service, and/or new radio channel.

One embodiment of the present disclosure provides a UE, including a transceiver and a processor;
  wherein the transceiver is configured to receive second configuration information transmitted by a network node;
  the transceiver is configured to establish two or more PDU sessions for the second service according to the second configuration information;
  a first PDU session is used to transmit third data of the second service to a UE;
  a second PDU session is used to transmit fourth data of the second service to the UE;
  the second service is a broadcast or multicast service;
  the first PDU session is one of a unicast PDU session and a broadcast or multicast PDU session; and the second PDU session is the other one of the unicast PDU session and the broadcast or multicast PDU session;
  the unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

One embodiment of the present disclosure provides a network node, including: a transceiver and a processor; wherein the transceiver is configured to transmit PDSCH to a UE; wherein the PDSCH includes a first transport block and a second transport block, the first transport block is used to transmit data of a unicast service, and the second transport block is used to transmit data of a broadcast or multicast service data.

Optionally, the transceiver is configured to transmit first information to the UE, where the first information is used to determine a first HARQ feedback resource and a second HARQ feedback resource; and/or,
  transmit second information to the UE, where the second information is used to determine a first slot interval and a second slot interval;
  where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a UE, including: a transceiver and a processor; wherein the transceiver is configured to receive PDSCH transmitted by a network node, wherein the PDSCH includes a first transport block and a second transport block, the first transport block is used to transmit data of a unicast service, and the second transport block is used to transmit data of a broadcast or multicast service.

Optionally, the transceiver is configured to receive first information transmitted by the network node, where the first information is used to determine a first HARQ feedback resource and a second HARQ feedback resource; and/or, receive second information transmitted by the network node, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

One embodiment of the present disclosure provides a network node, including a transceiver and a processor; wherein the transceiver is configured to transmit data of a unicast service to a UE through a first BWP, and transmit data of a broadcast or multicast service to the UE through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the transceiver is configured to, in case that the second BWP is a BWP that has an association relationship with the initial BWP, transmit a system message including third information;

where the third information is used to indicate the association relationship between the second BWP and the initial BWP.

One embodiment of the present disclosure provides a UE, including: a transceiver and a processor; wherein the transceiver is configured to receive data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the transceiver is configured to receive a system message including the third information;

where the third information is used to indicate an association relationship between the second BWP and the initial BWP.

One embodiment of the present disclosure provides a UE, including: a processor, a memory, and a program stored on the memory and executable on the processor; wherein the processor executes the program to implement steps of the data transmission method performed by the UE.

One embodiment of the present disclosure provides a network node, including: a processor, a memory, and a program stored on the memory and executable on the processor; wherein the processor executes the program to implement steps of the data transmission method performed by the network node.

One embodiment of the present disclosure provides a readable storage medium, including a program is stored thereon; wherein the program is executed by a processor to implements the steps of the data transmission method.

The beneficial effects of the above technical solution of the embodiment of the present disclosure are as follows.

In the embodiment of the present disclosure, a flexible technology for using unicast and broadcast or multicast is provided, that is, transmission mode of multicast or broadcast service may be switched from broadcast or multicast to unicast, or may be switched from unicast to broadcast or multicast. Data of the same service may also be transmitted simultaneously through unicast and broadcast or multicast.

BRIEF DESCRIPTION OF THE DRAWINGS

FIG. 14 is a schematic diagram of establishing multiple radio channels;

FIG. 15 is a schematic flowchart of a data transmission method according to an embodiment of the present disclosure;

FIG. 16 is a schematic flowchart of a data transmission method according to an embodiment of the present disclosure;

FIG. 19 is a schematic flowchart of a data transmission method according to an embodiment of the present disclosure;

FIG. 20 is a schematic diagram of a network node according to an embodiment of the present disclosure;

FIG. 21 is a schematic diagram of a terminal according to an embodiment of the present disclosure;

FIG. 21a is a schematic diagram of a network node according to an embodiment of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Related technical requirements include: specifying, for UEs in RRC connected, basic functions of radio access network (RAN) for broadcast/multicast; specifying group scheduling mechanism to allow UEs to receive broadcast/multicast services; and this goal includes specifying necessary enhancements required to achieve simultaneous operation with unicast reception. In order to achieve this goal, the present disclosure provides the following embodiments.

Figures 1, 2:
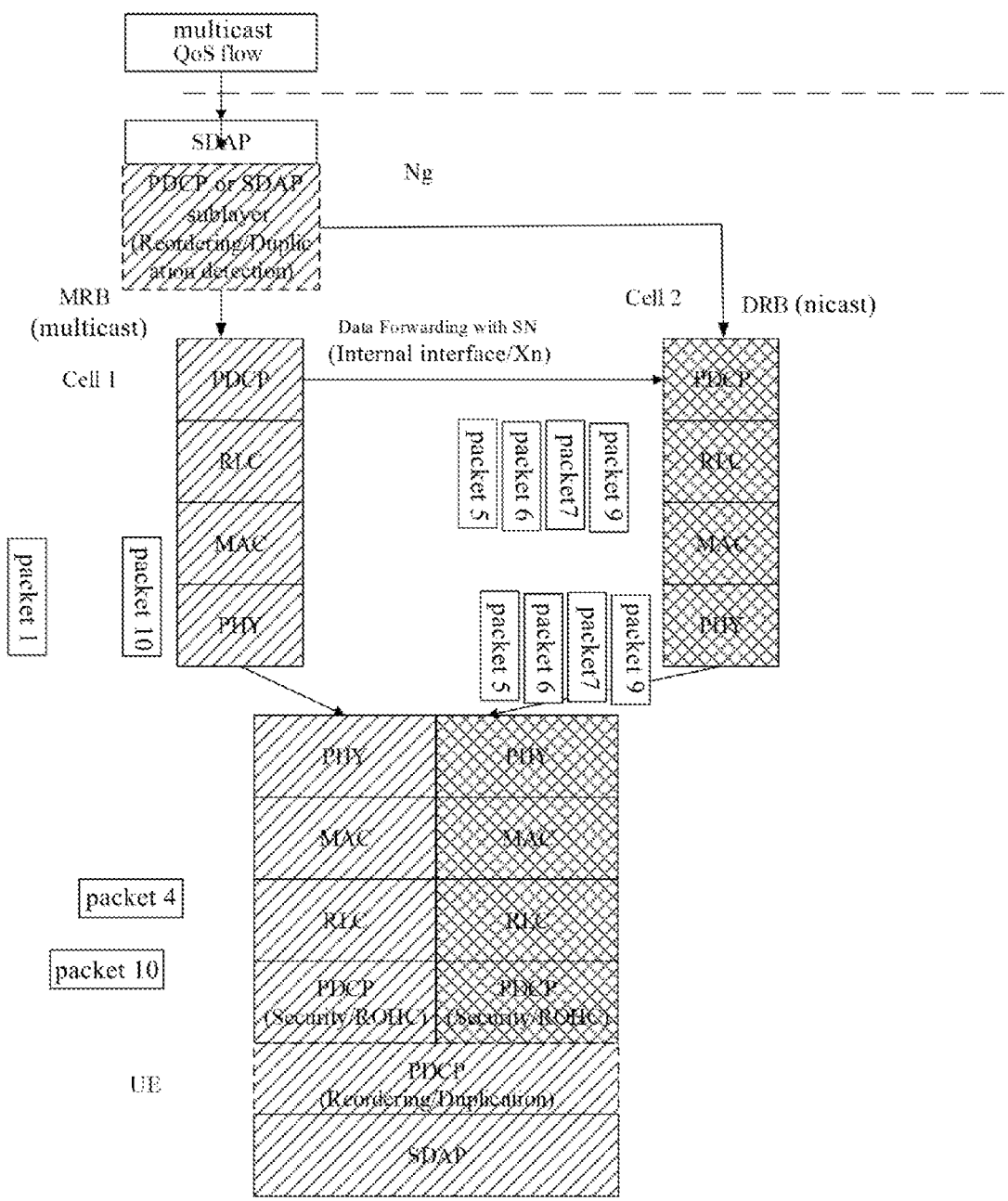
FIG. 1 is a schematic flowchart of a data transmission method according to an embodiment of the present disclosure.
FIG. 2 is a schematic diagram of a cross-cell scenario of handover/dual connectivity according to an embodiment of the present disclosure.

Referring to FIG. 1, FIG. 1 is a schematic flowchart of a data transmission method according to an embodiment of the present disclosure. The method is performed by a network node and includes the following steps.

The network node in the specification of the present disclosure includes at least one of the following: a base station, a centralized unit (CU), a distribution unit (DU), a relay, an integrated access and backhaul (IAB), a remote radio unit (RRU), a building baseband unit (BBU), a multicast coordinating entity (MCE), a broadcast multicast-service center (BM-SC) or a core network.

Step 11: configuring a first radio channel and/or a second radio channel for a first PDU session, or configuring a first radio channel and/or a second radio channel for at least one same QoS flow of a first PDU session.

The first radio channel is configured to transmit first data to the UE.

The second radio channel is configured to transmit second data to the UE.

The first radio channel is one of a unicast radio channel, a broadcast or multicast radio channel, and the second radio channel is the other one of the unicast radio channel and the broadcast or multicast radio channel.

The network node may be the same network node, or may be different network nodes. When the second radio channel and the first radio channel belong to different cells, the network nodes corresponding to the different cells may be different.

The first data represents first data of the first PDU session or first data of at least one QoS flow of the first PDU session.

The second data represents second data of the first PDU session or second data of at least one QoS flow of the first PDU session.

Optionally, the second radio channel and the first radio channel belong to the same cell or different cells.

Figure 18:
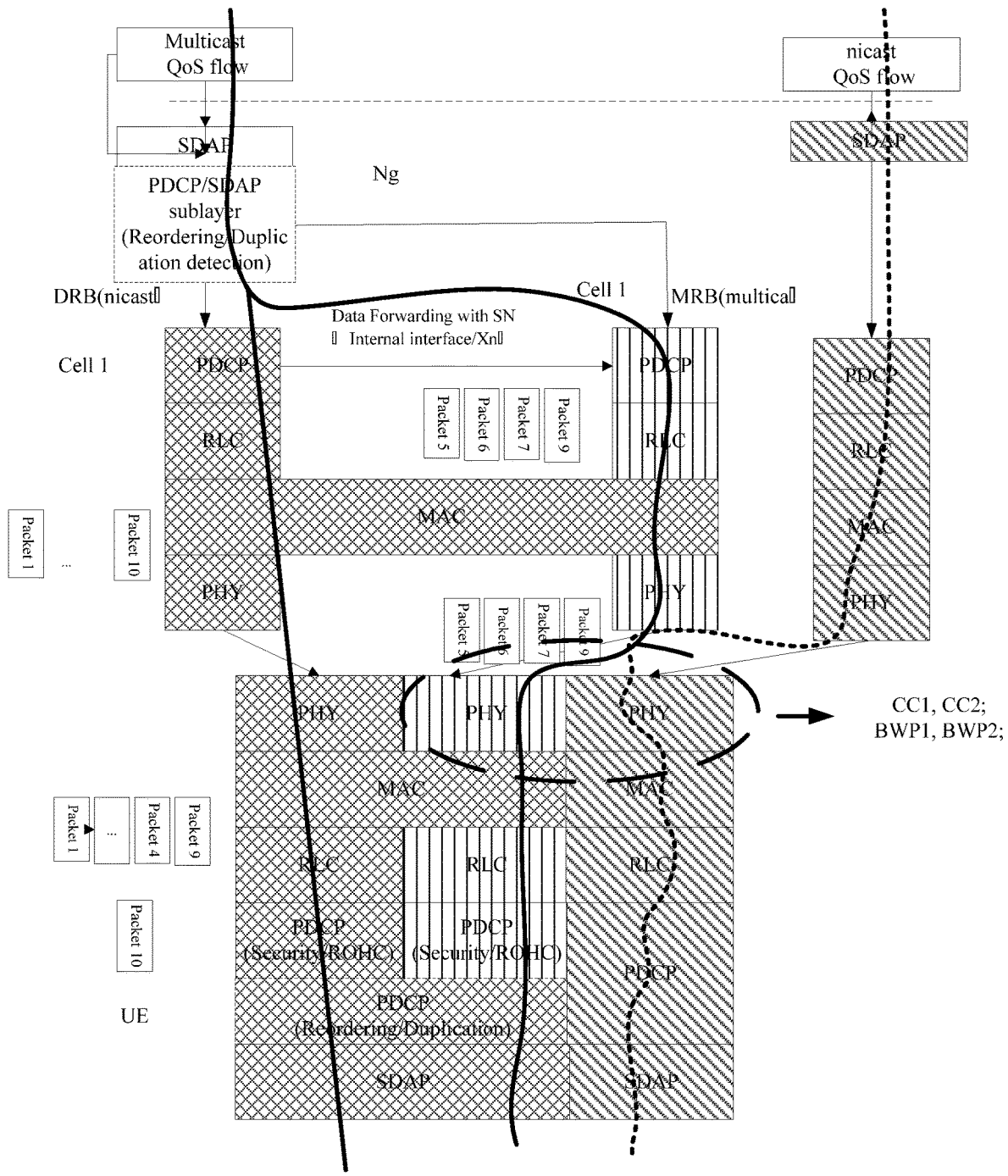
FIG. 18 shows simultaneous existence and flexible switching of unicast mode and broadcast or multicast.

In this embodiment of the present disclosure, referring to FIG. 18, transmission of the first data to the UE through the first radio channel and transmission of the second data to the UE through the second radio channel may be performed simultaneously or not simultaneously, for example, firstly transmitting the first data to the UE through the first radio channel and then switching to transmitting the second data to the UE through the second radio channel. That is, transmission of the data of the first PDU session or transmission of the data of at least one QoS flow of the first PDU session, may be switched from unicast to broadcast or multicast, or may be switched from broadcast or multicast to unicast. When the first data is transmitted to the UE through the first radio channel and the second data is transmitted to the UE through the second radio channel at the same time, the first data and the second data may be the same, that is, the data of the same first PDU session or the data of at least one QoS flow of the same first PDU session, may be transmitted simultaneously through unicast and broadcast or multicast.

In the embodiment of the present disclosure, a flexible technology for using unicast and broadcast or multicast is provided, that is, transmission mode of multicast or broadcast service may be switched from broadcast or multicast to unicast, or may be switched from unicast to broadcast or multicast. Data of the same service may also be transmitted simultaneously through unicast and broadcast or multicast.

The data of the same service refers to the data of the same first PDU session or the data of at least one QoS flow of the same first PDU session.

Specifically, in the related art, the service data adaption protocol (SDAP) layer is responsible for mapping QoS flows to corresponding radio channels, and one or more QoS flows may be mapped to the same radio channel, but one QoS flow can only be mapped to one radio channel. In the embodiment of the present disclosure, one broadcast or multicast service (i.e., the first PDU session or at least one QoS flow of the first PDU session) may be mapped to two radio channels (one unicast and one multicast or broadcast), or mapped to more than two radio channels, thereby realizing flexible switching of broadcast or multicast services between unicast and broadcast or multicast. Further, the method is not only applicable to a scenario in a cell (i.e., switching between two modes including unicast and broadcast or multicast, in the same cell), but also to a scenario of cell handover and dual connectivity (i.e., switching between two modes including unicast and broadcast or multicast, in different cells, such as unicast in one cell and broadcast or multicast in another cell).

In the present disclosure, switching of the first channel and the second channel and whether they are used together, may be determined by at least one node of the base station, the centralized unit (CU), the distribution unit (DU), the multicast coordinating entity (MCE), the multicast control entity (MCoE), the broadcast multicast-service center (BM-SC), the core network or the UE.

Optionally, the second data is the same as the first data, or the second data is a subset of the first data, or, the second data and the first data have no intersection, or, the second data is partially the same as the first data.

In the embodiment of the present disclosure, the second data being the same as the first data means that the network node enables simultaneous transmission of the first data and the second data which is the same as the first data, through the first radio channel and the second radio channel. The second data being a subset of the first data, optionally, means that the network side enables the first data transmitted through the first radio channel to be data transmitted by multicast, and the second data transmitted through the second radio channel to be data transmitted by multicast. The second data and the first data having no intersection means that the network node switches from transmission of the first data to the UE through the first radio channel to transmission of the second data to the UE through the second radio channel, that is, after transmission of the first data to the UE through the second radio channel is enabled, the first data will not be transmitted to the UE through the first radio channel; or, means that the network node enables simultaneous transmission of the first data and the second data which is different from the first data, through the first radio channel and the second radio channel. The second data being partially the same as the first data means that after transmission of data of a first service to the UE through the second radio channel is enabled, part of data that has been transmitted through the first radio channel will be transmitted repeatedly to avoid data loss, or means that after transmission of the second data to the UE through the second radio channel is enabled, the first data is continuously transmitted to the UE through the first radio channel for a period of time, and then the first radio channel will be deactivated.

Optionally, the configuring a first radio channel and/or a second radio channel for a first PDU session, or configuring a first radio channel and/or a second radio channel for at least one same QoS flow of a first PDU session, includes:

configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel;

where at least the first physical configuration is different from the second physical configuration.

That is, the first radio channel is corresponding to at least one of the first SDAP layer, the first PDCP layer, the first RLC layer, the first MAC layer or the first physical layer; the second radio channel is corresponding to at least one of the second SDAP layer, the second PDCP layer, the second RLC layer, the second MAC layer or the second physical layer.

In case that the second radio channel and the first radio channel belong to the same cell, at least configurations of the first physical layer and the second physical layer are different.

The first radio channel and the second radio channel share one radio bearer or two independent radio bearers.

In other words, the second SDAP layer may be shared with the first SDAP layer, the second PDCP layer may be shared with the first PDCP layer, the second RLC layer may be shared with the first RLC layer, and the second MAC layer may be shared with the first MAC layer. In other words, the first radio channel and the second radio channel may be corresponding to the same SDAP layer, the first radio channel and the second radio channel may be corresponding to the same PDCP layer, the first radio channel and the second radio channel may be corresponding to the same RLC layer, and the first radio channel and the second radio channel may be corresponding to the same MAC layer.

Figure 4:
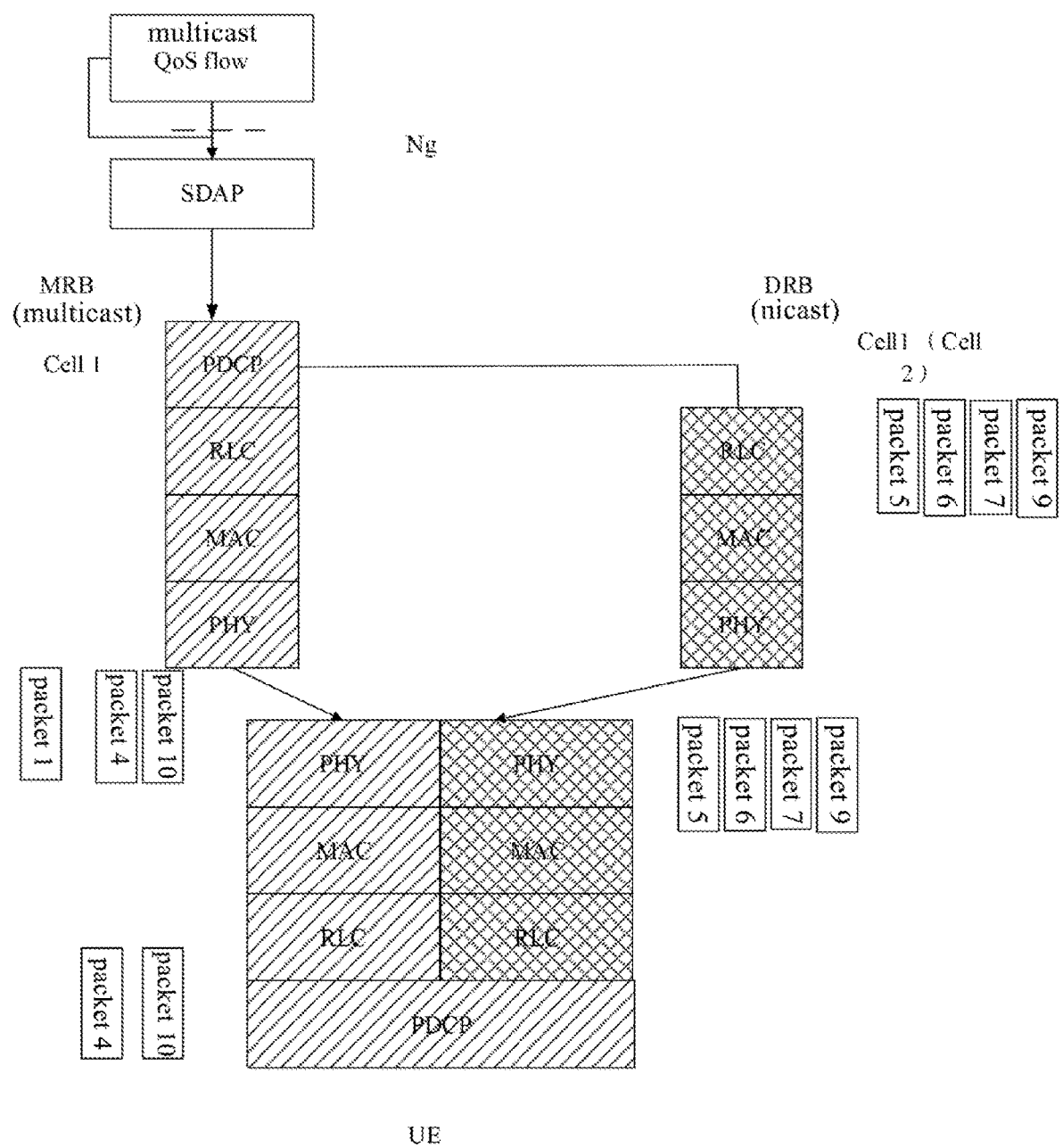
FIG. 4 is a schematic diagram of a cross-cell scenario of handover/dual connectivity according to an embodiment of the present disclosure.
Figure 6:
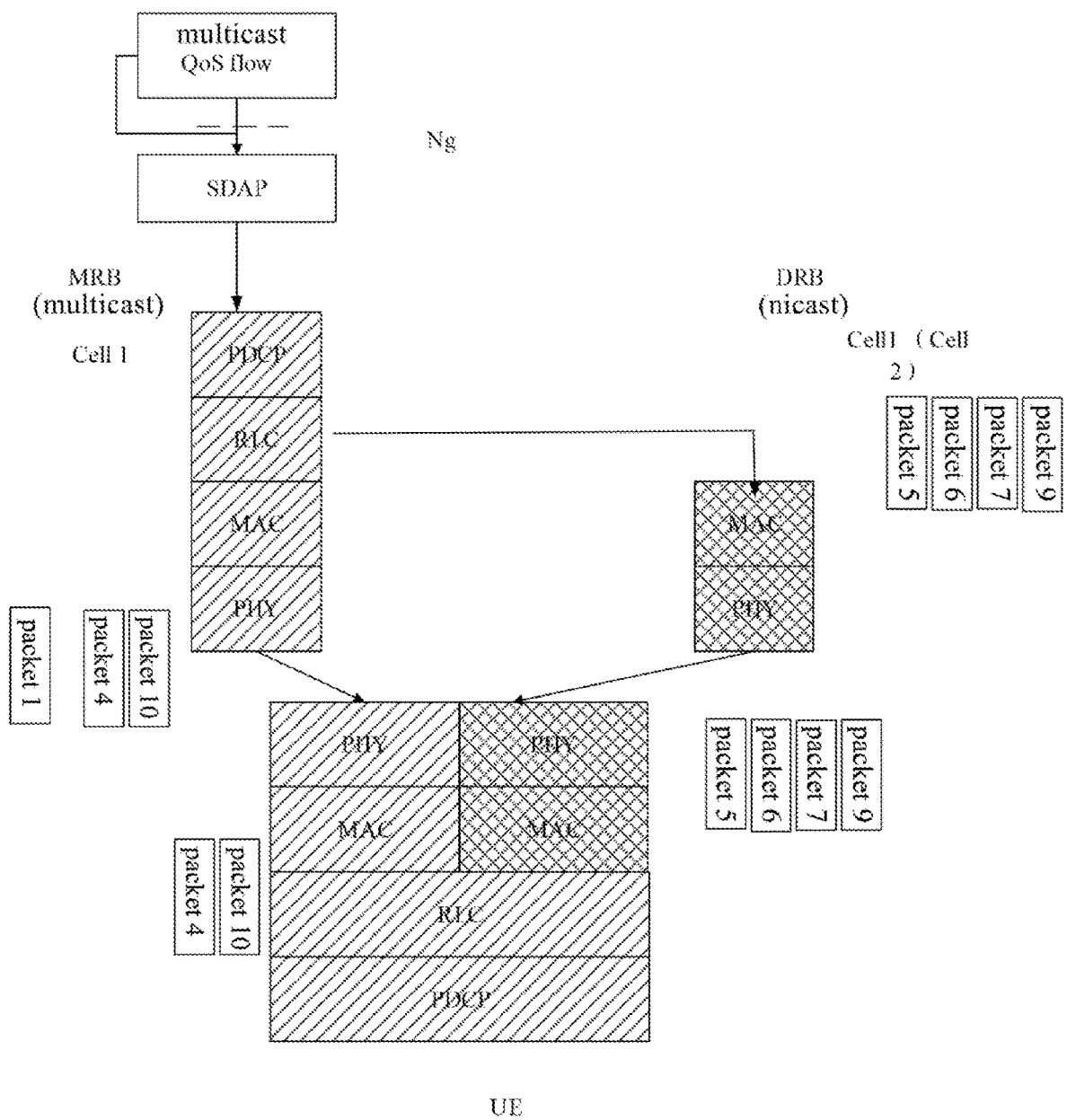
FIG. 6 is a schematic diagram of a cross-cell scenario of handover/dual connectivity according to an embodiment of the present disclosure.
Figure 7:
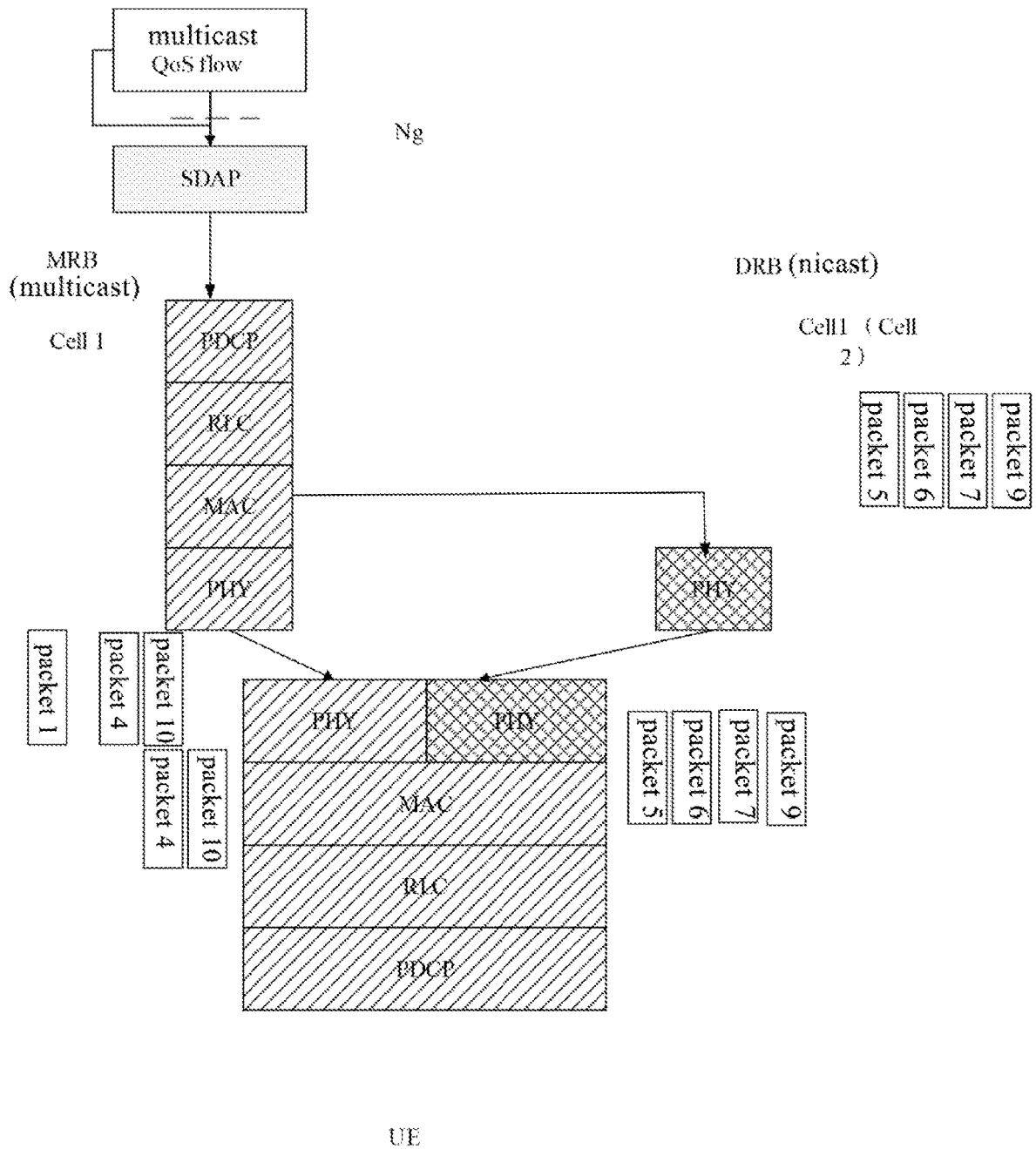
FIG. 7 is a schematic diagram of a cross-cell scenario of handover/dual connectivity according to an embodiment of the present disclosure.

FIG. 2 shows a cross-cell scenario of handover/dual connectivity. FIG. 4 shows another cross-cell scenario of handover/dual connectivity. FIG. 6 shows a third cross-cell scenario of handover/dual connectivity. FIG. 7 shows a fourth cross-cell scenario of handover/dual connectivity.

Figure 3:
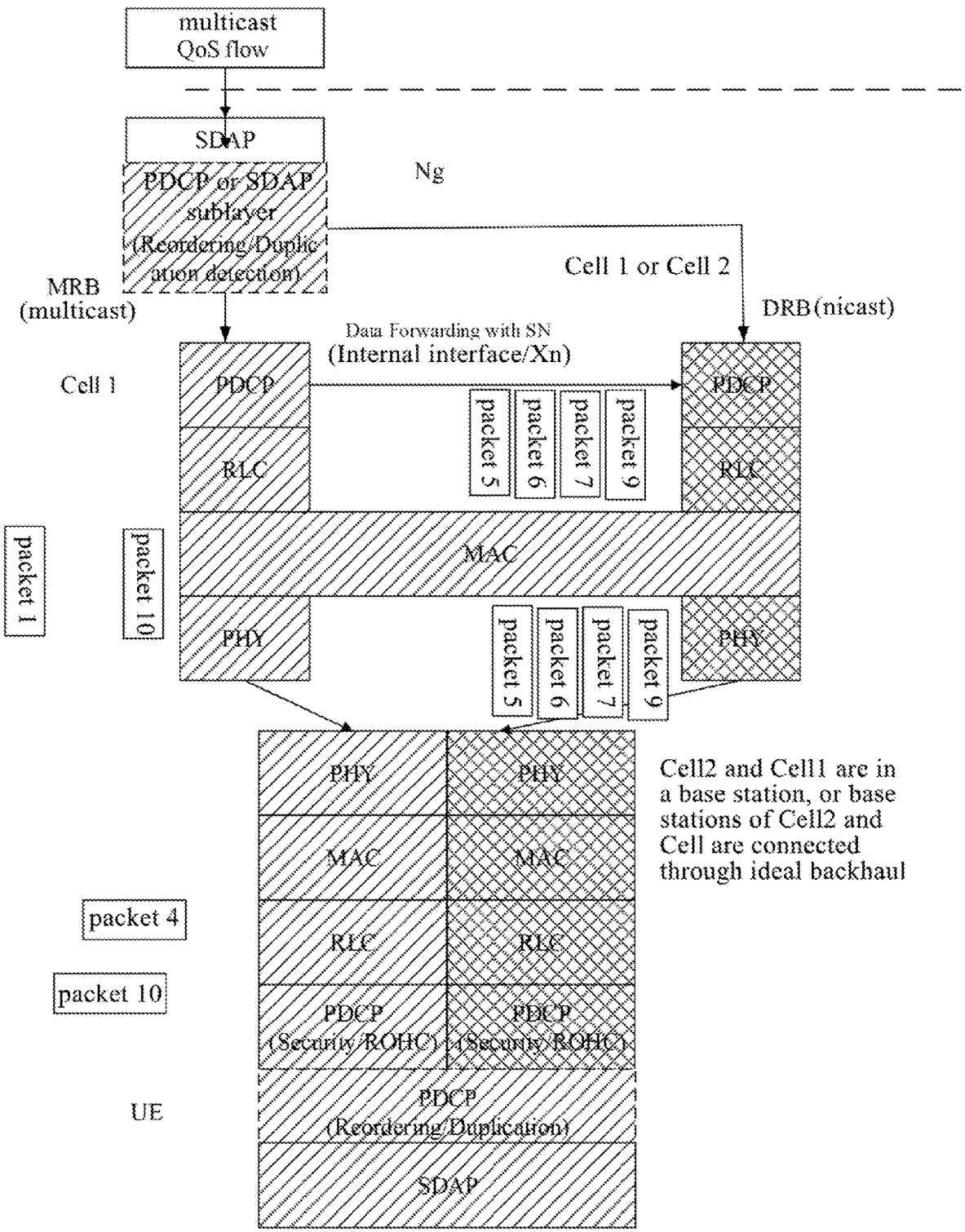
FIG. 3 is a schematic diagram of a scenario in a cell, or a scenario where Cell2 and Cell1 are in a base station, or a scenario where base stations of Cell2 and Cell1 are connected through ideal backhaul.
Figure 5:
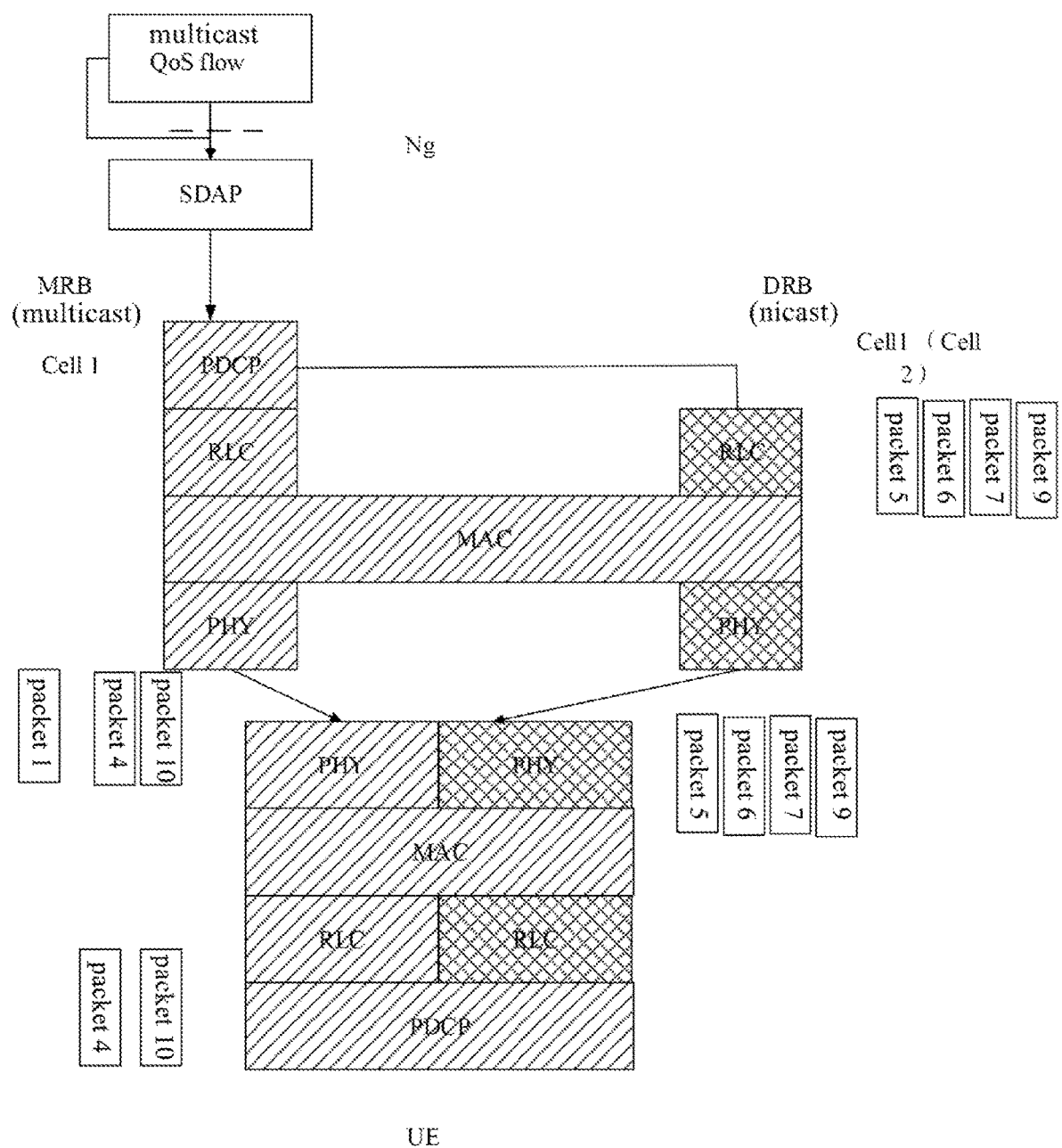
FIG. 5 is a schematic diagram of a scenario in a cell, or a scenario where Cell2 and Cell1 are in a base station, or a scenario where base stations of Cell2 and Cell1 are connected through ideal backhaul.

As shown in FIG. 3 and FIG. 5, when performing flexible switching between two modes including unicast and multicast for a broadcast or multicast services in a cell (for example, both are cell 1), and/or in different cells of the same base station (Cell2 and Cell1 are in a base station), and/or in different cells of different base stations which are connected through ideal backhaul, the two radio channels share one MAC entity.

Optionally, the configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel, includes:
  configuring the first SDAP configuration, the first PDCP configuration, the first RLC configuration, the first MAC configuration and the first physical configuration corresponding to the first radio channel, and configuring the second PDCP configuration, the second RLC configuration, the second MAC configuration and the second physical configuration corresponding to the second radio channel; or,
  configuring the first SDAP configuration, the first PDCP configuration, the first RLC configuration, the first MAC configuration and the first physical configuration corresponding to the first radio channel, and configuring the second PDCP configuration, the second RLC configuration and the second physical configuration corresponding to the second radio channel; or,
  configuring the first SDAP configuration, the first PDCP configuration, the first RLC configuration, the first MAC configuration and the first physical configuration corresponding to the first radio channel, and configuring the second RLC configuration, the second MAC configuration and the second physical configuration corresponding to the second radio channel; or,
  configuring the first SDAP configuration, the first PDCP configuration, the first RLC configuration, the first MAC configuration and the first physical configuration corresponding to the first radio channel, and configuring the second RLC configuration and the second physical configuration corresponding to the second radio channel; or,
  configuring the first SDAP configuration, the first PDCP configuration, the first RLC configuration, the first MAC configuration and the first physical configuration corresponding to the first radio channel, and configuring the second MAC configuration and the second physical configuration corresponding to the second radio channel; or,
  configuring the first SDAP configuration, the first PDCP configuration, the first RLC configuration, the first MAC configuration and the first physical configuration corresponding to the first radio channel, and configuring the second physical configuration corresponding to the second radio channel.

Optionally, the configuring a first radio channel and/or a second radio channel for a first PDU session, or configuring a first radio channel and/or a second radio channel for at least one same QoS flow of a first PDU session, includes at least one of the following:
  indicating first type information of the first PDU session and/or at least one QoS flow of the first PDU session of the UE;
  indicating second type information of the first PDU session and/or at least one QoS flow of the first PDU session of the UE;
  indicating a first type of the first radio channel and/or the second radio channel of the UE; or,
  indicating a second type of the first radio channel and/or the second radio channel of the UE;
  where the first type refers to a service type of unicast, broadcast or multicast;
  the second type refers to a transmission mode type of unicast, broadcast or multicast.

In the embodiment of the present disclosure, one broadcast or multicast service (i.e., one PDU session or at least one QoS flow of one PDU session) can be mapped to two radio channels (one unicast and one multicast), that is, one broadcast or one multicast service is corresponding to two separate sets of protocol function sets or subsets (i.e., all or subsets of SDAP, PDCP, RLC, MAC and physical layer). The two separate sets of protocol function sets or subsets are corresponding to unicast configuration and broadcast or multicast configuration, respectively. The first radio channel and the second radio channel share one radio bearer or are two independent radio bearers. Of course, protocol stacks from the SDAP layer to the physical layer broadcasted or multicast by the network side (i.e., a base station side), are shared by UEs in a broadcast or multicast group Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.

In the embodiment of the present disclosure, in case that the second radio channel and the first radio channel belong to the same cell and/or different cells of the same network node, or, in other words, in case that the first service is in the same cell and/or different cells of the same base station, if there are two separate PDCP layers, the relevant parameters of the two PDCP layers are the same.

Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.

In the embodiment of the present disclosure, the relevant parameters of the PDCP layer of the unicast radio channel corresponding to each UE in the broadcast or multicast group corresponding to the first service, are the same.

Specifically, in case that the first service is in the same cell and/or different cells of the same base station, the relevant parameters of the PDCP layer of the unicast radio channel corresponding to each UE in the broadcast or multicast group corresponding to the first service, are the same.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

In other words, the initial BWP may be the initial downlink BWP broadcast in SIB1, and/or, the initial downlink BWP in the serving cell configuration, and/or, the initial BWP corresponding to coreset 0.

The first BWP may be used when the UE is in a connected state, and the second BWP may be used when the UE is in an idle state or an inactive state.

In the embodiment of the present disclosure, when configuring BWP resources of the radio channel in the broadcast or multicast transmission mode, in addition to configuring dedicated BWP resources, resources corresponding to the first service may also be preconfigured on the initial BWP at the same time. Therefore, when the UE changes from the connected state to the idle state or the inactive state, the UE can directly, seamlessly and automatically start using the radio channel on the initial BWP, thereby reducing service interruption time. Or, when configuring BWP resources of the radio channel in the broadcast or multicast transmission mode, the radio channel in the broadcast or multicast mode is configured in the initial BWP, and resources that the UE can use in the idle state, are indicated, so that when the UE changes from the connected state to the idle/inactive state, the UE can continue to use the radio channel on the initial BWP according to an instruction, thereby reducing the service interruption time.

Optionally, the method further includes at least one of the following:
activating the first radio channel or the second radio channel through an RRC message, MAC CE and/or physical control signaling;
activating the first radio channel and the second radio channel through an RRC message, MAC CE and/or physical control signaling;
activating the first radio channel and deactivating the second radio channel through an RRC message, MAC CE and/or physical control signaling;
simultaneously configuring the first radio channel and/or the second radio channel of the first PDU session or the first radio channel and the second radio channel of at least one QoS flow of the first PDU session, through an RRC message;
configuring the first radio channel and/or the second radio channel of the first PDU session, or the first radio channel or the second radio channel of at least one QoS flow of the first PDU session, through an RRC message;
using an RRC message to configure the first radio channel and/or the second radio channel of the first PDU session, or the first radio channel of at least one QoS flow of the first PDU session, and delete the second radio channel of at least one QoS flow of the first PDU session; or,
using an RRC message to configure the first radio channel and/or the second radio channel of the first PDU session, or the second radio channel of at least one QoS flow of the first PDU session, and delete the first radio channel of at least one QoS flow of the first PDU session.

In the embodiment of the present disclosure, the first radio channel and/or the second radio channel may be configured through an RRC message, and the first radio channel and/or the second radio channel may be deleted through an RRC message.

In addition, in the embodiment of the present disclosure, the first radio channel and/or the second radio channel may be activated, and the first radio channel and/or the second radio channel may be deactivated. When both the first radio channel and the second radio channel are activated, the first radio channel and the second radio channel can be used to transmit data of the first service at the same time; that is, the data of the first service can be simultaneously transmitted through unicast and broadcast or multicast.

Specifically, the radio channel may be activated or deactivated through an RRC message, MAC CE and/or physical control signaling.

Optionally, before transmitting the second data to the UE through the second radio channel, the method further includes:
obtaining a PDCP transmission status report of the first radio channel.

This embodiment of the present disclosure may be applicable to the case where the second radio channel and the first radio channel belong to the same cell.

In the embodiment of the present disclosure, when the second radio channel (new link) is activated, even if data forwarding of an old link (the first radio channel) is in unacknowledged mode (UM) mode, PDCP of the old link still transmits a status report to PDCP of the new link, which can avoid packet loss and avoid transmitting duplicate downlink data packets.

In the related art, when switching between two different radio channels, a status variable of PDCP on the new radio channel needs to be counted from zero. In the present disclosure, it is designed that when activating from the old radio channel to the new radio channel, that is, when the new link is activated, if a key is not changed, the status variable of the PDCP on the new radio channel needs to maintain a latest value of the status variable of the PDCP on the old radio channel. That is, two PDCP entities need to exchange the latest status variable values.

Optionally, transmitting the second data to the UE through the second radio channel, includes:
within a preset time period of starting to transmit the second data through the second radio channel, transmitting a first PDCP PDU including an IR packet, where the first PDCP PDU is used to carry the second data.

In the embodiment of the present disclosure, during an activation transition period, an activated PDCP needs to transmit a PDCP PDU including a data packet with complete header compression information, thereby avoiding header compression failure. The IR packet is an initialization-and-refresh-state packet.

Specifically, in case that the first service is in different cells of different base stations, or, in other words, the first radio channel and the second radio channel belong to different cells of different base stations, for example, a target cell and a serving cell in a handover procedure, two different cells of dual connectivity, or, in other words, a broadcast or multicast service (two or more radio channels (one unicast and one multicast or broadcast) mapped by a broadcast or multicast QoS flow) are in different cells, respectively, it is an independent robust header compression (ROHC) and context, and header compression synchronization is achieved by transmitting IR information.

Optionally, transmitting the second data to the UE through the second radio channel, includes:
transmitting a second PDCP PDU configured to carry the second data; where a packet header of the second PDCP PDU includes information for indicating encryption with a new key; or, the second PDCP PDU is packaged using a logical channel identifier corresponding to the second radio channel;
or,
when the second radio channel and the first radio channel belong to different cells, before transmitting the second data to the UE through the second radio channel, the method further includes:
transmitting an end packet to the UE, where the end packet is used to indicate that data of the first PDU session or data of at least one QoS flow of the first PDU session has been switched from the first radio channel to the second radio channel and is carried by the second radio channel.

In the embodiment of the present disclosure, if transmission modes of unicast, broadcast or multicast have changed in the procedure of cell handover between CUs or base stations, the keys are changed. In order to avoid the problem of key confusion, an indication may be added in the header of the PDCP PDU to inform the UE whether the packet is encrypted with the new key or the old key; or, packets of different security contexts are packaged with different logical channel identifiers; or, an end packet is transmitted to the new radio channel on the old radio channel, so that the UE can distinguish data packets of the radio channel using the new security context later.

Optionally, the method further includes:
configuring, at the network node, synchronization function entity.
The synchronization function entity is configured for:
transmitting and/or interacting, through signaling, time information associated with data packet transmission; and/or,
adding time information associated with data packet transmission into a data packet;
where the time information may be absolute and/or relative time information; or information of a system frame number (SFN), a subframe, a slot, a mini-slot and/or a time symbol.
That is, functions of the synchronization function entity include:

transmitting and/or interacting, through signaling, time information associated with packet transmission; and/or,
adding time information associated with packet transmission into a data packet;
where the time information may be absolute and/or relative time information; or information of a system frame number (SFN), a subframe, a slot, a mini-slot and/or a time symbol.

In other words, the time information may be at least one of absolute time information, relative time information, SFN information, subframe information, slot information, mini-slot information, or time symbol information.

In the embodiments of the present disclosure, when performing simultaneous reception or switching of unicast and broadcast or multicast across network nodes such as CU, DU or base station (gNB), the synchronization function entity is introduced in the network node such as CU or base station (gNB), so that synchronization of data packet transmission is carried out by transmitting and/or interacting, through signaling, time information associated with packet transmission, and/or, adding time information associated with packet transmission into a data packet. In this way, the out-of-sync problem of data packet transmission of two base stations can be solved.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

In the embodiment of the present disclosure, the synchronization function entity can be used not only to synchronize data packet transmission between the core network and network nodes, but also to synchronize data packet transmission between the application layer and network nodes. The synchronization function entity can also be used to synchronize data packet transmission between network nodes.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

That is to say, the time information may be transmitted together with data in a data packet, or may be transmitted separately in a data packet.

The time information is used for synchronization of data transmission, and thus the time information may also be referred as synchronization time information.

Optionally, the time information is transmitted by MCE to a distribute unit (DU); and/or,
the time information is information converted by MCE into SFN, subframe, slot, mini-slot and/or time symbol for scheduling.

Optionally, the time information is transmitted by a centralized unit (CU) to a distributed unit (DU); and/or, the time information is information converted by the CU into SFN, subframe, slot, mini-slot and/or time symbol for scheduling.

In this embodiment of the present disclosure, for the CU scenario, if the time information may be absolute and/or relative time information, the CU needs to transmit the time information to the DU, and/or convert the time information into SFN, subframe, slot, mini-slot and/or time symbol information (such as start time information, and/or duration time information) for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

In this embodiment of the present disclosure, the node such as a CU, a DU or a base station (gNB), after receiving the user data frame, parses out the time information associated with packet transmission added in the data packet, and/or, parses out the time information associated with packet transmission transmitted and/or interacted in the signaling.

The synchronization function entity can then check whether a received frame header is consistent with a value of a packet counter.

Then, the network node may use the time information to schedule the user data or perform scheduling in the MTCH scheduling cycle.

Optionally, the network node includes a base station of a first cell and a base station of a second cell. The first cell is a cell to which the first radio channel belongs, and the second cell is a cell to which the second radio channel belongs. The method further includes at least one of the following:

the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;

the base station of the second cell informs, the base station of the first cell, of sequence indexes of the next one or more packets to be transmitted and/or sequence indexes of packets still stored in an cache;

the base station of the second cell informs, the base station of the first cell, of sequence indexes of the next one or more packets to be transmitted and/or sequence indexes of packets still stored in an cache, together with carrying time information corresponding to transmission of the packets;

according to the received information, the base station of the first cell forwards packets which are out of sync between the first cell and the second cell;

according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

When the UE performs handover, dual connectivity establishment/reconfiguration, or unicast-to-multicast switching, between base stations/cells, if the multicast service of the first cell has transmitted the data packet with a sequence index k (for example, a packet 4 received by the UE in the first cell), after switching to the second cell, the multicast service of the second cell has transmitted the data packet with a sequence index n (for example, a packet 10), then, packets which are out of sync between the first cell and the second cell includes a data packet with a sequence index (k+1), . . . and a data packet with a sequence index (n−1) (for example, packet 5, packet 6, packet 7, packet 8, and packet 9), where k and n are integers, and n is greater than k. In the embodiment of the present disclosure, at least one of the above methods can be used to solve this problem.

Optionally, the method further includes:

transmitting first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;

receiving the concurrent demand information transmitted by the UE according to the first indication information and/or the second indication information; and allocating resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

In the embodiment of the present disclosure, simultaneous unicast and multicast services are supported for coarse time/frequency granularity (plus prediction of future resource usage).

Step 0: in a system message and/or a dedicated signaling, the base station indicates the broadcast/multicast service being transmitted by the base station and instructs the UE to report, to the base station, the UE's concurrent demand for broadcast/multicast and unicast and/or multiple broadcast/multicast services.

Step 1: the UE transmits a first message to the base station, where the first message includes at least one of the following information:

demand information of broadcast/multicast/unicast being transmitted; demand information of broadcast/multicast/unicast in the next time period;

a reception amount of broadcast/multicast required by the UE, a bandwidth requirement of the broadcast/multicast service, the number of PRBs required by the broadcast/multicast service, a reception amount of unicast service required by the UE, a bandwidth requirement of the unicast service, the number of PRBs required by the unicast service;

broadcast/multicast information required by the UE, including TMGI, Session id, geographical scope of the broadcast/multicast service, IP multicast address, service start time, etc., and corresponding reception amount, bandwidth requirement of the broadcast/multicast service, the number of PRBs required by broadcast/multicast service, reception amount of the unicast service required by the UE, bandwidth requirement of the unicast service, and the number of PRBs required by the unicast service;

transmission time information of data of the multicast service includes: a repetition cycle, an offset parameter and a duration of service data of the multicast service; where the UE can obtain the time information from the application layer; or, a reception amount of broadcast/multicast required by the UE in the next time period, a bandwidth requirement of the broadcast/multicast service in the next time period, the number of PRBs required by the broadcast/multicast service in the next time period, a reception amount of unicast service required by the UE in the next time period, a bandwidth requirement of the unicast service in the next time period, the number of PRBs required by the unicast service in the next time period.

Step 2: then, according to content of the second information transmitted by the UE, the base station (and/or MCE) determines a broadcast/multicast service and a unicast service that the UE is interested in; at the same time, the base station allocates resources to the UE, and determines resource allocation modes of multicast and unicast; the base station informs the UE of information of available broadcast/multicast resources and corresponding unicast bearer establishment.

Optionally, before transmitting the second data to the UE through the second radio channel, the method further includes at least one of the following:

determining whether there is a condition or factor for switching between the first radio channel and the second radio channel, where the condition or factor includes at least one of the following: the number of participating UEs (or, in other words, the number of UEs in reception multicast), quality of service (QoS) information, quality of experience (QoE), channel quality information, a status of UE receiving data packets, or transmission mode information selected by UE, a big data analysis node, a core network, an artificial intelligence analysis node and/or a network management node; where the condition or factor for switching may further include location of the UE;

in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam; for example, most of participating UEs of a multicast are concentrated in a beam 2 and a beam 3 and a base station uses the beam 2 and the beam 3 to transmit SC-MCCH and SC-PTM, if one or more UEs cannot receive information on the beam 2 and the beam 3, then, a unicast radio channel is used for these UEs which cannot receive information on the beam 2 and the beam 3;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

The foregoing certain threshold may be a preset threshold, and the foregoing several thresholds may be the same or different.

In other words, if the number of data packets that the UE fails to receive is greater than or equal to a first threshold, or the number of data packets that the UE successfully receives is less than or equal to a second threshold, a request for switching from multicast to unicast is transmitted to the base station. Conversely, if the number of data packets that the UE fails to receive is less than or equal to a third threshold or equal to a fourth threshold, or the number of data packets that the UE successfully receives is greater than or equal to a fifth threshold, a request for switching from unicast to multicast is transmitted to the base station.

The channel quality information includes reference signal received power (RSRP), reference signal received quality (RSRQ), and channel state information (CSI) reporting result. The status of UE receiving data packet includes information of successfully receiving data packet and/or information of failing to receive data packet.

The base station may determine whether to perform switching between the first radio channel and the second radio channel according to the foregoing condition or factor.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

After that, according to the above information, the core network can determine whether to perform switching between the first radio channel and the second radio channel.

Figure 8:
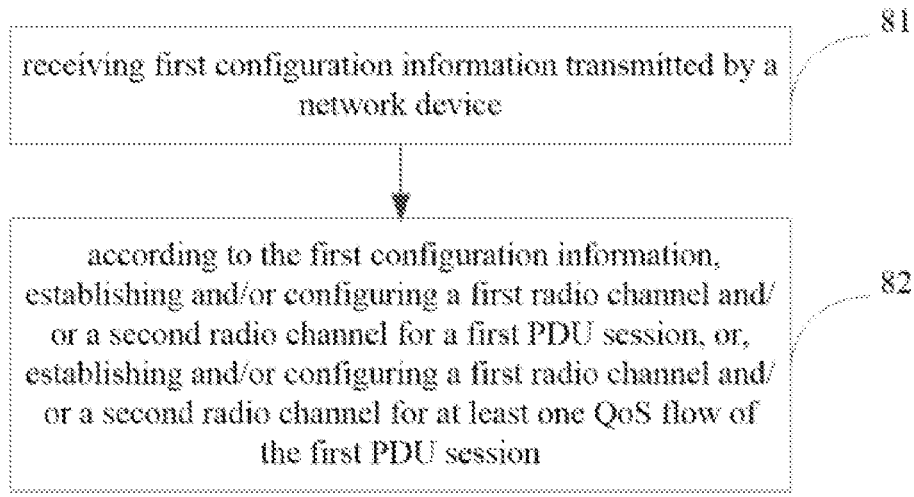
FIG. 8 is a schematic flowchart of a data transmission method according to an embodiment of the present disclosure.

Referring to FIG. 8, FIG. 8 is a schematic flowchart of a data transmission method according to a second embodiment of the present disclosure. The method is performed by a UE and includes the following steps:

Step 81: receiving first configuration information transmitted by a network node;

Step 82: according to the first configuration information, establishing and/or configuring a first radio channel and/or a second radio channel for a first PDU session, or, establishing and/or configuring a first radio channel and/or a second radio channel for at least one QoS flow of the first PDU session.

The first radio channel is configured to receive first data transmitted by the network node through the first radio channel.

The second radio channel is configured to receive second data transmitted by the network node through the second radio channel.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

The second radio channel and the first radio channel belong to the same network node or different network nodes.

Both the first radio channel and the second radio channel are configured by the network node for the first PDU session or at least one QoS flow of the first PDU session.

When the second radio channel and the first radio channel belong to different cells, the network nodes corresponding to the different cells may be different.

In this embodiment of the present disclosure, the step of receiving the first data transmitted by the network node through the first radio channel and the step of receiving the second data transmitted by the network node through the second radio channel may be performed simultaneously or not simultaneously. For example, the first data transmitted by the network node through the first radio channel is first received, and then the second data transmitted by the network node through the second radio channel is received. That is, transmission of data of the first service can be switched from unicast to broadcast or multicast, or switched from broadcast or multicast to unicast. At the same time, when receiving the first data transmitted by the network node through the first radio channel and receiving the second data transmitted by the network node through the second radio channel, the first data and the second data may be the same, that is, data of the same service can be received by unicast and broadcast or multicast at the same time.

In the embodiment of the present disclosure, transmission mode of multicast or broadcast service may be switched from broadcast or multicast to unicast, or may be switched from unicast to broadcast or multicast. Data of the same service may also be transmitted simultaneously through unicast and broadcast or multicast.

Optionally, the second data is the same as the first data, or the second data is a subset of the first data, or, the second data and the first data have no intersection, or, the second data is partially the same as the first data.

Optionally, the method further includes:

establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

The establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel, includes:

establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second physical configuration corresponding to the second radio channel.

Optionally, according to the first configuration information, establishing and/or configuring a first radio channel and/or a second radio channel for a first PDU session, or, establishing and/or configuring a first radio channel and/or a second radio channel for at least one QoS flow of the first PDU session, includes at least one of the following:

receiving first type information of the first PDU session and/or at least one QoS flow of the first PDU session of the UE, transmitted by the network;

receiving second type information of the first PDU session and/or at least one QoS flow of the first PDU session of the UE, transmitted by the network;

receiving a first type of the first radio channel and/or the second radio channel of the UE, transmitted by the network; or, receiving a second type of the first radio channel and/or the second radio channel of the UE, transmitted by the network;

where the first type refers to a service type of unicast, broadcast or multicast;

the second type refers to a transmission mode type of unicast, broadcast or multicast.

The first radio channel and the second radio channel share one radio bearer or two independent radio bearers.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the method further includes at least one of the following:

receiving an RRC message, MAC CE and/or physical control signaling, which is transmitted by the network node and is used to activate the first radio channel or the second radio channel, and activating the first radio channel or the second radio channel;

receiving an RRC message, MAC CE and/or physical control signaling, which is transmitted by the network node and is used to activate the first radio channel and the second radio channel, and activating the first radio channel and the second radio channel;

receiving an RRC message, MAC CE and/or physical control signaling, which is transmitted by the network node and is used to activate the first radio channel and deactivate the second radio channel, and activating the first radio channel and deactivating the second radio channel;

receiving an RRC message which is transmitted by the network node and is used to simultaneously establish and/or configure the first radio channel and/or the second radio channel of the first PDU session, and simultaneously establishing and/or configuring the first radio channel and/or the second radio channel of the first PDU session;

receiving an RRC message which is transmitted by the network node and is used to establish and/or configure the first radio channel or the second radio channel of the first PDU session, and establishing and/or configuring the first radio channel or the second radio channel of the first PDU session;

receiving an RRC message which is transmitted by the network node and is used to establish and/or configure the first radio channel of the first PDU session and delete the second radio channel, and establishing and/or configuring the first radio channel of the first PDU session and deleting the second radio channel;

receiving an RRC message which is transmitted by the network node and is used to establish and/or configure the second radio channel of the first PDU session and delete the first radio channel, and establishing and/or configuring the second radio channel of the first PDU session and deleting the first radio channel.

Before receiving the second data of the first service transmitted by the network node through the second radio channel, the method further includes:

transmitting a PDCP status report of the first radio channel.

The receiving the second data of the first service transmitted by the network node through the second radio channel, includes:

within a preset time period of starting to receive the second data through the second radio channel, receiving a first PDCP PDU including an IR packet, where the first PDCP PDU is used to carry the second data.

In case that the second radio channel and the first radio channel belong to different cells, the receiving the second data of the first service transmitted by the network node to the UE through the second radio channel, includes:

receiving a second PDCP PDU configured to carry the second data;

where a packet header of the second PDCP PDU includes information for indicating encryption with a new key; or, the second PDCP PDU is packaged using a logical channel identifier corresponding to the second radio channel;

or, when the second radio channel and the first radio channel belong to different cells, before receiving the second data of the first service transmitted by the network node to the UE through the second radio channel, the method further includes:

receiving an end packet transmitted by the network node, where the end packet is used to indicate that data of the first PDU session or data of at least one QoS flow of the first PDU session has been switched from the first radio channel to the second radio channel and is carried by the second radio channel.

Figure 8A:
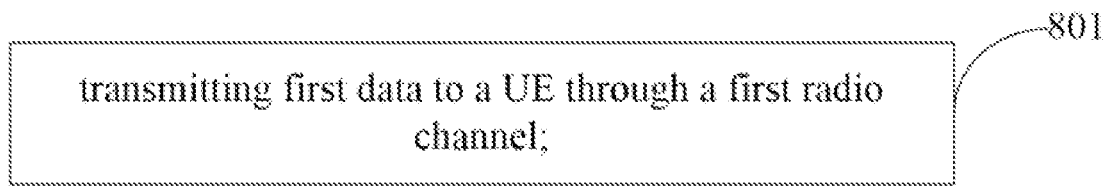
FIG. 8a is a schematic flowchart of a data transmission method according to an embodiment of the present disclosure.

Referring to FIG. 8a, FIG. 8a is a schematic flowchart of a data transmission method according to an embodiment of the present disclosure. The method is applied to two radio channels in different network nodes, and includes the following steps.

Step 801: transmitting first data to a UE through a first radio channel;

where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

The first radio channel is a channel configured for the first PDU session to transmit the first data; or, the first radio channel is a channel configured for at least one QoS flow of the first PDU session to transmit the first data.

The transmitting the first data to the UE through the first radio channel, includes:

configuring at least one of a first SDAP configuration, a first PDCP configuration, a first RLC configuration, a first MAC configuration or a first physical configuration corresponding to the first radio channel.

Bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the method further includes at least one of the following:

activating the first radio channel through an RRC message, MAC CE and/or physical control signaling;

deactivating the first radio channel through an RRC message, MAC CE and/or physical control signaling;

configuring the first radio channel through an RRC message; or, deleting the first radio channel through an RRC message.

Before transmitting the first data of the first service to the UE through the first radio channel, the method further includes:

obtaining relevant information of the second radio channel;

where the second radio channel and the first radio channel are corresponding to the same PDU session configuration or at least one QoS flow of the same PDU session, and the second radio channel is on another network radio node.

The obtaining relevant information of the second radio channel, includes:

obtaining data packet transmission status information of the second radio channel.

The transmitting the first data of the first service to the UE through the first radio channel, includes:

transmitting a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel;

or, before transmitting the first data of the first service to the UE through the first radio channel, the method further includes:

transmitting an end packet to the UE, where the end packet is used to indicate that data of the first PDU session or data of at least one QoS flow of the first PDU session has been switched from the first radio channel to the second radio channel and is carried by the second radio channel.

The method further includes:

configuring, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

That is, functions of the synchronization function entity include:

transmitting and/or interacting, through signaling, time information associated with packet transmission; and/or, adding time information associated with packet transmission into a data packet;

where the time information may be absolute and/or relative time information; or information of a system frame number (SFN), a subframe, a slot, a mini-slot and/or a time symbol.

A synchronization protocol instance of the synchronization function entity is associated with a broadcast or multicast PDU session.

The synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

The time information is time information transmitted from the application layer or the core network, or is time information which is generated by the network node and used to synchronize transmission between base stations.

In case that the synchronization function entity is used to add the time information associated with data packet transmission into the data packet, the time information and data are transmitted together in one data packet; and/or, the time information is transmitted separately in a data packet.

The time information is transmitted by a centralized unit (CU) to a distributed unit (DU); and/or, the time information is information converted by the CU into SFN, subframe, slot, mini-slot and/or time symbol for scheduling.

The synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

The network node includes a base station of a first cell and a base station of a second cell. The first cell is a cell to which the first radio channel belongs, and the second cell is a cell to which the second radio channel belongs. The method further includes at least one of the following:

the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;

the base station of the second cell informs, the base station of the first cell, of sequence indexes of the next one or more packets to be transmitted and/or sequence indexes of packets still stored in an cache;

the base station of the second cell informs, the base station of the first cell, of sequence indexes of the next one or more packets to be transmitted and/or sequence indexes of packets still stored in an cache, together with carrying time information corresponding to transmission of the packets;

according to the received information, the base station of the first cell forwards packets which are out of sync between the first cell and the second cell;

according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

Figure 9:
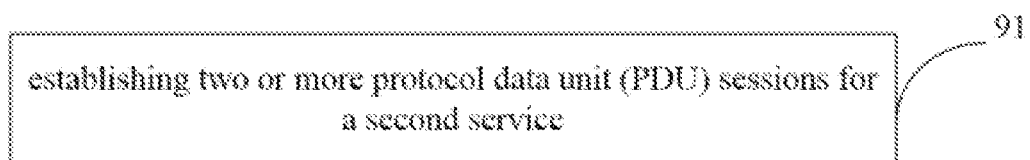
FIG. 9 is a schematic flowchart of a data transmission method according to an embodiment of the present disclosure.

Referring to FIG. 9, FIG. 9 is a schematic flowchart of a data transmission method according to an embodiment of the present disclosure. The method is performed by a network node and includes the following steps.

Step 91: establishing two or more protocol data unit (PDU) sessions for a second service;

where a first PDU session is used to transmit third data of the second service to a UE;

a second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

The network nodes may be the same network node, or may be different network nodes.

In this embodiment of the present disclosure, the step of transmitting the third data of the second service to the UE through the first PDU session and the step of transmitting the fourth data of the second service to the UE through the second PDU session may be performed simultaneously or not simultaneously. For example, it is to first transmit the third data of the second service to the UE through the first PDU session, and then switch to transmitting the fourth data of the second service to the UE through the second PDU session. That is, transmission of data of the second service can be switched from unicast to broadcast or multicast, or switched from broadcast or multicast to unicast. At the same time, when transmitting the third data of the second service to the UE through the first PDU session and transmitting the fourth data of the second service to the UE through the second PDU session, the third data and the fourth data may be the same, that is, data of the same service can be transmitted by unicast and broadcast or multicast at the same time.

In the embodiment of the present disclosure, the transmission mode of one broadcast or multicast service can be flexibly switched between unicast and broadcast or multicast, which is suitable for intra-cell scenarios and handover/dual connectivity cross-cell scenarios. Specifically, the transmission mode of multicast or broadcast service may be switched from broadcast or multicast to unicast, or may be switched from unicast to broadcast or multicast. Data of the same service may also be transmitted simultaneously through unicast and broadcast or multicast.

Figure 10:
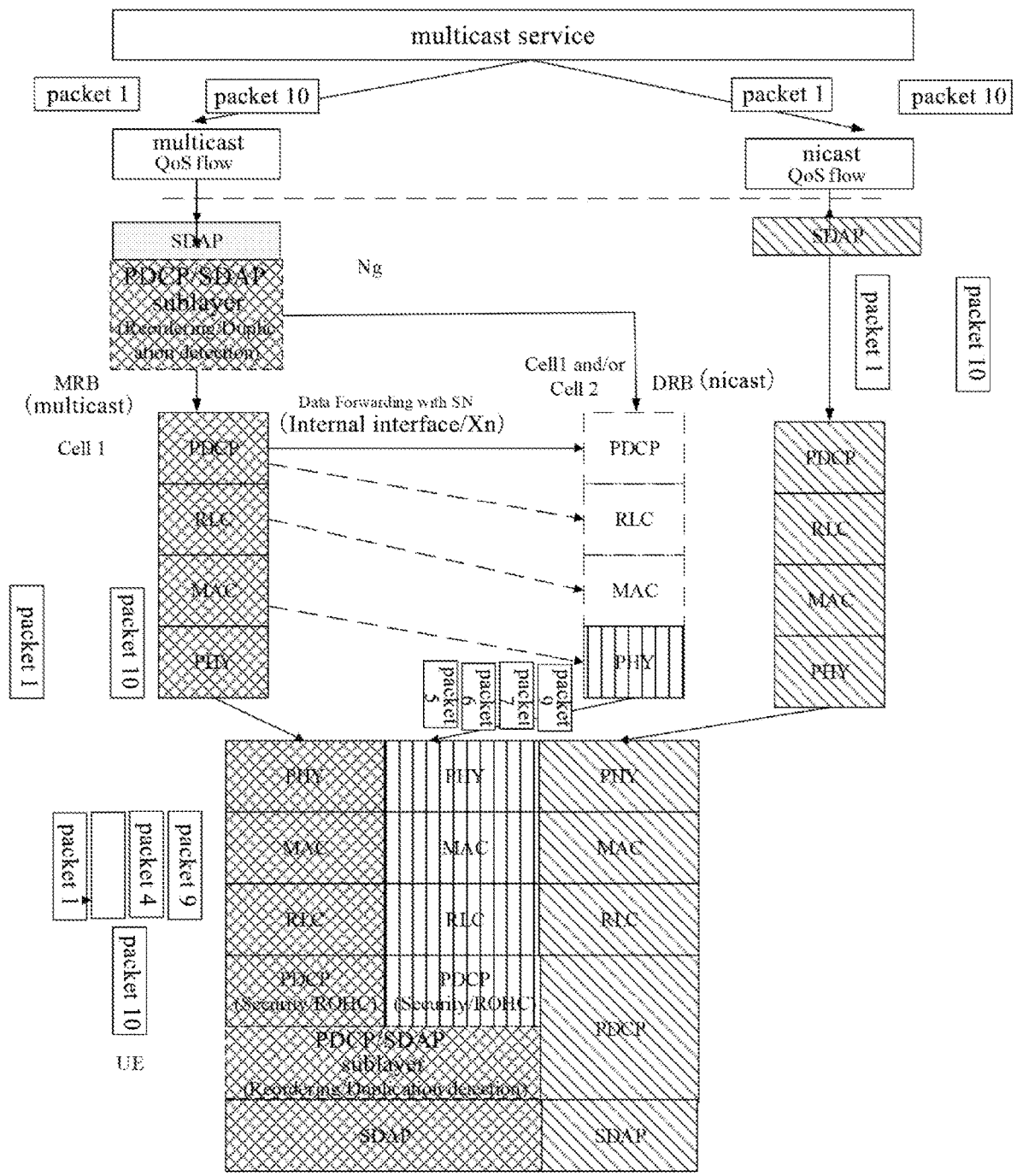
FIG. 10 is a schematic diagram of transmission of broadcast or multicast service data through a unicast PDU session and a broadcast or multicast session.

Specifically, in the related art, only one PDU session is established for one service. In the embodiment of the present disclosure, referring to FIG. 10, for one broadcast or multicast service, a broadcast or multicast PDU session and multiple unicast PDU sessions for different UEs are established.

Optionally, the fourth data is the same as the third data, or the fourth data is a subset of the third data, or, the fourth data and the third data have no intersection, or, the fourth data is partially the same as the third data.

In the embodiment of the present disclosure, the fourth data being the same as the third data means that the network node enables simultaneous transmission of the data of the second service through the first PDU and the second PDU. The fourth data being a subset of the third data, means that the network side first enables transmission of data of the second service through the first PDU session, then enables transmission of data of the second service through the second PDU session, and maintains transmission of data of the second service through the first PDU session. That is, the data of the second service is transmitted through the first PDU session, and the data of the second service is also transmitted through the second PDU session. The fourth data and the third data having no intersection means that the network node switches from transmission of data of the second service to the UE through the first PDU session, to transmission of data of the second service to the UE through the second PDU session; that is, after transmission of data of the second service to the UE through the second PDU session is enabled, the data of the second service will not be transmitted to the UE through the first PDU session. The fourth data being partially the same as the third data means that after transmission of data of the second service to the UE through the second PDU session is enabled, part of data that has been transmitted through the first PDU session will be transmitted repeatedly to avoid data loss, or means that after transmission of data of the second service to the UE through the second PDU session is enabled, the data of the second service is continuously transmitted to the UE through the first PDU session for a period of time, and then the first PDU session will be deactivated.

Optionally, the network node includes a core network; and the transmitting the third data of the second service to the UE through the first PDU session and transmitting the fourth data of the second service to the UE through the second PDU session, includes:
- determining, by the core network, a UE in a broadcast or multicast group, which uses a multicast PDU session established for broadcast or multicast services to receive data, and a UE which uses a unicast PDU session established for broadcast or multicast services to receive data; and/or,
- determining, by the core network, in a broadcast or multicast service, data received by using the broadcast or multicast PDU session of the broadcast or multicast service, data received by using the unicast PDU session; and/or,
- determining, by the core network, some or all UEs in a broadcast or multicast group, which can not only use a broadcast or multicast PDU session established for broadcast or multicast services to receive data, but also use a unicast PDU session established for broadcast or multicast services to receive data.

The data received by the UE from the broadcast or multicast PDU session established for the broadcast or multicast service and the data received by the UE from the unicast PDU session established for the broadcast or multicast service may be the same data, or may be different data.

Optionally, the network node includes a core network; and the transmitting the third data of the second service to the UE through the first PDU session and transmitting the fourth data of the second service to the UE through the second PDU session, includes:
- informing, by the core network, the UE of relationship between the first PDU session and the second PDU session;
- informing, by the core network, the UE and the base station respectively of relationship between the first PDU session and the second PDU session, when the core network configures a broadcast or multicast PDU session and a unicast PDU session of the same broadcast or multicast service for the UE to receive data; or,
- informing, by the core network, a base station of relationship between the first PDU session and the second PDU session; and then, informing, by the base station, the UE of the relationship between the first PDU session and the second PDU session; or,
- informing, by the core network, a base station of relationship between the first PDU session and the second PDU session; or, informing, by the core network, the UE of relationship between the first PDU session and the second PDU session.

Optionally, the network node includes a core network; and the transmitting the third data of the second service to the UE through the first PDU session and transmitting the fourth data of the second service to the UE through the second PDU session, includes:
- informing, by the core network, the UE of a reception mode of the first PDU session and the second PDU session;
- determining, by the core network, some or all UEs in a broadcast or multicast group, which can not only use a broadcast or multicast PDU session established for a broadcast or multicast service to receive data, but also use a unicast PDU session established for the broadcast or multicast service to receive data;

where the data received by the UE from the broadcast or multicast PDU session established for the broadcast or multicast service and the data received by the UE from the unicast PDU session established for the broadcast or multicast service may be simultaneous or time-sharing.

The reception mode includes: using a broadcast or multicast PDU session established for broadcast or multicast services to receive data and using a unicast PDU session established for broadcast or multicast services to receive data. The data received by the UE from the broadcast or multicast PDU session established for the broadcast or multicast service and the data received by the UE from the unicast PDU session established for the broadcast or multicast service may be the same data or different data.

Optionally, the network node includes a core network; and the transmitting the third data of the second service to the UE through the first PDU session and transmitting the fourth data of the second service to the UE through the second PDU session, includes:
- according to quality requirements of a service, and/or arrival characteristics of the service, and/or new radio channel, selecting for the UE, by the core network, a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

The PDU session type includes a first PDU session and a second PDU session.

In the embodiment of the present disclosure, the arrival characteristic of the service may include a period of the service, arrival moment of the service and data packet size of the service. The channel quality of the air interface may include reporting results of RSRP, RSRQ and/or CSI.

Optionally, the network node includes a core network; and the transmitting the third data of the second service to the UE through the first PDU session and transmitting the fourth data of the second service to the UE through the second PDU session, includes:
- informing, by the core network, a base station of a PDU session type selected for the UE to receive broadcast or multicast services; then, informing, by the base station, the UE of the PDU session type which is selected by the network node for the UE to receive broadcast or multicast service; or,
- informing, by the core network, a base station of specific time and a PDU session type selected for the UE to receive broadcast or multicast services; then, informing, by the base station, the UE of the specific time and the PDU session type which is selected by the network node for the UE to receive broadcast or multicast service; or,
- informing, by the core network, a base station of a PDU session type selected for the UE to receive broadcast or multicast services; or, informing, by the core network, the UE of a PDU session type selected for the UE to receive broadcast or multicast services; or, informing, by the core network, a base station of specific time and a PDU session type selected for the UE to receive broadcast or multicast services; or, informing, by the core network, the UE of specific time and a PDU session type selected for the UE to receive broadcast or multicast services.

Optionally, the transmitting the third data of the second service to the UE through the first PDU session and transmitting the fourth data of the second service to the UE through the second PDU session, includes:

establishing, by the network node, a broadcast or multicast PDU session and a unicast PDU session for the same broadcast or multicast service, for a UE to receive data; and using signaling or a special data packet to activate a to-be-used broadcast or multicast PDU session and/or unicast PDU session established for the same broadcast or multicast service;

and/or, using, by the network node, signaling or a special data packet to deactivate the broadcast or multicast PDU session and/or unicast PDU session established for the same broadcast or multicast service;

where the network node may be a node on core network side and/or radio access network side.

In the embodiment of the present disclosure, the network establishes the broadcast or multicast PDU session and the unicast PDU session for the same broadcast or multicast service for a UE to receive data; and then, when it is necessary to use the broadcast or multicast PDU session and/or unicast PDU session established for the same broadcast or multicast service to receive data, the network node uses signaling or a special data packet to activate a to-be-used broadcast or multicast PDU session and/or unicast PDU session established for the same broadcast or multicast service. Optionally, when it is not necessary to use the broadcast or multicast PDU session and/or unicast PDU session established for the same broadcast or multicast service to receive data, the network node uses signaling or a special data packet to deactivate the broadcast or multicast PDU session and/or unicast PDU session established for the same broadcast or multicast service. The network node may be a node on core network side and/or radio access network side. Optionally, the core network needs to inform the radio access network of a PDU session (or a corresponding radio channel) that needs to be activated and/or deactivated, or a PDU session (or a corresponding radio channel) that needs to be activated and/or deactivated for communication between nodes on the radio access network side (such as a primary base station and a secondary base station in dual connectivity, or a source base station and a target base station in handover) related to the multicast PDU session and unicast PDU session established for the same broadcast or multicast service.

Optionally, the transmitting the third data of the second service to the UE through the first PDU session and transmitting the fourth data of the second service to the UE through the second PDU session, includes:

transmitting the broadcast or multicast PDU session established for the broadcast or multicast service at the network node on the radio access network side, to the UE by using a point-to-point (PTP) and/or point-to-multipoint (PTM) transmission mode; or, receiving a PDU session type reported by the UE, where the PDU session type is determined by the UE itself for receiving the multicast service according to quality requirements of a service, and/or arrival characteristics of the service, and/or new radio channel.

The network node on the radio access network side may be a base station, a CU or other control nodes.

Based on the PDU session selected by the UE, according to the quality requirements of the service, and/or the arrival characteristics of the service (i.e., the period of the service, the arrival moment of the service and the data packet size of the service), and/or air interface channel conditions, the UE itself determines the PDU session type and (optional) specific time used by the UE for receiving the multicast service; and informs the network side of the UE's selection.

Figure 11:
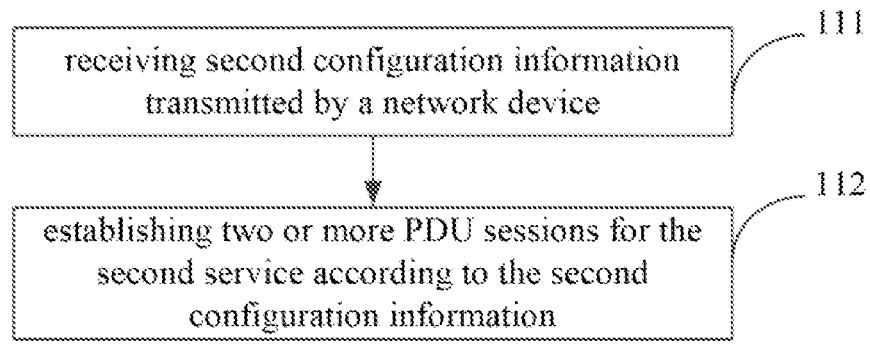
FIG. 11 is a schematic flowchart of a data transmission method according to an embodiment of the present disclosure.

Referring to FIG. 11, FIG. 11 is a schematic flowchart of a data transmission method according to an embodiment of the present disclosure. The method is performed by a UE and includes the following steps:

Step 111: receiving second configuration information transmitted by a network node;

Step 112: establishing two or more PDU sessions for the second service according to the second configuration information.

The first PDU session is used to transmit third data of the second service to the UE.

The second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Figure 12:
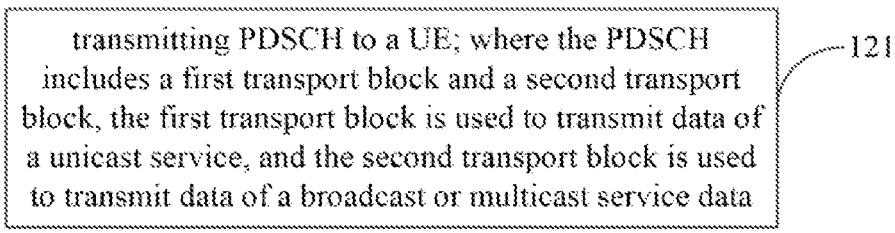
FIG. 12 is a schematic flowchart of a data transmission method according to an embodiment of the present disclosure.

Referring to FIG. 12, FIG. 12 is a schematic flowchart of a data transmission method according to an embodiment of the present disclosure. The method is performed by a network node and includes the following steps:

Step 121: transmitting PDSCH to a UE; where the PDSCH includes a first transport block and a second transport block, the first transport block is used to transmit data of a unicast service, and the second transport block is used to transmit data of a broadcast or multicast service data.

Figure 13:
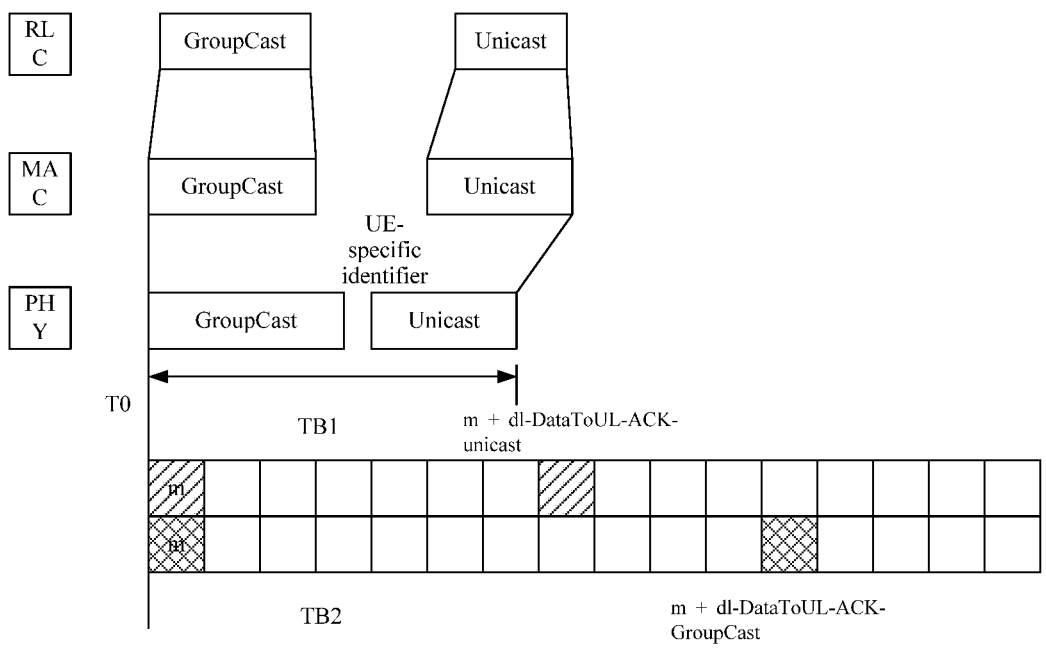
FIG. 13 is a schematic diagram showing each of two TBs in one PDSCH corresponding to one HARQ feedback resource.

In the embodiment of the present disclosure, referring to FIG. 13 and FIG. 14, the data of the unicast service and the data of the broadcast or multicast service can be scheduled on the same PDSCH, thereby realizing simultaneous execution of the unicast service and the broadcast or multicast service. The data of the unicast service and the data of the broadcast or multicast service may be different, in other words, the data of the unicast service and the data of the broadcast or multicast service may belong to QoS flows of different services, respectively.

In the embodiment of the present disclosure, simultaneous unicast and multicast services are supported at a scheduling unit granularity of physical layer (one scheduling unit slot).

In order to support the UE to simultaneously receive unicast and broadcast or multicast services at one scheduling unit granularity, in the embodiment of the present disclosure, data corresponding to the broadcast/multicast service and data corresponding to the unicast service are placed on one PDSCH time resource and divided into 2 TB blocks.

Optionally, before transmitting the PDSCH to the UE, the method further includes:

transmitting first information to the UE, where the first information is used to determine a first HARQ feedback resource and a second HARQ feedback resource; and/or, transmitting second information to the UE, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

In the embodiment of the present disclosure, although the data of the unicast service and the data of the broadcast or multicast service are scheduled on the same PDSCH, HARQ feedback resources are respectively configured for the unicast service and the broadcast or multicast service, so that the HARQ feedback can be performed separately for data reception of unicast services and data reception of broadcast or multicast services.

Specifically, each of the two transport blocks may have its own HARQ buffer and HARQ process index.

In other words, in the embodiment of the present disclosure, in order to enable the UE to simultaneously receive the data of the unicast service and the data of the broadcast or multicast service, the data of the unicast service and the data of the broadcast or multicast service are respectively formed into two TB blocks which are transmitted in a scheduling unit of one PDSCH, and different HARQ feedback resources are allocated for the two TB blocks. Specifically, two sets of independent PUCCH resources may be defined, and K1 values selected for the broadcast or multicast service and the unicast service are informed in a hierarchical manner, respectively.

The following example illustrates allocation of different HARQ feedback resources for two transport blocks.

In example 1, a PUCCH resource set for unicast and a PUCCH resource set for broadcast and/or multicast are configured separately through high-layer RRC signaling. For example, UL PUCCH resource of UE configured in IE PUCCH-Config of each BWP includes HARQ feedback resources.

The PUCCH resources configured by the RRC signaling include a set dl-DataToUL-ACK-unicast/dl-DataToUL-ACK-groupcast of slot index differences between unicast/multicast PDSCH and unicast/multicast PUCCH, which is respectively configured for the UE and is used to determine a difference between a slot index of UE receiving unicast/multicast PDSCH and a slot index of UE feedback unicast/multicast PUCCH. Fields including PDSCH-to-HARQ-_feedback timing indicator-unicast and PDSCH-to-HARQ_feedback timing indicator-groupcast, in DCI, are used to indicate which of the sets to use.

```
PUCCH-Resource-unicast::=                  SEQUENCE {
    pucch-ResourceId                       PUCCH-ResourceId,
-- Need R
}
PUCCH-Resource-broadcast and/or multicast::=  SEQUENCE {
    pucch-ResourceId                       PUCCH-ResourceId,
}
PUCCH-ResourceId ::=                       INTEGER
(0..maxNrofPUCCH-Resources-1)
```

In example 2, only a PUCCH resource set for unicast is configured through high-layer RRC signaling with information of indicating offset information of two resources, and then the UE derives a PUCCH resource set for the broadcast and/or multicast.

```
PUCCH-Resource::=                          SEQUENCE {
    pucch-ResourceId                       PUCCH-ResourceId,
    starting physical RB                   physical resource block-Id,
    physical RB-offset of broadcast or multicast:  physical RB-offset (positive or negative),
    PUCCH-format4
    }
}
PUCCH-ResourceId ::=                       INTEGER (0..maxNrofPUCCH-Resources-1)
```

In example 3, two different sets of resource information (such as the following Table 1) are directly pre-defined, and then an index can be directly used.

TABLE 1

| index | PUCCH format | First symbol | Delta-symbol for multicast | Number of symbols for unicast | Number of symbols for multicast | PRB offset $RR_{BWP}{}^{offset}$ | Delta PRB offset for multicast | Set of initial CS indexes |
|---|---|---|---|---|---|---|---|---|
| 0 | 0 | 12 | 1 | 2 | 1 | 0 | 1 | {0, 3} |
| 1 | 0 | 12 | 1 | 2 | 1 | 0 | 1 | {0, 4, 8} |
| 2 | 0 | 12 | 1 | 2 | 1 | 3 | 1 | {0, 4, 8} |
| 3 | 1 | 10 | 1 | 4 | 3 | 0 | 1 | {0, 6} |
| 4 | 1 | 10 | 1 | 4 | 3 | 0 | 1 | {0, 3, 6, 9} |
| 5 | 1 | 10 | 1 | 4 | 3 | 2 | 1 | {0, 3, 6, 9} |
| 6 | 1 | 10 | 1 | 4 | 3 | 4 | 2 | {0, 3, 6, 9} |
| 7 | 1 | 4 | 1 | 10 | 10 | 0 | 2 | {0, 6} |
| 8 | 1 | 4 | 1 | 10 | 10 | 0 | 2 | {0, 3, 6, 9} |
| 9 | 1 | 4 | 2 | 10 | 10 | 2 | 4 | {0, 3, 6, 9} |
| 10 | 1 | 4 | 2 | 10 | 10 | 4 | 2 | {0, 3, 6, 9} |

TABLE 1-continued

| PUCCH index | PUCCH format | First symbol | Delta-symbol for multicast | Number of symbols for unicast | Number of symbols for multicast | PRB offset $RR_{BWP}^{offset}$ | Delta PRB offset for multicast | Set of initial CS indexes |
|---|---|---|---|---|---|---|---|---|
| 11 | 1 | 0 | 2 | 14 | 13 | 0 | 2 | {0, 6} |
| 12 | 1 | 0 | 4 | 14 | 13 | 0 | 1 | {0, 3, 6, 9} |
| 13 | 1 | 0 | 4 | 14 | 13 | 2 | 1 | {0, 3, 6, 9} |
| 14 | 1 | 0 | 4 | 14 | 13 | 4 | 1 | {0, 3, 6, 9} |
| 15 | 1 | 0 | 4 | 14 | 13 | $\lfloor N_{BWP}^{size}/4 \rfloor$ | 1 | {0, 3, 6, 9} |

The UE respectively determines an index in a resource set for unicast and an index in a resource set for multicast, according to an explicit indication in downlink scheduling signaling;
or, an offset prior to a resource set is specified in the protocol/configured by RRC.

For example, in a newly designed DCI format 1-x, a 6-bit PDSCH-to-HARQ_feedback timing indicator is defined, where the first 3 bits are values K1 for unicast, and the last 3 bits are values K1 for multicast. A set of K1 in DCI format 1-x is {1, 2, 3, 4, 5, 6, 7, 8}, and has a total of 8 values.

Or, in DCI format 1-y, bit distribution of PDSCH-to-HARQ_feedback timing indicator for unicast and multicast depends on an array length of dl-DataToUL-ACK-unicast dl-DataToUL-ACK-multicast in PUCCH-Config.
di-DataToUL-ACK-unicast SEQUENCE(SIZE(1 . . . 8)) OF INTEGER(0 . . . 15)
dl-DataToUL-ACK-multicast SEQUENCE(SIZE(1 . . . 8)) OF INTEGER(0 . . . 15)
List of timing for given PDSCH to the DL ACK.

Alternatively, a resource index is implicitly indicated by combining a starting CCE index of a received downlink scheduling signaling and the number of CCEs in a downlink control resource set where a received downlink scheduling signaling is located.

In addition, if data rate including group PDSCH and unicast PDSCH exceeds the UE's capability, the UE will drop one of them:
1: by comparing logical channel priorities and/or physical layer priorities (if configured) corresponding to unicast and multicast, data on PDSCH with low priority is discarded;
2: the UE defaults that a priority of multicast is higher than that of unicast, and data corresponding to unicast with low priority is discarded;
3: The UE determines which type of data to discard according to a priority indication or a discard indication of unicast and multicast packets carried in DCI.

Optionally, the first information includes information of the first PUCCH set and information of the second PUCCH set; or,
the first information includes information of the first PUCCH set and offset information between the first PUCCH set and the second PUCCH set;
where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Referring to FIG. 15, FIG. 15 is a schematic flowchart of a data transmission method according to an embodiment of the present disclosure. The method is performed by a UE and includes the following steps:

Step 151: receiving PDSCH transmitted by a network node, where the PDSCH includes a first transport block and a second transport block, the first transport block is used to transmit data of a unicast service, and the second transport block is used to transmit data of a broadcast or multicast service.

In the embodiment of the present disclosure, the data of the unicast service and the data of the broadcast or multicast service can be scheduled on the same PDSCH, thereby realizing simultaneous execution of the unicast service and the broadcast or multicast service. The data of the unicast service and the data of the broadcast or multicast service may be different, in other words, the data of the unicast service and the data of the broadcast or multicast service may belong to QoS flows of different services, respectively.

Optionally, before receiving the PDSCH transmitted by the network node, the method further includes:
receiving first information transmitted by the network node, where the first information is used to determine a first HARQ feedback resource and a second HARQ feedback resource; and/or,
receiving second information transmitted by the network node, where the second information is used to determine a first slot interval and a second slot interval;
where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

In the embodiment of the present disclosure, although the data of the unicast service and the data of the broadcast or multicast service are scheduled on the same PDSCH, HARQ feedback resources are respectively configured for the unicast service and the broadcast or multicast service, so that the HARQ feedback can be performed separately for data reception of unicast services and data reception of broadcast or multicast services.

Optionally, the first information includes information of the first PUCCH set and information of the second PUCCH set; or,
the first information includes information of the first PUCCH set and offset information between the first PUCCH set and the second PUCCH set;
where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Referring to FIG. 16, FIG. 16 is a schematic flowchart of a data transmission method according to an embodiment of the present disclosure. The method is performed by a network node and includes the following steps:

Step 161: transmitting data of a unicast service to a UE through a first BWP, and transmitting data of a broadcast or multicast service to the UE through a second BWP.

In the embodiment of the present disclosure, referring to FIG. 18, the data of the unicast service and the data of the broadcast or multicast service are transmitted in a manner of BWP frequency division, so that the UE can simultaneously receive unicast services and broadcast or multicast services.

In the embodiment of the present disclosure, there may be one or more broadcast or multicast services. The second BWP may be one BWP associated with all broadcast or multicast services, or may include multiple BWPs associated with multiple broadcast or multicast services. That is, an associated BWP may be configured for one or more broadcast/multicast services, or all broadcast/multicast services may be configured in one associated BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, before transmitting data of a unicast service to a UE through a first BWP, and transmitting data of a broadcast or multicast service to the UE through a second BWP, the method further includes:

in case that the second BWP is a BWP that has an association relationship with the initial BWP, transmitting a system message including third information;

where the third information is used to indicate the association relationship between the second BWP and the initial BWP.

Figure 17:
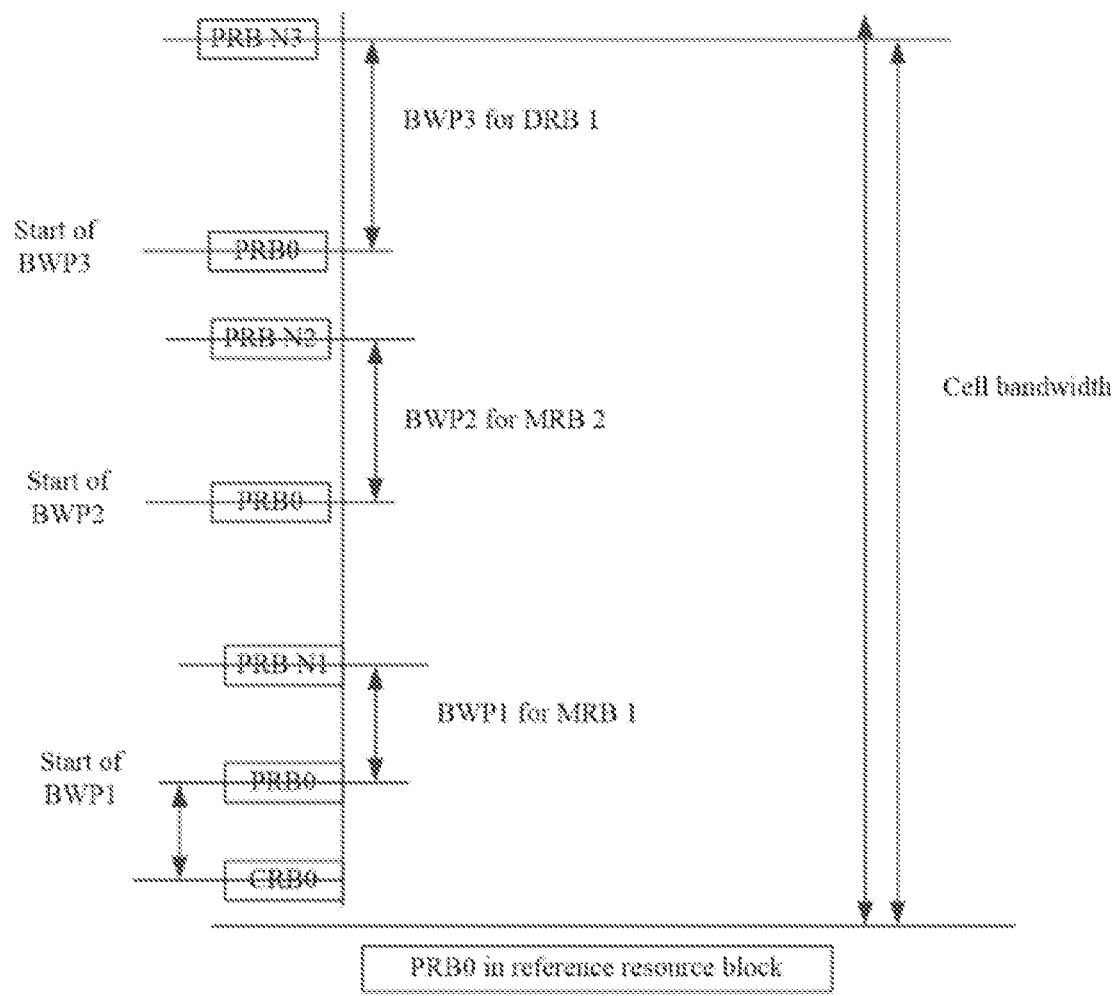
FIG. 17 is a schematic diagram of realizing simultaneous transmission of data of unicast service and broadcast or multicast service by BWP frequency division according to an embodiment of the present disclosure.

In the embodiment of the present disclosure, the network side may configure one associated BWP for the unicast and broadcast or multicast services of the UE, respectively. Specifically, the unicast service may be configured on a dedicated activated BWP, the multicast service may be configured on the initial BWP or a BWP that has an association relationship with the initial BWP, and the association relationship between the initial BWP and the BWP that transmits the multicast service, such as offset relationship between Corset and Searchspace, PUCCH resources, relationship between ACK and CSI, is indicated in the system message. Then, the unicast service is configured into another one or more BWPs, thereby realizing cross-BWP scheduling, so that the two services can be transmitted simultaneously Referring to FIG. 17, BWP1 and BWP2 of MRB can share one HARQ entity, but use independent HARQ processes; BWPs of radio channels share one HARQ entity. In this way, blind retransmission and no HARQ feedback can be implemented on the HARQ entity of the MRB. Retransmission scheduling according to HARQ feedback is performed on the HARQ entity of the BWP of the radio channel.

In other optional embodiments, configuration information of the multicast service (such as SC-PTM) in the time domain needs to be in the system message or dedicated signaling, and then, the UE reads the broadcast/multicast service in time information configured for multicast services, and read the unicast service in time information configured for non-multicast services.

If there is a conflict between transmission time of service data of the broadcast/multicast service and transmission time of service data of the unicast service, and the two types of services cannot be transmitted in parallel in the cell in a manner of frequency division such as BWP frequency division, then, the base station or MCE adjusts transmission time information of the service data of the multicast service, i.e., advancing or postponing transmission, and notifies the UE of the adjusted time information, and also notifies other base stations or cells of the same broadcast/multicast service, so that transmission time of service data of the broadcast/multicast service and transmission time of service data of the unicast service are staggered.

Referring to FIG. 19, FIG. 19 is a schematic flowchart of a data transmission method according to an embodiment of the present disclosure. The method is performed by a UE and includes the following steps:

Step 191: receiving data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, before receiving data of a unicast service transmitted by a network node through a first BWP, and data of a broadcast or multicast service transmitted through a second BWP, the method further includes:

receiving a system message including third information;

where the third information is used to indicate an association relationship between the second BWP and the initial BWP.

In other optional embodiments, configuration information of the multicast service (such as SC-PTM) in the time domain needs to be in the system message or dedicated signaling, and then, the UE reads the broadcast/multicast service in time information configured for multicast services, and read the unicast service in time information configured for non-multicast services.

If there is a conflict between transmission time of service data of the broadcast/multicast service and transmission time of service data of the unicast service, and the two types of services cannot be transmitted in parallel in the cell in a manner of frequency division such as BWP frequency division, then, the base station or MCE adjusts transmission time information of the service data of the multicast service, i.e., advancing or postponing transmission, and notifies the UE of the adjusted time information, and also notifies other base stations or cells of the same broadcast/multicast service, so that transmission time of service data of the broadcast/multicast service and transmission time of service data of the unicast service are staggered.

Referring to FIG. 20, FIG. 20 is a schematic diagram of a network node according to an embodiment of the present disclosure. The network node 200 includes:

a radio channel configuration module 201 configured to configure a first radio channel and/or a second radio channel for a first PDU session, or configure a first radio channel and/or a second radio channel for at least one same QoS flow of a first PDU session.

The first radio channel is configured to transmit first data to the UE.

The second radio channel is configured to transmit second data to the UE.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the radio channel configuration module is configured to configure at least one of a first SDAP configuration, a first PDCP configuration, a first RLC configuration, a first MAC configuration or a first physical configuration corresponding to the first radio channel; configure at least one of a second SDAP configuration, a second PDCP configuration, a second RLC configuration, a second MAC configuration or a second physical configuration corresponding to the second radio channel;

where at least the first physical configuration is different from the second physical configuration.

The first radio channel and the second radio channel share one radio bearer or two independent radio bearers.

Optionally, the radio channel configuration module is configured to configure the first SDAP configuration, the first PDCP configuration, the first RLC configuration, the first MAC configuration and the first physical configuration corresponding to the first radio channel, and configure the second PDCP configuration, the second RLC configuration, the second MAC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second PDCP configuration, the second RLC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second RLC configuration, the second MAC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second RLC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second MAC configuration and the second physical configuration corresponding to the second radio channel; or, the radio channel configuration module is configured to configure the first SDAP configuration, the first PDCP configuration, the first RLC configuration, the first MAC configuration and the first physical configuration corresponding to the first radio channel, and configure the second physical configuration corresponding to the second radio channel.

Optionally, the radio channel configuration module 201 is configured to configure the first radio channel and/or the second radio channel for the first PDU session or configure the first radio channel and/or the at least one QoS flow of the first PDU session in a manner of at least one of the following:

indicating first type information of the first PDU session and/or at least one QoS flow of the first PDU session of the UE;

indicating second type information of the first PDU session and/or at least one QoS flow of the first PDU session of the UE;

indicating a first type of the first radio channel and/or the second radio channel of the UE; or, indicating a second type of the first radio channel and/or the second radio channel of the UE;

where the first type refers to a service type of unicast, broadcast or multicast;

the second type refers to a transmission mode type of unicast, broadcast or multicast.

Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes at least one of the following:

a first activation module configured to activate the first radio channel or the second radio channel through an RRC message, MAC CE and/or physical control signaling;

a second activation module configured to activate the first radio channel and the second radio channel through an RRC message, MAC CE and/or physical control signaling;

a third activation module configured to activate the first radio channel and deactivate the second radio channel through an RRC message, MAC CE and/or physical control signaling;

a first configuration module configured to simultaneously configure the first radio channel and/or the second radio channel of the first PDU session or the first radio channel and the second radio channel of at least one QoS flow of the first PDU session, through an RRC message;

a second configuration module configured to configure the first radio channel and/or the second radio channel of the first PDU session, or the first radio channel or the second radio channel of at least one QoS flow of the first PDU session, through an RRC message;

a third configuration module configured to use an RRC message to configure the first radio channel and/or the second radio channel of the first PDU session, or the first radio channel of at least one QoS flow of the first PDU session, and delete the second radio channel of at least one QoS flow of the first PDU session; or, a fourth configuration module configured to use an RRC message to configure the first radio channel and/or the second radio channel of the first PDU session, or the second radio channel of at least one QoS flow of the first PDU session, and delete the first radio channel of at least one QoS flow of the first PDU session.

Optionally, the network node further includes:

a status report obtaining module configured to obtain a PDCP transmission status report of the first radio channel.

Optionally, the second data transmission module is configured to, within a preset time period of starting to transmit the second data through the second radio channel, transmit a first PDCP PDU including an IR packet, where the first PDCP PDU is used to carry the second data.

Optionally, the second data transmission module is configured to transmit a second PDCP PDU configured to carry the second data; where a packet header of the second PDCP PDU includes information for indicating encryption with a new key; or, the second PDCP PDU is packaged using a logical channel identifier corresponding to the second radio channel;

or, the first data transmission module is configured to, when the second radio channel and the first radio channel belong to different cells, transmit an end packet to the UE, where the end packet is used to indicate that data of the first PDU session or data of at least one QoS flow of the first PDU session has been switched from the first radio channel to the second radio channel and is carried by the second radio channel.

Optionally, the network node further includes:

a function entity configuration module configured to configure, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or, the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs.

The base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell.

The base station of the second cell informs, the base station of the first cell, of sequence indexes of the next one or more packets to be transmitted and/or sequence indexes of packets still stored in an cache.

The base station of the second cell informs, the base station of the first cell, of sequence indexes of the next one or more packets to be transmitted and/or sequence indexes of packets still stored in an cache, together with carrying time information corresponding to transmission of the packets.

According to the received information, the base station of the first cell forwards packets which are out of sync between the first cell and the second cell.

According to the received information, the base station of the first cell forwards packets which are out of sync between the first cell and the second cell and which are not stored in a cache of the second cell.

The UE informs, the base station of the second cell, of sequence indexes of data packets successfully received in the first cell, and then the base station of the second cell uses a unicast connection to transmit to the UE, packets which are out of sync between the first cell and the second cell.

The UE maintains connection with the first cell and the second cell at the same time, and does not interrupt the connection with the first cell until the UE has received, from the first cell, packets which are out of sync between the first cell and the second cell.

The base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell.

After the UE switches to the second cell, the UE continues to maintain the connection with the first cell and does not interrupt the connection with the first cell until the UE finds that packets received in the second cell are continuous or repeated with packets received from the first cell.

Optionally, the network node further includes:

an indication information transmission module configured to transmit first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;

receive the concurrent demand information transmitted by the UE according to the first indication information and/or the second indication information; and allocate resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, the network node further includes:

a determination module configured to determine whether there is a condition or factor for switching between the first radio channel and the second radio channel, where the condition or factor includes at least one of the following:

the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node;

in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

Referring to FIG. 21, FIG. 21 is a schematic diagram of a UE according to an embodiment of the present disclosure. The UE 210 includes:

a first configuration information receiving module 211 configured to receive first configuration information transmitted by a network node;

a radio channel establishment and/or configuration module 212 configured to, according to the first configuration information, establish and/or configure a first radio channel and/or a second radio channel for a first PDU session, or, establish and/or configure a first radio channel and/or a second radio channel for at least one QoS flow of the first PDU session.

The first radio channel is configured to receive first data transmitted by the network node through the first radio channel.

The second radio channel is configured to receive second data transmitted by the network node through the second radio channel.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the UE further includes:

an establishment and/or configuration module configured to establish and/or configure at least one of a first SDAP entity, a first PDCP configuration, a first RLC entity, a first MAC entity or a first physical layer, to be corresponding to the first radio channel; establish and/or configure at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

Optionally, the establishment and/or configuration module is configured to establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration, the second MAC configuration and the second physical configuration corresponding to the second radio channel; or,
  establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration and the second physical configuration corresponding to the second radio channel; or,
  establish and/or configure the first SDAP configuration, the first PDCP configuration, the first RLC configuration, the first MAC configuration and the first physical configuration corresponding to the first radio channel, and establish and/or configure the second RLC configuration, the second MAC configuration and the second physical configuration corresponding to the second radio channel; or,
  establish and/or configure the first SDAP configuration, the first PDCP configuration, the first RLC configuration, the first MAC configuration and the first physical configuration corresponding to the first radio channel, and establish and/or configure the second RLC configuration and the second physical configuration corresponding to the second radio channel; or,
  establish and/or configure the first SDAP configuration, the first PDCP configuration, the first RLC configuration, the first MAC configuration and the first physical configuration corresponding to the first radio channel, and establish and/or configure the second MAC configuration and the second physical configuration corresponding to the second radio channel; or,
  establish and/or configure the first SDAP configuration, the first PDCP configuration, the first RLC configuration, the first MAC configuration and the first physical configuration corresponding to the first radio channel, and establish and/or configure the second physical configuration corresponding to the second radio channel.

Optionally, the radio channel establishment and/or configuration module 212 is configured to, according to the first configuration information, establish and/or configure a first radio channel and/or a second radio channel for a first PDU session, or, establishing and/or configuring a first radio channel and/or a second radio channel for at least one QoS flow of the first PDU session, in a manner of at least one of the following:
  receiving first type information of the first PDU session and/or at least one QoS flow of the first PDU session of the UE, transmitted by the network;
  receiving second type information of the first PDU session and/or at least one QoS flow of the first PDU session of the UE, transmitted by the network;
  receiving a first type of the first radio channel and/or the second radio channel of the UE, transmitted by the network; or,
  receiving a second type of the first radio channel and/or the second radio channel of the UE, transmitted by the network;
where the first type refers to a service type of unicast, broadcast or multicast;
  the second type refers to a transmission mode type of unicast, broadcast or multicast.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.
  The first BWP is a dedicated BWP, and the second BWP is an initial BWP; or, both the first BWP and the second BWP are initial BWPs.
  Configurations of the initial BWP may be: an initial downlink BWP broadcast in SIB1, and/or, an initial downlink BWP in a serving cell configuration, and/or, an initial BWP corresponding to coreset 0.

Optionally, the UE further includes: a first processing module.
  The first processing module is configured to receive an RRC message, MAC CE and/or physical control signaling, which is transmitted by the network node and is used to activate the first radio channel or the second radio channel, and activate the first radio channel or the second radio channel;
    the first processing module is configured to receive an RRC message, MAC CE and/or physical control signaling, which is transmitted by the network node and is used to activate the first radio channel and the second radio channel, and activate the first radio channel and the second radio channel;
    the first processing module is configured to receive an RRC message, MAC CE and/or physical control signaling, which is transmitted by the network node and is used to activate the first radio channel and deactivate the second radio channel, and activate the first radio channel and deactivating the second radio channel;
    the first processing module is configured to receive an RRC message which is transmitted by the network node and is used to simultaneously establish and/or configure the first radio channel and/or the second radio channel of the first PDU session, and simultaneously establish and/or configure the first radio channel and/or the second radio channel of the first PDU session;
    the first processing module is configured to receive an RRC message which is transmitted by the network node and is used to establish and/or configure the first radio channel or the second radio channel of the first PDU session, and establish and/or configure the first radio channel or the second radio channel of the first PDU session;
    the first processing module is configured to receive an RRC message which is transmitted by the network node and is used to establish and/or configure the first radio channel of the first PDU session and delete the second radio channel, and establish and/or configure the first radio channel of the first PDU session and deleting the second radio channel;

the first processing module is configured to receive an RRC message which is transmitted by the network node and is used to establish and/or configure the second radio channel of the first PDU session and delete the first radio channel, and establish and/or configure the second radio channel of the first PDU session and deleting the first radio channel.

Optionally, the UE further includes:

a status report transmission module configured to transmit a PDCP status report of the first radio channel.

The receiving the second data of the first service transmitted by the network node through the second radio channel, includes:

within a preset time period of starting to receive the second data through the second radio channel, receiving a first PDCP PDU including an IR packet, where the first PDCP PDU is used to carry the second data.

Optionally, the second data receiving module is configured to receive a second PDCP PDU configured to carry the second data; where a packet header of the second PDCP PDU includes information for indicating encryption with a new key; or, the second PDCP PDU is packaged using a logical channel identifier corresponding to the second radio channel;

or, the UE further includes:

an end packet receiving module configured to receive an end packet transmitted by the network node, where the end packet is used to indicate that data of the first PDU session or data of at least one QoS flow of the first PDU session has been switched from the first radio channel to the second radio channel and is carried by the second radio channel.

Referring to FIG. 21b, FIG. 21b shows a network node 2100 according to an embodiment of the present disclosure, which includes:

a first data transmission module 2101 configured to transmit first data to a UE through a first radio channel;

where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

Optionally, the network node further includes: a configuration module configured to configure at least one of a first SDAP configuration, a first PDCP configuration, a first RLC configuration, a first MAC configuration or a first physical configuration corresponding to the first radio channel.

Bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the network node further includes a second processing module.

The second processing module is configured to activate the first radio channel through an RRC message, MAC CE and/or physical control signaling; and/or, the second processing module is configured to deactivate the first radio channel through an RRC message, MAC CE and/or physical control signaling; and/or, the second processing module is configured to configure the first radio channel through an RRC message; and/or, the second processing module is configured to delete the first radio channel through an RRC message.

Optionally, the network node further includes:

an obtaining module configured to obtain relevant information of the second radio channel;

where the second radio channel and the first radio channel are corresponding to the same PDU session configuration or at least one QoS flow of the same PDU session, and the second radio channel is on another network radio node.

Optionally, the obtaining module is configured to obtain data packet transmission status information of the second radio channel.

Optionally, the first data transmission module is configured to transmit a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel;

or, the network node further includes:

an end packet transmission module configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the network node further includes:

a synchronization function entity configuration module configured to configure, at the network node, synchronization function entity.

The synchronization function entity is configured for:

transmitting and/or interacting, through signaling, time information associated with data packet transmission; and/or, adding time information associated with data packet transmission into a data packet;

where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or, the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs.

The base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell.

The base station of the second cell informs, the base station of the first cell, of sequence indexes of the next one or more packets to be transmitted and/or sequence indexes of packets still stored in an cache.

The base station of the second cell informs, the base station of the first cell, of sequence indexes of the next one or more packets to be transmitted and/or sequence indexes of packets still stored in an cache, together with carrying time information corresponding to transmission of the packets.

According to the received information, the base station of the first cell forwards packets which are out of sync between the first cell and the second cell.

According to the received information, the base station of the first cell forwards packets which are out of sync between the first cell and the second cell and which are not stored in a cache of the second cell.

The UE informs, the base station of the second cell, of sequence indexes of data packets successfully received in the first cell, and then the base station of the second cell uses a unicast connection to transmit to the UE, packets which are out of sync between the first cell and the second cell.

The UE maintains connection with the first cell and the second cell at the same time, and does not interrupt the connection with the first cell until the UE has received, from the first cell, packets which are out of sync between the first cell and the second cell.

The base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell.

After the UE switches to the second cell, the UE continues to maintain the connection with the first cell and does not interrupt the connection with the first cell until the UE finds that packets received in the second cell are continuous or repeated with packets received from the first cell.

Figure 22:
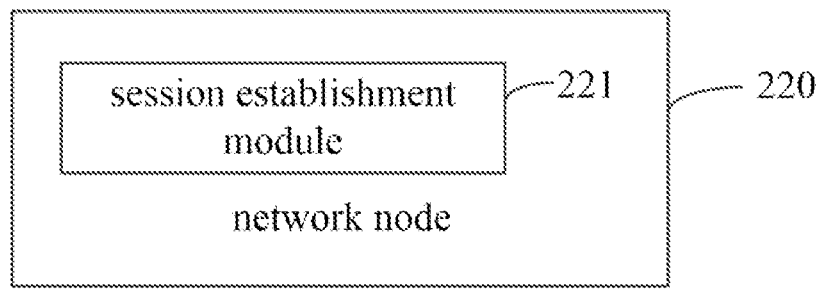
FIG. 22 is a schematic diagram of a network node according to an embodiment of the present disclosure.

Referring to FIG. 22, FIG. 22 is a schematic diagram of a network node according to an embodiment of the present disclosure. The network node 220 includes:

a session establishment module 221 configured to establish two or more protocol data unit (PDU) sessions for a second service;

where a first PDU session is used to transmit third data of the second service to a UE;

a second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Optionally, the network node includes a core network, and the core network includes a decision module.

The decision module is configured to determine a UE in a broadcast or multicast group, which uses a multicast PDU session established for broadcast or multicast services to receive data, and a UE which uses a unicast PDU session established for broadcast or multicast services to receive data; and/or, the decision module is configured to determine, in a broadcast or multicast service, data received by using the broadcast or multicast PDU session of the broadcast or multicast service, data received by using the unicast PDU session; and/or, The decision module is configured to determine some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network, and the core network includes:

a first notification module configured to inform the UE of relationship between the first PDU session and the second PDU session;

a second notification module configured to inform the UE and the base station respectively of relationship between the first PDU session and the second PDU session, when the core network configures a broadcast or multicast PDU session and a unicast PDU session of the same broadcast or multicast service for the UE to receive data; or, a third notification module configured to inform a base station of relationship between the first PDU session and the second PDU session; and then, inform, by the base station, the UE of the relationship between the first PDU session and the second PDU session; or, a fourth notification module configured to inform a base station of relationship between the first PDU session and the second PDU session; or, inform, by the core network, the UE of relationship between the first PDU session and the second PDU session.

Optionally, the network node includes a core network, and the core network includes:
- a fifth notification module configured to inform the UE of a reception mode of the first PDU session and the second PDU session;
- a decision module configured to determine some or all UEs in a broadcast or multicast group, which can not only use a broadcast or multicast PDU session established for a broadcast or multicast service to receive data, but also use a unicast PDU session established for the broadcast or multicast service to receive data;
- where the data received by the UE from the broadcast or multicast PDU session established for the broadcast or multicast service and the data received by the UE from the unicast PDU session established for the broadcast or multicast service may be simultaneous or time-sharing.

Optionally, the network node includes a core network, and the core network includes:
- a selection module configured to, according to quality requirements of a service, and/or arrival characteristics of the service, and/or new radio channel, select for the UE a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

Optionally, the network node includes a core network, and the core network includes:
- a sixth notification module configured to inform a base station of a PDU session type selected for the UE to receive broadcast or multicast services, so that the base station informs the UE of the PDU session type which is selected by the network node for the UE to receive broadcast or multicast service; or,
- a seventh notification module configured to inform a base station of specific time and a PDU session type selected for the UE to receive broadcast or multicast services, so that the base station informs the UE of the specific time and the PDU session type which is selected by the network node for the UE to receive broadcast or multicast service; or,
- an eighth notification module configured to inform a base station of a PDU session type selected for the UE to receive broadcast or multicast services; or, inform the UE of a PDU session type selected for the UE to receive broadcast or multicast services; or,
- a ninth notification module configured to inform a base station of specific time and a PDU session type selected for the UE to receive broadcast or multicast services; or, inform the UE of specific time and a PDU session type selected for the UE to receive broadcast or multicast services.

Optionally, the network node includes:
- an establishment module configured to establish a broadcast or multicast PDU session and a unicast PDU session for the same broadcast or multicast service, for a UE to receive data; and use signaling or a special data packet to activate a to-be-used broadcast or multicast PDU session and/or unicast PDU session established for the same broadcast or multicast service; and/or,
- a deactivation module configured to use signaling or a special data packet to deactivate the broadcast or multicast PDU session and/or unicast PDU session established for the same broadcast or multicast service;
- where the network node may be a node on core network side and/or radio access network side.

Optionally, the network node includes:
- a transmission module configured to transmit the broadcast or multicast PDU session established for the broadcast or multicast service at the network node on the radio access network side, to the UE by using a point-to-point (PTP) and/or point-to-multipoint (PTM) transmission mode; or,
- a receiving module configured to receive a PDU session type reported by the UE, where the PDU session type is determined by the UE itself for receiving the multicast service according to quality requirements of a service, and/or arrival characteristics of the service, and/or new radio channel.

Figure 23:
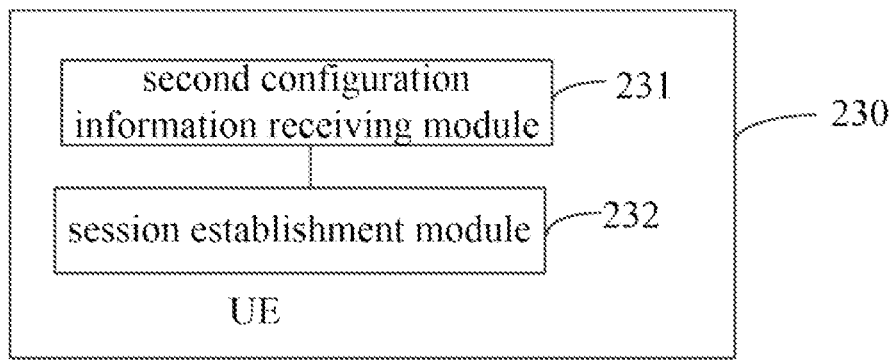
FIG. 23 is a schematic diagram of a terminal according to an embodiment of the present disclosure.

Referring to FIG. 23, FIG. 23 is a schematic diagram of a UE according to an embodiment of the present disclosure. The UE 230 includes:
- a second configuration information receiving module 231 configured to receive second configuration information transmitted by a network node;
- a session establishment module 232 configured to establish two or more PDU sessions for a second service according to the second configuration information.

The first PDU session is used to transmit third data of the second service to the UE.

The second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Figure 24:
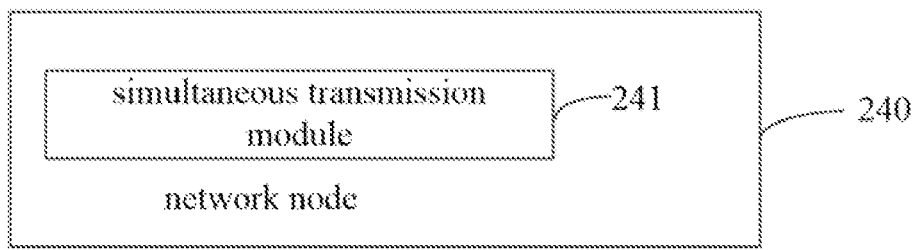
FIG. 24 is a schematic diagram of a network node according to an embodiment of the present disclosure.

Referring to FIG. 24, FIG. 24 is a schematic diagram of a network node according to an embodiment of the present disclosure. The network node 240 includes:
- a simultaneous transmission module 241 configured to transmit PDSCH to a UE; where the PDSCH includes a first transport block and a second transport block, the first transport block is used to transmit data of a unicast service, and the second transport block is used to transmit data of a broadcast or multicast service data.

Optionally, the network node further includes:
- a first information transmission module configured to transmit first information to the UE, where the first information is used to determine a first HARQ feedback resource and a second HARQ feedback resource; and/or,
- a second information transmission module configured to transmit second information to the UE, where the second information is used to determine a first slot interval and a second slot interval;
- where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 25:
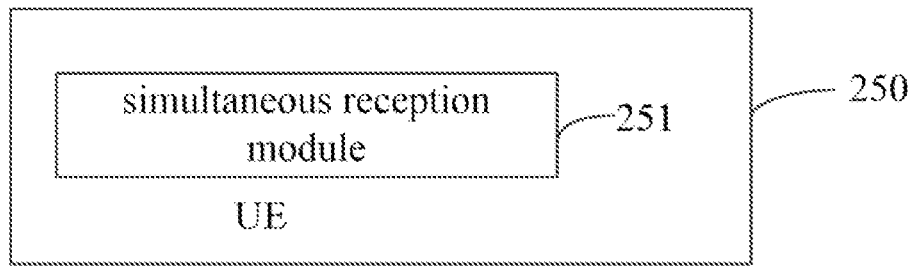
FIG. 25 is a schematic diagram of a terminal according to an embodiment of the present disclosure.

Referring to FIG. 25, FIG. 25 is a schematic diagram of a UE according to an embodiment of the present disclosure. The UE 250 includes:

a simultaneous reception module 251 configured to receive PDSCH transmitted by a network node, where the PDSCH includes a first transport block and a second transport block, the first transport block is used to transmit data of a unicast service, and the second transport block is used to transmit data of a broadcast or multicast service.

Optionally, the network node further includes:

a first information reception module configured to receive first information transmitted by the network node, where the first information is used to determine a first HARQ feedback resource and a second HARQ feedback resource; and/or, a second information reception module configured to receive second information transmitted by the network node, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 26:
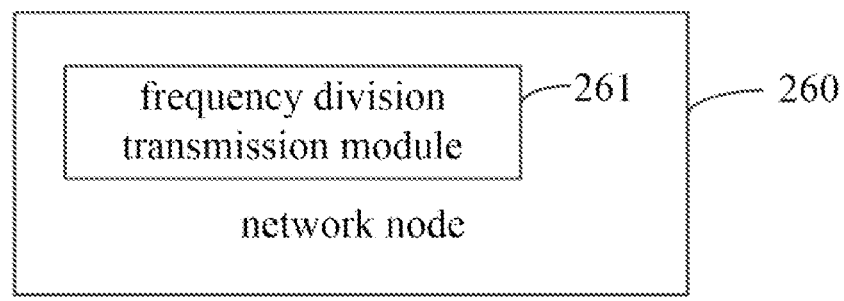
FIG. 26 is a schematic diagram of a network node according to an embodiment of the present disclosure.

Referring to FIG. 26, FIG. 26 is a schematic diagram of a network node according to an embodiment of the present disclosure. The network node 260 includes:

a frequency division transmission module 261 configured to transmit data of a unicast service to a UE through a first BWP, and transmit data of a broadcast or multicast service to the UE through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes:

a third information transmission module configured to, in case that the second BWP is a BWP that has an association relationship with the initial BWP, transmit a system message including third information;

where the third information is used to indicate the association relationship between the second BWP and the initial BWP.

Figure 27:
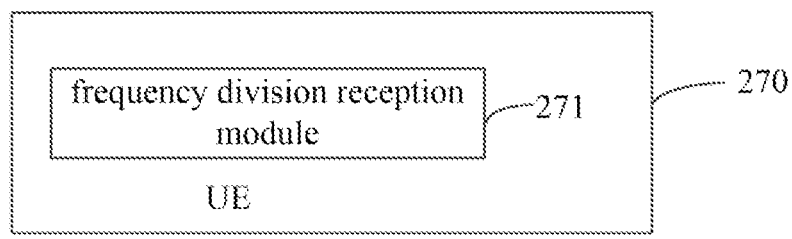
FIG. 27 is a schematic diagram of a terminal according to an embodiment of the present disclosure.

Referring to FIG. 27, FIG. 27 is a schematic diagram of a UE according to an embodiment of the present disclosure. The UE 270 includes:

a frequency division reception module 271 configured to receive data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the network node further includes:

a third information reception module configured to receive a system message including third information;

where the third information is used to indicate an association relationship between the second BWP and the initial BWP.

Figure 28:
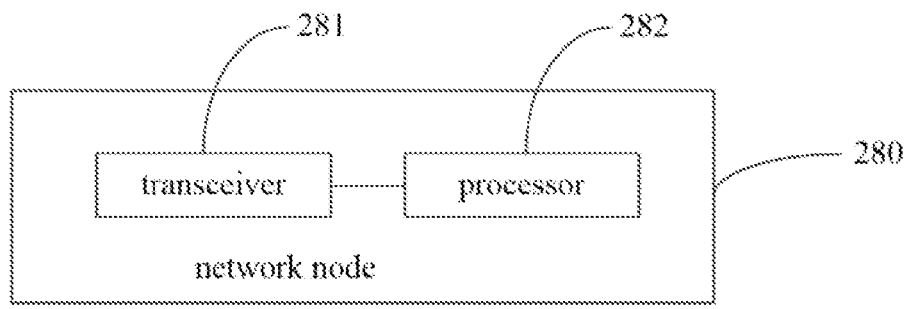
FIG. 28 is a schematic diagram of a network node according to an embodiment of the present disclosure.

Referring to FIG. 28, FIG. 28 is a schematic diagram of a network node according to an embodiment of the present disclosure. The network node 280 includes: a transceiver 281 and a processor 282.

The transceiver 281 is configured to configure a first radio channel and/or a second radio channel for a first PDU session, or configure a first radio channel and/or a second radio channel for at least one same QoS flow of a first PDU session.

The first radio channel is configured to transmit first data to the UE.

The second radio channel is configured to transmit second data to the UE.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the transceiver is configured to configure at least one of a first SDAP configuration, a first PDCP configuration, a first RLC configuration, a first MAC configuration or a first physical configuration corresponding to the first radio channel; configure at least one of a second SDAP configuration, a second PDCP configuration, a second RLC configuration, a second MAC configuration or a second physical configuration corresponding to the second radio channel;
  where at least the first physical configuration is different from the second physical configuration.
The first radio channel and the second radio channel share one radio bearer or two independent radio bearers.
  Optionally, the transceiver is configured to configure the first SDAP configuration, the first PDCP configuration, the first RLC configuration, the first MAC configuration and the first physical configuration corresponding to the first radio channel, and configure the second PDCP configuration, the second RLC configuration, the second MAC configuration and the second physical configuration corresponding to the second radio channel; or,
    configure the first SDAP configuration, the first PDCP configuration, the first RLC configuration, the first MAC configuration and the first physical configuration corresponding to the first radio channel, and configure the second PDCP configuration, the second RLC configuration and the second physical configuration corresponding to the second radio channel; or,
    configure the first SDAP configuration, the first PDCP configuration, the first RLC configuration, the first MAC configuration and the first physical configuration corresponding to the first radio channel, and configure the second RLC configuration, the second MAC configuration and the second physical configuration corresponding to the second radio channel; or,
    configure the first SDAP configuration, the first PDCP configuration, the first RLC configuration, the first MAC configuration and the first physical configuration corresponding to the first radio channel, and configure the second RLC configuration and the second physical configuration corresponding to the second radio channel; or,
    configure the first SDAP configuration, the first PDCP configuration, the first RLC configuration, the first MAC configuration and the first physical configuration corresponding to the first radio channel, and configure the second MAC configuration and the second physical configuration corresponding to the second radio channel; or,
    configure the first SDAP configuration, the first PDCP configuration, the first RLC configuration, the first MAC configuration and the first physical configuration corresponding to the first radio channel, and configure the second physical configuration corresponding to the second radio channel.
  Optionally, the transceiver 281 is configured to configure a first radio channel and/or a second radio channel for a first PDU session, or configure a first radio channel and/or a second radio channel for at least one same QoS flow of a first PDU session, in a manner of at least one of the following:
    indicating first type information of the first PDU session and/or at least one QoS flow of the first PDU session of the UE;
    indicating second type information of the first PDU session and/or at least one QoS flow of the first PDU session of the UE;
    indicating a first type of the first radio channel and/or the second radio channel of the UE; or,
    indicating a second type of the first radio channel and/or the second radio channel of the UE;

where the first type refers to a service type of unicast, broadcast or multicast;
  the second type refers to a transmission mode type of unicast, broadcast or multicast.
  Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.
  Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.
  Optionally, bandwidth parts (BWPs) corresponding to the broadcast or multicast radio channel include a first BWP and a second BWP.
  The first BWP is a dedicated BWP, and the second BWP is an initial BWP; or, both the first BWP and the second BWP are initial BWPs.
  Configurations of the initial BWP may be: an initial downlink BWP broadcast in SIB1, and/or, an initial downlink BWP in a serving cell configuration, and/or, an initial BWP corresponding to control resource set (coreset) 0.
  Optionally, the transceiver is configured to perform at least one of the following:
    activating the first radio channel or the second radio channel through an RRC message, MAC CE and/or physical control signaling;
    activating the first radio channel and the second radio channel through an RRC message, MAC CE and/or physical control signaling;
    activating the first radio channel and deactivating the second radio channel through an RRC message, MAC CE and/or physical control signaling;
    simultaneously configuring the first radio channel and/or the second radio channel of the first PDU session or the first radio channel and the second radio channel of at least one QoS flow of the first PDU session, through an RRC message;
    configuring the first radio channel and/or the second radio channel of the first PDU session, or the first radio channel or the second radio channel of at least one QoS flow of the first PDU session, through an RRC message;
    using an RRC message to configure the first radio channel and/or the second radio channel of the first PDU session, or the first radio channel of at least one QoS flow of the first PDU session, and delete the second radio channel of at least one QoS flow of the first PDU session; or,
    using an RRC message to configure the first radio channel and/or the second radio channel of the first PDU session, or the second radio channel of at least one QoS flow of the first PDU session, and delete the first radio channel of at least one QoS flow of the first PDU session.
  Optionally, the transceiver is configured to obtain a PDCP transmission status report of the first radio channel.
  Optionally, the transceiver is configured to, within a preset time period of starting to transmit the second data through the second radio channel, transmit a first PDCP PDU including an IR packet, where the first PDCP PDU is used to carry the second data.

Optionally, the transceiver is configured to transmit a second PDCP PDU configured to carry the second data; where a packet header of the second PDCP PDU includes information for indicating encryption with a new key; or, the second PDCP PDU is packaged using a logical channel identifier corresponding to the second radio channel;

or, the transceiver is configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the transceiver is configured to configure, at the network node, synchronization function entity.

The synchronization function entity is configured for:
transmitting and/or interacting, through signaling, time information associated with data packet transmission; and/or,
adding time information associated with data packet transmission into a data packet;
where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The transceiver is configured to perform at least one of the following:

the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;

the base station of the second cell informs, the base station of the first cell, of sequence indexes of the next one or more packets to be transmitted and/or sequence indexes of packets still stored in an cache;

the base station of the second cell informs, the base station of the first cell, of sequence indexes of the next one or more packets to be transmitted and/or sequence indexes of packets still stored in an cache, together with carrying time information corresponding to transmission of the packets;

according to the received information, the base station of the first cell forwards packets which are out of sync between the first cell and the second cell;

according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

Optionally, the transceiver is configured to transmit first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;

receive the concurrent demand information transmitted by the UE according to the first indication information and/or the second indication information; and allocate resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, the processor is configured to determine whether there is a condition or factor for switching between the first radio channel and the second radio channel, where the condition or factor includes at least one of the following:

the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node;

in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

Figure 29:
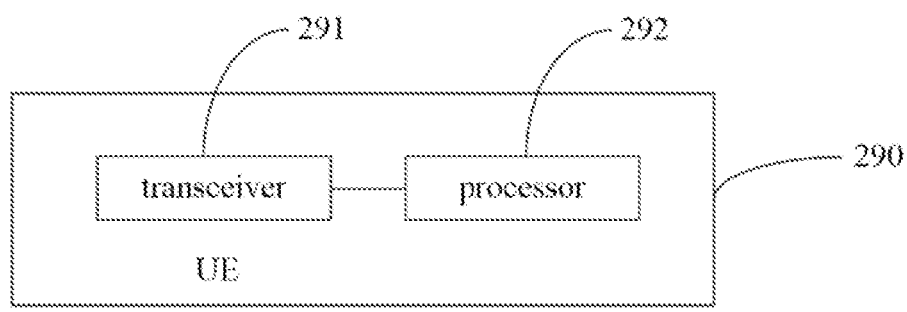
FIG. 29 is a schematic diagram of a terminal according to an embodiment of the present disclosure.

Referring to FIG. 29, FIG. 29 is a schematic diagram of a UE according to an embodiment of the present disclosure. The UE 290 includes a transceiver 291 and a processor 292.

The transceiver is configured to receive first configuration information transmitted by a network node.

The transceiver is configured to, according to the first configuration information, establish and/or configure a first radio channel and/or a second radio channel for a first PDU session, or, establish and/or configure a first radio channel and/or a second radio channel for at least one QoS flow of the first PDU session.

The first radio channel is configured to receive first data transmitted by the network node through the first radio channel.

The second radio channel is configured to receive second data transmitted by the network node through the second radio channel.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the processor is configured to establish and/or configure at least one of a first SDAP entity, a first PDCP configuration, a first RLC entity, a first MAC entity or a first physical layer, to be corresponding to the first radio channel; establish and/or configure at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

Optionally, the processor is configured to establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second PDCP configuration, the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration, the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second RLC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second MAC configuration and the second physical configuration corresponding to the second radio channel; or, establish and/or configure the first SDAP configuration, the first PDCP configuration, the first RLC configuration, the first MAC configuration and the first physical configuration corresponding to the first radio channel, and establish and/or configure the second physical configuration corresponding to the second radio channel.

Optionally, the transceiver is configured to, according to the first configuration information, establishing and/or configuring a first radio channel and/or a second radio channel for a first PDU session, or, establishing and/or configuring a first radio channel and/or a second radio channel for at least one QoS flow of the first PDU session, in a manner of at least one of the following:

receiving first type information of the first PDU session and/or at least one QoS flow of the first PDU session of the UE, transmitted by the network;

receiving second type information of the first PDU session and/or at least one QoS flow of the first PDU session of the UE, transmitted by the network;

receiving a first type of the first radio channel and/or the second radio channel of the UE, transmitted by the network; or, receiving a second type of the first radio channel and/or the second radio channel of the UE, transmitted by the network;

where the first type refers to a service type of unicast, broadcast or multicast;

the second type refers to a transmission mode type of unicast, broadcast or multicast.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the transceiver is configured to receive an RRC message, MAC CE and/or physical control signaling, which is transmitted by the network node and is used to activate the first radio channel or the second radio channel, and activate the first radio channel or the second radio channel; or, receive an RRC message, MAC CE and/or physical control signaling, which is transmitted by the network node and is used to activate the first radio channel and the second radio channel, and activate the first radio channel and the second radio channel;

receive an RRC message, MAC CE and/or physical control signaling, which is transmitted by the network node and is used to activate the first radio channel and deactivate the second radio channel, and activate the first radio channel and deactivate the second radio channel;

receive an RRC message which is transmitted by the network node and is used to simultaneously establish and/or configure the first radio channel and/or the second radio channel of the first PDU session, and simultaneously establish and/or configure the first radio channel and/or the second radio channel of the first PDU session;

receive an RRC message which is transmitted by the network node and is used to establish and/or configure the first radio channel or the second radio channel of the first PDU session, and establish and/or configure the first radio channel or the second radio channel of the first PDU session;

receive an RRC message which is transmitted by the network node and is used to establish and/or configure the first radio channel of the first PDU session and delete the second radio channel, and establish and/or configure the first radio channel of the first PDU session and delete the second radio channel;

receive an RRC message which is transmitted by the network node and is used to establish and/or configure the second radio channel of the first PDU session and delete the first radio channel, and establish and/or configure the second radio channel of the first PDU session and delete the first radio channel.

Optionally, the transceiver is configured to transmit a PDCP status report of the first radio channel.

Optionally, the transceiver is configured to, within a preset time period of starting to receive the second data through the second radio channel, receive a first PDCP PDU including an IR packet, where the first PDCP PDU is used to carry the second data.

Optionally, the transceiver is configured to receive a second PDCP PDU configured to carry the second data; where a packet header of the second PDCP PDU includes information for indicating encryption with a new key; or, the second PDCP PDU is packaged using a logical channel identifier corresponding to the second radio channel;

or, when the second radio channel and the first radio channel belong to different cells, before receiving the second data transmitted by the network node to the UE through the second radio channel, the transceiver is further configured to:

receive an end packet transmitted by the network node, where the end packet is used to indicate that data of the first PDU session or data of at least one QoS flow of the first PDU session has been switched from the first radio channel to the second radio channel and is carried by the second radio channel.

Figure 29A:
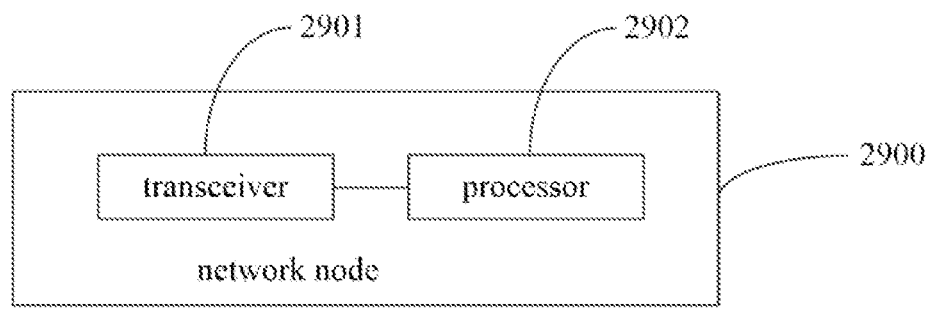
FIG. 29a is a schematic diagram of a network node according to an embodiment of the present disclosure.

Referring to FIG. 29*a*, FIG. 29*a* is a schematic diagram of a network node according to an embodiment of the present disclosure. The network node 2900 includes a transceiver 2901 and a processor 2902.

The transceiver is configured to transmit first data to a UE through a first radio channel;

where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

Optionally, the transceiver is configured to configure at least one of a first SDAP configuration, a first PDCP configuration, a first RLC configuration, a first MAC configuration or a first physical configuration corresponding to the first radio channel.

Optionally, bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the transceiver is configured to activate the first radio channel through an RRC message, MAC CE and/or physical control signaling; and/or,
   deactivate the first radio channel through an RRC message, MAC CE and/or physical control signaling; and/or,
   configure the first radio channel through an RRC message; or,
   delete the first radio channel through an RRC message.

Optionally, the transceiver is configured to obtain relevant information of the second radio channel;
   where the second radio channel and the first radio channel are corresponding to the same PDU session configuration or at least one QoS flow of the same PDU session, and the second radio channel is on another network radio node.

Optionally, the transceiver is configured to obtain data packet transmission status information of the second radio channel.

Optionally, the transceiver is configured to transmit a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel; or,
   the transceiver is configured to transmit an end packet to the UE, where the end packet is used to indicate that data of the first PDU session or data of at least one QoS flow of the first PDU session has been switched from the first radio channel to the second radio channel and is carried by the second radio channel.

Optionally, the transceiver is configured to configure, at the network node, synchronization function entity.
   The synchronization function entity is configured for:
   transmitting and/or interacting, through signaling, time information associated with data packet transmission; and/or,
   adding time information associated with data packet transmission into a data packet;
   where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
   the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The network node further performs at least one of the following:
   the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
   the base station of the second cell informs, the base station of the first cell, of sequence indexes of the next one or more packets to be transmitted and/or sequence indexes of packets still stored in an cache;
   the base station of the second cell informs, the base station of the first cell, of sequence indexes of the next one or more packets to be transmitted and/or sequence indexes of packets still stored in an cache, together with carrying time information corresponding to transmission of the packets;
   according to the received information, the base station of the first cell forwards packets which are out of sync between the first cell and the second cell;
   according to the received information, the base station of the first cell forwards packets which are out of sync between the first cell and the second cell and which are not stored in a cache of the second cell;
   the UE informs, the base station of the second cell, of sequence indexes of data packets successfully received in the first cell, and then the base station of the second cell uses a unicast connection to transmit to the UE, packets which are out of sync between the first cell and the second cell;
   the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

Figure 30:
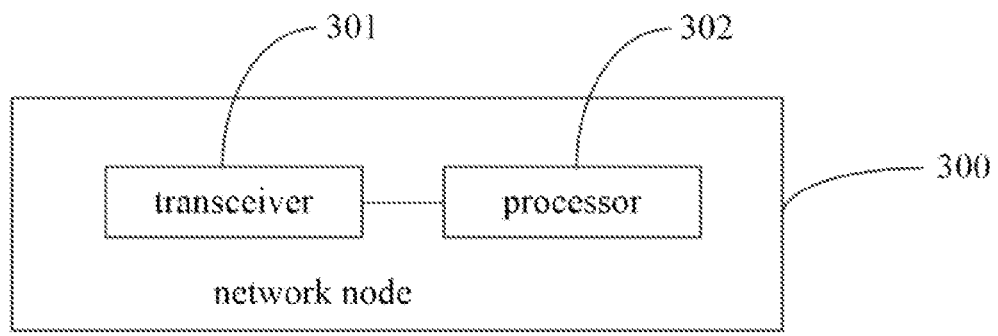
FIG. 30 is a schematic diagram of a network node according to an embodiment of the present disclosure.

Referring to FIG. 30, FIG. 30 is a schematic diagram of a network node according to an embodiment of the present disclosure. The network node 300 includes: a transceiver 301 and a processor 302.

The transceiver 301 is configured to establish two or more protocol data unit (PDU) sessions for a second service;
where a first PDU session is used to transmit third data of the second service to a UE;
a second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Optionally, the network node includes a core network; and the processor is configured to determine a UE in a broadcast or multicast group, which uses a multicast PDU session established for broadcast or multicast services to receive data, and a UE which uses a unicast PDU session established for broadcast or multicast services to receive data; and/or,
determine, in a broadcast or multicast service, data received by using the broadcast or multicast PDU session of the broadcast or multicast service, data received by using the unicast PDU session; and/or,
determine, some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network; and the transceiver is configured to inform the UE of relationship between the first PDU session and the second PDU session;
inform the UE and the base station respectively of relationship between the first PDU session and the second PDU session, when the core network configures a broadcast or multicast PDU session and a unicast PDU session of the same broadcast or multicast service for the UE to receive data; or, inform a base station of relationship between the first PDU session and the second PDU session, so that the base station informs the UE of the relationship between the first PDU session and the second PDU session; or,
inform a base station of relationship between the first PDU session and the second PDU session; or, inform the UE of relationship between the first PDU session and the second PDU session.

Optionally, the network node includes a core network, and the transceiver is configured to inform the UE of a reception mode of the first PDU session and the second PDU session.

The processor is configured to determine some or all UEs in a broadcast or multicast group, which can not only use a broadcast or multicast PDU session established for a broadcast or multicast service to receive data, but also use a unicast PDU session established for the broadcast or multicast service to receive data;
where the data received by the UE from the broadcast or multicast PDU session established for the broadcast or multicast service and the data received by the UE from the unicast PDU session established for the broadcast or multicast service may be simultaneous or time-sharing.

Optionally, the network node includes a core network; and the processor is configured to, according to quality requirements of a service, and/or arrival characteristics of the service, and/or new radio channel, select for the UE, a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

Optionally, the network node includes a core network; and the transceiver is configured to inform a base station of a PDU session type selected for the UE to receive broadcast or multicast services, so that the base station informs the UE of the PDU session type which is selected by the network node for the UE to receive broadcast or multicast service; or,
inform a base station of specific time and a PDU session type selected for the UE to receive broadcast or multicast services, so that the base station informs the UE of the specific time and the PDU session type which is selected by the network node for the UE to receive broadcast or multicast service; or,
inform a base station of a PDU session type selected for the UE to receive broadcast or multicast services; or, inform the UE of a PDU session type selected for the UE to receive broadcast or multicast services; or,
inform a base station of specific time and a PDU session type selected for the UE to receive broadcast or multicast services; or, inform the UE of specific time and a PDU session type selected for the UE to receive broadcast or multicast services.

Optionally, the transceiver is configured to establish a broadcast or multicast PDU session and a unicast PDU session for the same broadcast or multicast service, for a UE to receive data; and use signaling or a special data packet to activate a to-be-used broadcast or multicast PDU session and/or unicast PDU session established for the same broadcast or multicast service;

and/or, the transceiver is configured to use signaling or a special data packet to deactivate the broadcast or multicast PDU session and/or unicast PDU session established for the same broadcast or multicast service;

where the network node may be a node on core network side and/or radio access network side.

Optionally, the transceiver is configured to transmit the broadcast or multicast PDU session established for the broadcast or multicast service at the network node on the radio access network side, to the UE by using a point-to-point (PTP) and/or point-to-multipoint (PTM) transmission mode; or, receive a PDU session type reported by the UE, where the PDU session type is determined by the UE itself for receiving the multicast service according to quality requirements of a service, and/or arrival characteristics of the service, and/or new radio channel.

Figure 31:
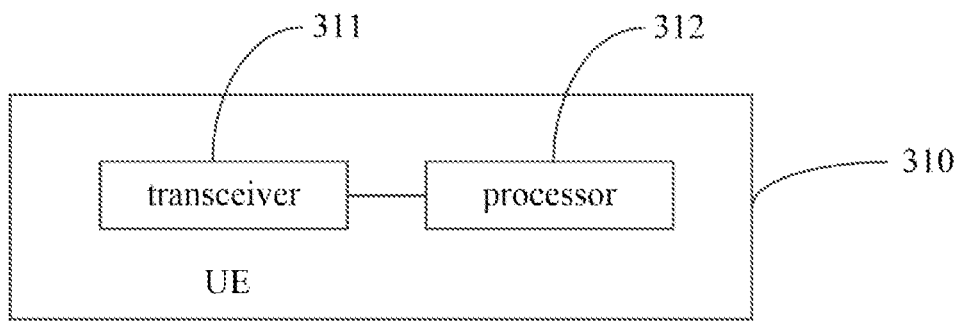
FIG. 31 is a schematic diagram of a terminal according to an embodiment of the present disclosure.

Referring to FIG. 31, FIG. 31 is a schematic diagram of a UE according to an embodiment of the present disclosure. The UE 310 includes a transceiver 311 and a processor 312.

The transceiver is configured to receive second configuration information transmitted by a network node.

The transceiver is configured to establish two or more PDU sessions for the second service according to the second configuration information.

The first PDU session is used to transmit third data of the second service to the UE.

The second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Figure 32:
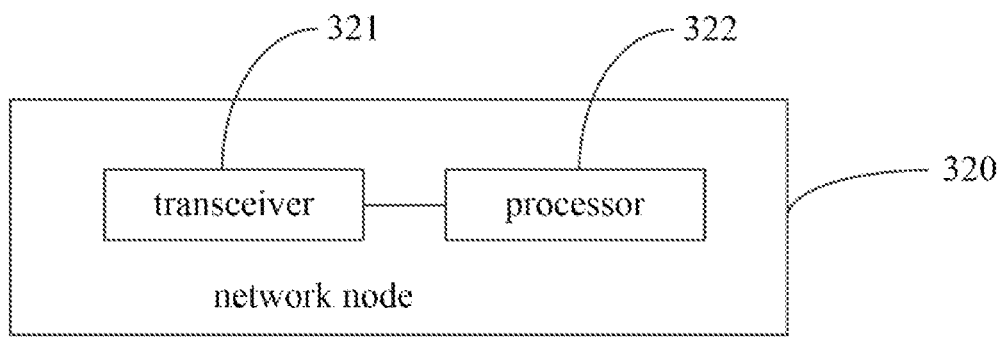
FIG. 32 is a schematic diagram of a network node according to an embodiment of the present disclosure.

Referring to FIG. 32, FIG. 32 is a schematic diagram of a network node according to an embodiment of the present disclosure. The network node 320 includes: a transceiver 321 and a processor 322.

The transceiver is configured to transmit PDSCH to a UE; where the PDSCH includes a first transport block and a second transport block, the first transport block is used to transmit data of a unicast service, and the second transport block is used to transmit data of a broadcast or multicast service data.

Optionally, the transceiver is configured to transmit first information to the UE, where the first information is used to determine a first HARQ feedback resource and a second HARQ feedback resource; and/or, transmit second information to the UE, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 33:
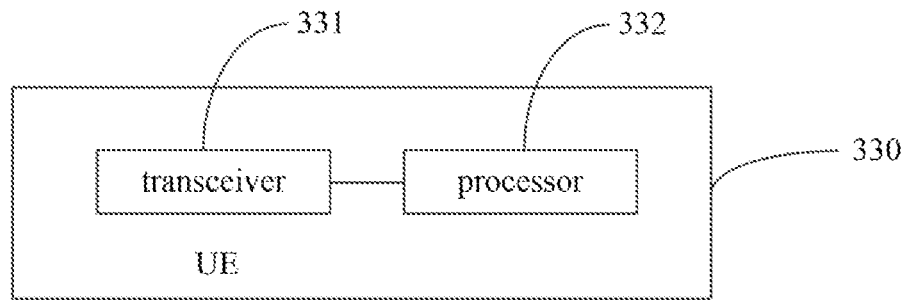
FIG. 33 is a schematic diagram of a terminal according to an embodiment of the present disclosure.

Referring to FIG. 33, FIG. 33 is a schematic diagram of a UE according to an embodiment of the present disclosure. The UE 330 includes a transceiver 331 and a processor 332.

The transceiver 331 is configured to receive PDSCH transmitted by a network node, where the PDSCH includes a first transport block and a second transport block, the first transport block is used to transmit data of a unicast service, and the second transport block is used to transmit data of a broadcast or multicast service.

Optionally, the transceiver is configured to receive first information transmitted by the network node, where the first information is used to determine a first HARQ feedback resource and a second HARQ feedback resource; and/or, receive second information transmitted by the network node, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 34:
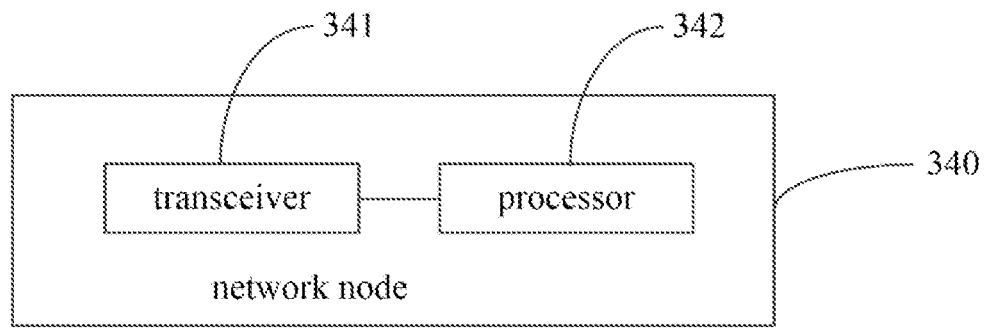
FIG. 34 is a schematic diagram of a network node according to an embodiment of the present disclosure.

Referring to FIG. 34, FIG. 34 is a schematic diagram of a network node according to an embodiment of the present disclosure. The network node 340 includes a transceiver 341 and a processor 342.

The transceiver is configured to transmit data of a unicast service to a UE through a first BWP, and transmit data of a broadcast or multicast service to the UE through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the transceiver is configured to, in case that the second BWP is a BWP that has an association relationship with the initial BWP, transmit a system message including third information;
where the third information is used to indicate the association relationship between the second BWP and the initial BWP.

Figure 35:
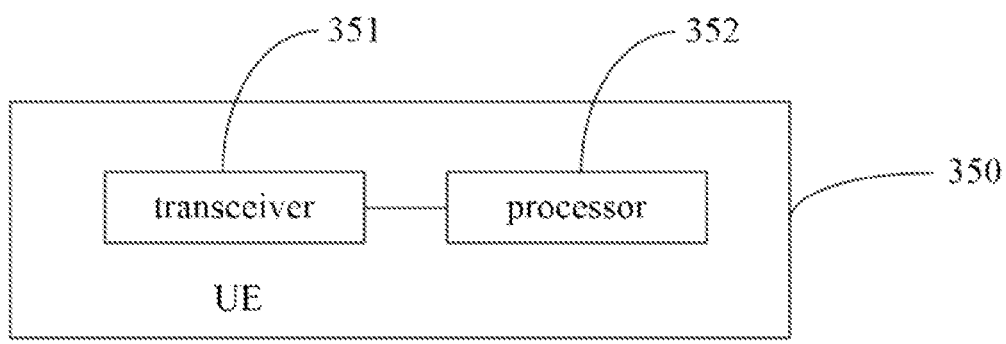
FIG. 35 is a schematic diagram of a terminal according to an embodiment of the present disclosure.

Referring to FIG. 35, FIG. 35 is a schematic diagram of a UE according to an embodiment of the present disclosure. The UE 350 includes a transceiver 351 and a processor 352.

The transceiver is configured to receive data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the transceiver is configured to receive a system message including the third information;
where the third information is used to indicate an association relationship between the second BWP and the initial BWP.

Figure 36:
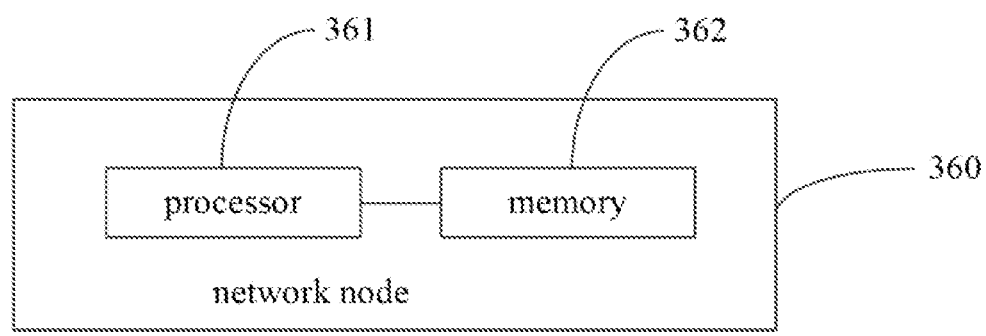
FIG. 36 is a schematic diagram of a network node according to an embodiment of the present disclosure.

Referring to FIG. 36, FIG. 36 is a schematic diagram of a network node according to an embodiment of the present disclosure. The network node 360 includes a processor 361, a memory 362, and a program stored on the memory 362 and executable on the processor 361. The processor 361 executes the program to implement the following steps:
configuring a first radio channel and/or a second radio channel for a first PDU session, or configuring a first radio channel and/or a second radio channel for at least one same QoS flow of a first PDU session.

The first radio channel is configured to transmit first data to the UE.

The second radio channel is configured to transmit second data to the UE.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the processor 361 executes the program to further implement the following steps:
configuring a first radio channel and/or a second radio channel for a first PDU session, or configuring a first radio channel and/or a second radio channel for at least one same QoS flow of a first PDU session, in a way including:
configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel;
where at least the first physical configuration is different from the second physical configuration.

The first radio channel and the second radio channel share one radio bearer or two independent radio bearers.

Optionally, the processor 361 executes the program to further implement the following steps:
configuring the first SDAP configuration, the first PDCP configuration, the first RLC configuration, the first MAC configuration and the first physical configuration corresponding to the first radio channel, and configuring the second PDCP configuration, the second RLC configuration, the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second PDCP configuration, the second RLC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second RLC configuration, the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second RLC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second physical configuration corresponding to the second radio channel.

Optionally, the processor 361 executes the program to further implement the following steps: configuring a first radio channel and/or a second radio channel for a first PDU session, or configuring a first radio channel and/or a second radio channel for at least one same QoS flow of a first PDU session, in a way including at least one of the following:
indicating first type information of the first PDU session and/or at least one QoS flow of the first PDU session of the UE;
indicating second type information of the first PDU session and/or at least one QoS flow of the first PDU session of the UE;
indicating a first type of the first radio channel and/or the second radio channel of the UE; or,
indicating a second type of the first radio channel and/or the second radio channel of the UE;

where the first type refers to a service type of unicast, broadcast or multicast;
the second type refers to a transmission mode type of unicast, broadcast or multicast.

Optionally, when the second radio channel and the first radio channel belong to the same cell and/or different cells of the same network node, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of multiple first UEs are the same. The relevant parameters include at least one of security context information, security key, integrity protection configuration information, header compression algorithm and header compression context information. The first UE is a UE that receives data of the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the processor 361 executes the program to further implement at least one of the following steps:
  activating the first radio channel or the second radio channel through an RRC message, MAC CE and/or physical control signaling;
  activating the first radio channel and the second radio channel through an RRC message, MAC CE and/or physical control signaling;
  activating the first radio channel and deactivating the second radio channel through an RRC message, MAC CE and/or physical control signaling;
  simultaneously configuring the first radio channel and/or the second radio channel of the first PDU session or the first radio channel and the second radio channel of at least one QoS flow of the first PDU session, through an RRC message;
  configuring the first radio channel and/or the second radio channel of the first PDU session, or the first radio channel or the second radio channel of at least one QoS flow of the first PDU session, through an RRC message;
  using an RRC message to configure the first radio channel and/or the second radio channel of the first PDU session, or the first radio channel of at least one QoS flow of the first PDU session, and delete the second radio channel of at least one QoS flow of the first PDU session; or,
  using an RRC message to configure the first radio channel and/or the second radio channel of the first PDU session, or the second radio channel of at least one QoS flow of the first PDU session, and delete the first radio channel of at least one QoS flow of the first PDU session.

Optionally, the processor 361 executes the program to further implement the following steps:
  before transmitting the second data to the UE through the second radio channel, obtaining a PDCP transmission status report of the first radio channel.

Optionally, the processor 361 executes the program to further implement the following steps:
  transmitting the second data to the UE through the second radio channel, in a way including: within a preset time period of starting to transmit the second data through the second radio channel, transmitting a first PDCP PDU including an IR packet, where the first PDCP PDU is used to carry the second data.

Optionally, the processor 361 executes the program to further implement the following steps:
  transmitting the second data to the UE through the second radio channel, in a way including:
  transmitting a second PDCP PDU configured to carry the second data; where a packet header of the second PDCP PDU includes information for indicating encryption with a new key; or, the second PDCP PDU is packaged using a logical channel identifier corresponding to the second radio channel;
  or,
  when the second radio channel and the first radio channel belong to different cells, before transmitting the second data to the UE through the second radio channel, transmitting an end packet to the UE, where the end packet is used to indicate that data of the first PDU session or data of at least one QoS flow of the first PDU session has been switched from the first radio channel to the second radio channel and is carried by the second radio channel.

Optionally, the processor 361 executes the program to further implement the following steps: configuring, at the network node, synchronization function entity.

The synchronization function entity is configured for:
  transmitting and/or interacting, through signaling, time information associated with data packet transmission; and/or,
  adding time information associated with data packet transmission into a data packet;
  where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
  the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The processor 361 executes the program to further implement at least one of the following steps:
  the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
  the base station of the second cell informs, the base station of the first cell, of sequence indexes of the next one or more packets to be transmitted and/or sequence indexes of packets still stored in an cache;
  the base station of the second cell informs, the base station of the first cell, of sequence indexes of the next one or more packets to be transmitted and/or sequence indexes of packets still stored in an cache, together with carrying time information corresponding to transmission of the packets;
  according to the received information, the base station of the first cell forwards packets which are out of sync between the first cell and the second cell;
  according to the received information, the base station of the first cell forwards packets which are out of sync between the first cell and the second cell and which are not stored in a cache of the second cell;
  the UE informs, the base station of the second cell, of sequence indexes of data packets successfully received in the first cell, and then the base station of the second cell uses a unicast connection to transmit to the UE, packets which are out of sync between the first cell and the second cell;
  the UE maintains connection with the first cell and the second cell at the same time, and does not interrupt the connection with the first cell until the UE has received, from the first cell, packets which are out of sync between the first cell and the second cell;
  the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;
  after the UE switches to the second cell, the UE continues to maintain the connection with the first cell and does not interrupt the connection with the first cell until the UE finds that packets received in the second cell are continuous or repeated with packets received from the first cell.

Optionally, the processor 361 executes the program to further implement the following steps:
  transmitting first indication information and/or second indication information to the UE; where the first indication information is used to indicate the broadcast or multicast service which is being transmitted by the network node, and the second indication information is used to instruct the UE to report concurrent demand information, and the concurrent demand information includes first concurrent demand information for unicast service and broadcast or multicast service and/or second concurrent demand information for multiple broadcast or multicast services;
  receiving the concurrent demand information transmitted by the UE according to the first indication information and/or the second indication information;
  and
  allocating resources to the UE according to the concurrent demand information.

Optionally, the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

Optionally, the processor 361 executes the program to further implement the following steps:
  before transmitting the second data to the UE through the second radio channel, performing at least one of the following:
  determining whether there is a condition or factor for switching between the first radio channel and the second radio channel, where the condition or factor includes at least one of the following:
  the number of participating UEs, quality of service (QoS) information, quality of experience (QoE), channel quality information, a status of UE receiving data packets, or transmission mode information selected by UE, a big data analysis node, a core network, an artificial intelligence analysis node and/or a network management node; where the condition or factor for switching may further include location of the UE;
  in case that most of participating UEs of a multicast or broadcast are concentrated in a first beam and a second beam, if one or more UEs cannot receive information on the first beam and the second beam, a unicast radio channel is used for these UEs which cannot receive information on the first beam and the second beam;
  the number of data packets that the UE fails to receive is greater than or equal to a certain threshold or the number of data packets that the UE successfully receives is less than or equal to the certain threshold, multicast transmission is switched to unicast transmission; or,
  if the number of data packets that the UE fails to receive is less than or equal to a certain threshold or the number of data packets that the UE successfully receives is greater than or equal to the certain threshold, unicast transmission is switched to multicast transmission.

Optionally, at least one of the following information is notified to the core network by the radio access network side, the UE, the big data analysis node, the artificial intelligence analysis node and/or a network management node:

the number of participating UEs, channel quality information, status of UE receiving data packets, and selected transmission mode information.

Figure 37:
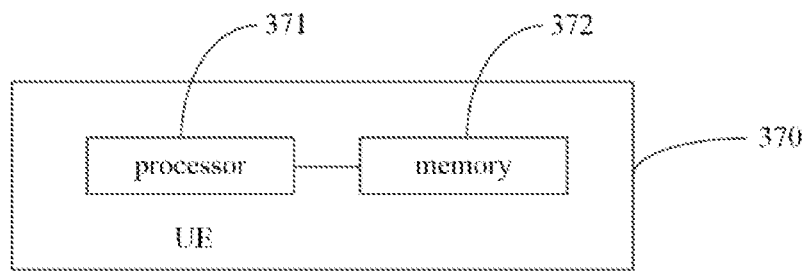
FIG. 37 is a schematic diagram of a terminal according to an embodiment of the present disclosure.

Referring to FIG. 37, FIG. 37 is a schematic diagram of a UE according to an embodiment of the present disclosure. The UE 370 includes a processor 371, a memory 372, and a program stored in the memory 372 and executable on the processor 371. The processor 371 executes the program to implement the following steps:

receiving first configuration information transmitted by a network node;

according to the first configuration information, establishing and/or configuring a first radio channel and/or a second radio channel for a first PDU session, or, establishing and/or configuring a first radio channel and/or a second radio channel for at least one QoS flow of the first PDU session.

The first radio channel is configured to receive first data transmitted by the network node through the first radio channel.

The second radio channel is configured to receive second data transmitted by the network node through the second radio channel.

The first radio channel is one of a unicast radio channel, a broadcast or multicast radio channel, and the second radio channel is the other one of the unicast radio channel and the broadcast or multicast radio channel.

The first data represents first data of the first PDU session or first data of at least one QoS flow of the first PDU session.

The second data represents second data of the first PDU session or second data of at least one QoS flow of the first PDU session.

Optionally, the second data is the same as the first data, or the second data is a subset of the first data, or, the second data and the first data have no intersection, or, the second data is partially the same as the first data.

Optionally, the processor 371 executes the program to further implement the following steps:

establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel;

where at least the first physical configuration is different from the second physical configuration.

The first radio channel and the second radio channel share one radio bearer or two independent radio bearers.

Optionally, the processor 371 executes the program to further implement the following steps:

establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel, in a way including:

establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration, the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second RLC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second MAC configuration and the second physical configuration corresponding to the second radio channel; or, establishing and/or configuring the first SDAP configuration, the first PDCP configuration, the first RLC configuration, the first MAC configuration and the first physical configuration corresponding to the first radio channel, and establishing and/or configuring the second physical configuration corresponding to the second radio channel.

Optionally, the processor 371 executes the program to further implement the following steps: according to the first configuration information, establishing and/or configuring a first radio channel and/or a second radio channel for a first PDU session, or, establishing and/or configuring a first radio channel and/or a second radio channel for at least one QoS flow of the first PDU session, in a way including at least one of the following:

receiving first type information of the first PDU session and/or at least one QoS flow of the first PDU session of the UE, transmitted by the network;

receiving second type information of the first PDU session and/or at least one QoS flow of the first PDU session of the UE, transmitted by the network;

receiving a first type of the first radio channel and/or the second radio channel of the UE, transmitted by the network; or, receiving a second type of the first radio channel and/or the second radio channel of the UE, transmitted by the network;

where the first type refers to a service type of unicast, broadcast or multicast; the second type refers to a transmission mode type of unicast, broadcast or multicast.

Optionally, when the second radio channel and the first radio channel belong to the same cell, relevant parameters of the first PDCP layer and the second PDCP layer are the same. The relevant parameters include at least one of security context information, security key, integrity protection configuration information, header compression algorithm and header compression context information.

Optionally, the relevant parameters of PDCP layers corresponding to unicast radio channels of the UE are the same as those of a first UE. The relevant parameters include at least one of security context information, security key, integrity protection configuration information, header compression algorithm and header compression context information. The first UE and the UE are UEs corresponding to the broadcast or multicast radio channel.

Optionally, bandwidth parts (BWPs) corresponding to the broadcast or multicast radio channel include a first BWP and a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the processor 371 executes the program to further implement at least one of the following steps:
receiving an RRC message, MAC CE and/or physical control signaling, which is transmitted by the network node and is used to activate the first radio channel or the second radio channel, and activating the first radio channel or the second radio channel;
receiving an RRC message, MAC CE and/or physical control signaling, which is transmitted by the network node and is used to activate the first radio channel and the second radio channel, and activating the first radio channel and the second radio channel;
receiving an RRC message, MAC CE and/or physical control signaling, which is transmitted by the network node and is used to activate the first radio channel and deactivate the second radio channel, and activating the first radio channel and deactivating the second radio channel;
receiving an RRC message which is transmitted by the network node and is used to simultaneously establish and/or configure the first radio channel and/or the second radio channel of the first PDU session, and simultaneously establishing and/or configuring the first radio channel and/or the second radio channel of the first PDU session;
receiving an RRC message which is transmitted by the network node and is used to establish and/or configure the first radio channel or the second radio channel of the first PDU session, and establishing and/or configuring the first radio channel or the second radio channel of the first PDU session;
receiving an RRC message which is transmitted by the network node and is used to establish and/or configure the first radio channel of the first PDU session and delete the second radio channel, and establishing and/or configuring the first radio channel of the first PDU session and deleting the second radio channel;
receiving an RRC message which is transmitted by the network node and is used to establish and/or configure the second radio channel of the first PDU session and delete the first radio channel, and establishing and/or configuring the second radio channel of the first PDU session and deleting the first radio channel.

Optionally, the processor 371 executes the program to further implement the following steps:
before receiving the second data of the first service transmitted by the network node through the second radio channel, transmitting a PDCP status report of the first radio channel.

Optionally, the processor 371 executes the program to further implement the following steps:
receiving the second data of the first service transmitted by the network node through the second radio channel, in a way including:
within a preset time period of starting to receive the second data through the second radio channel, receiving a first PDCP PDU including an IR packet, where the first PDCP PDU is used to carry the second data.

Optionally, the processor 371 executes the program to further implement the following steps:
in case that the second radio channel and the first radio channel belong to different cells, receiving the second data of the first service transmitted by the network node to the UE through the second radio channel, in a way including:
receiving a second PDCP PDU configured to carry the second data;
where a packet header of the second PDCP PDU includes information for indicating encryption with a new key; or, the second PDCP PDU is packaged using a logical channel identifier corresponding to the second radio channel;
or,
when the second radio channel and the first radio channel belong to different cells, before receiving the second data of the first service transmitted by the network node to the UE through the second radio channel, receiving an end packet transmitted by the network node, where the end packet is used to indicate that data of the first PDU session or data of at least one QoS flow of the first PDU session has been switched from the first radio channel to the second radio channel and is carried by the second radio channel.

Figure 38:
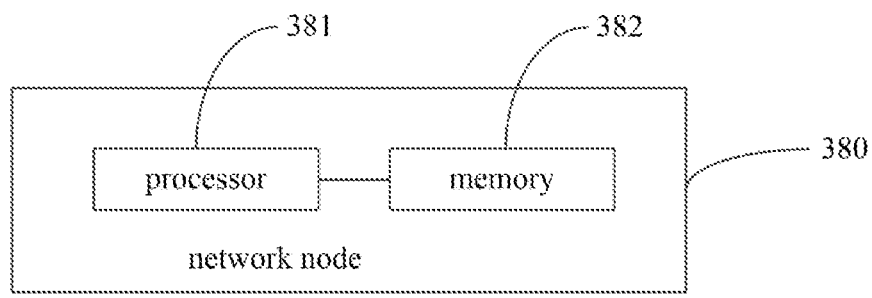
FIG. 38 is a schematic diagram of a network node according to an embodiment of the present disclosure.

Referring to FIG. 38, FIG. 38 is a schematic diagram of a network node according to an embodiment of the present disclosure. The network node 380 includes a processor 381, a memory 382, and a program stored on the memory 382 and executable on the processor 381. The processor 381 executes the program to implement the following steps:
transmitting first data to a UE through a first radio channel;
where the first radio channel is configured for a first PDU session; or, the first radio channel is configured for at least one QoS flow of the first PDU session.

The first radio channel is one of a unicast radio channel, a broadcast or multicast radio channel.

The first data represents first data of the first PDU session or first data of at least one QoS flow of the first PDU session.

Optionally, the processor 381 executes the program to further implement the following steps:
transmitting the first data to the UE through the first radio channel, in a way including:
configuring at least one of a first SDAP configuration, a first PDCP configuration, a first RLC configuration, a first MAC configuration or a first physical configuration corresponding to the first radio channel.

Optionally, bandwidth parts (BWPs) corresponding to the broadcast or multicast radio channel include a first BWP and/or a second BWP.

The first BWP is a dedicated BWP, and the second BWP is an initial BWP; or, both the first BWP and the second BWP are initial BWPs.

Configurations of the initial BWP may be: an initial downlink BWP broadcast in SIB1, and/or, an initial downlink BWP in a serving cell configuration, and/or, an initial BWP corresponding to control resource set (coreset) 0.

Optionally, the processor 381 executes the program to further implement at least one of the following steps:
activating the first radio channel through an RRC message, MAC CE and/or physical control signaling;
deactivating the first radio channel through an RRC message, MAC CE and/or physical control signaling;
configuring the first radio channel through an RRC message; or,
deleting the first radio channel through an RRC message.

Optionally, the processor 381 executes the program to further implement at least one of the following steps:
before transmitting the first data of the first service to the UE through the first radio channel, obtaining relevant information of the second radio channel;
where the second radio channel and the first radio channel are corresponding to the same PDU session configuration or at least one QoS flow of the same PDU session, and the second radio channel is on another network radio node.

Optionally, the processor 381 executes the program to further implement the following steps:
obtaining relevant information of the second radio channel, in a way including: obtaining data packet transmission status information of the second radio channel.

Optionally, the processor 381 executes the program to further implement the following steps:
transmitting the first data of the first service to the UE through the first radio channel, in a way including: transmitting a first PDCP PDU, where the first PDCP PDU is used to carry the first data; where a packet header of the first PDCP PDU includes information for indicating encryption with a new key; or, the first PDCP PDU is packaged using a logical channel identifier corresponding to the first radio channel;
or,
before transmitting the first data of the first service to the UE through the first radio channel, transmitting an end packet to the UE, where the end packet is used to indicate that data of the first PDU session or data of at least one QoS flow of the first PDU session has been switched from the first radio channel to the second radio channel and is carried by the second radio channel.

Optionally, the processor 381 executes the program to further implement the following steps:
configuring, at the network node, synchronization function entity.

The synchronization function entity is configured for:
transmitting and/or interacting, through signaling, time information associated with data packet transmission; and/or,
adding time information associated with data packet transmission into a data packet;
where the time information may be absolute and/or relative time information; or information of a system frame number (SFN), a subframe, a slot, a mini-slot and/or a time symbol.

Optionally, a synchronization protocol instance of the synchronization function entity is associated with a broadcast or multicast PDU session.

Optionally, the synchronization function entity is used to synchronize data packet transmission between the core network and/or application layer and network nodes, and/or network nodes.

The synchronization function entity is an independent protocol layer, or the synchronization function entity is located in at least one of protocol layers of SDAP, PDCP, RLC and MAC.

Optionally, the time information is time information transmitted from the application layer or the core network, or is time information which is generated by the network node and used to synchronize transmission between base stations.

Optionally, in case that the synchronization function entity is used to add the time information associated with data packet transmission into the data packet, the time information and data are transmitted together in one data packet; and/or, the time information is transmitted separately in a data packet.

Optionally, the time information is transmitted by a centralized unit (CU) to a distributed unit (DU); and/or,
the time information is information converted by the CU into SFN, subframe, slot, mini-slot and/or time symbol for scheduling.

Optionally, the synchronization function entity is configured to, after receiving user data frame, parse out the time information associated with data packet transmission added in the data packet, and/or, parse out the time information associated with data packet transmission transmitted and/or interacted in the signaling; and use the time information to schedule user data or perform scheduling in MTCH scheduling cycle.

Optionally, the network node includes a base station of a first cell and a base station of a second cell. The first cell is a cell to which the first radio channel belongs, and the second cell is a cell to which the second radio channel belongs. The processor 381 executes the program to further implement at least one of the following steps:
the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;
the base station of the second cell informs, the base station of the first cell, of sequence indexes of the next one or more packets to be transmitted and/or sequence indexes of packets still stored in an cache;
the base station of the second cell informs, the base station of the first cell, of sequence indexes of the next one or more packets to be transmitted and/or sequence indexes of packets still stored in an cache, together with carrying time information corresponding to transmission of the packets;
according to the received information, the base station of the first cell forwards packets which are out of sync between the first cell and the second cell;
according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

Figure 39:
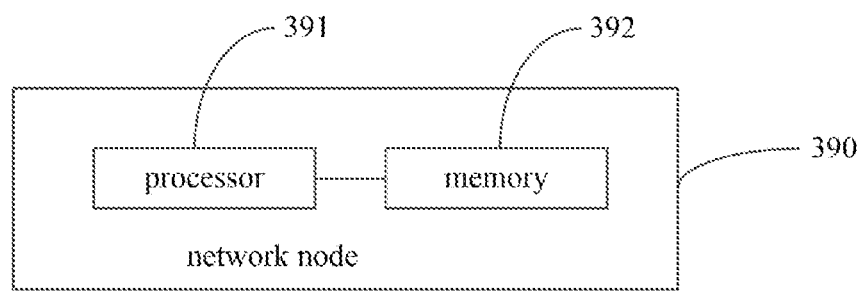
FIG. 39 is a schematic diagram of a network node according to an embodiment of the present disclosure.

Referring to FIG. 39, FIG. 39 is a schematic diagram of a network node according to an embodiment of the present disclosure. The network node 390 includes a processor 391, a memory 392, and a program stored on the memory 392 and executable on the processor 391. The processor 391 executes the program to implement the following steps:

establishing two or more protocol data unit (PDU) sessions for a second service;

where a first PDU session is used to transmit third data of the second service to a UE;

a second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or,
the fourth data and the third data have no intersection, or, the fourth data is partially the same as the third data.

Optionally, the network node includes a core network; the processor 391 executes the program to implement the following steps:

transmitting the third data of the second service to the UE through the first PDU session and transmitting the fourth data of the second service to the UE through the second PDU session, in a way including:

determining, by the core network, a UE in a broadcast or multicast group, which uses a multicast PDU session established for broadcast or multicast services to receive data, and a UE which uses a unicast PDU session established for broadcast or multicast services to receive data; and/or, determining, by the core network, in a broadcast or multicast service, data received by using the broadcast or multicast PDU session of the broadcast or multicast service, data received by using the unicast PDU session; and/or, determining, by the core network, some or all UEs in a broadcast or multicast group, which can not only use a broadcast or multicast PDU session established for broadcast or multicast services to receive data, but also use a unicast PDU session established for broadcast or multicast services to receive data.

Optionally, the network node includes a core network; the processor 391 executes the program to implement the following steps:

transmitting the third data of the second service to the UE through the first PDU session and transmitting the fourth data of the second service to the UE through the second PDU session, in a way including:

informing, by the core network, the UE of relationship between the first PDU session and the second PDU session;

informing, by the core network, the UE and the base station respectively of relationship between the first PDU session and the second PDU session, when the core network configures a broadcast or multicast PDU session and a unicast PDU session of the same broadcast or multicast service for the UE to receive data; or, informing, by the core network, a base station of relationship between the first PDU session and the second PDU session; and then, informing, by the base station, the UE of the relationship between the first PDU session and the second PDU session; or, informing, by the core network, a base station of relationship between the first PDU session and the second PDU session; or, informing, by the core network, the UE of relationship between the first PDU session and the second PDU session.

Optionally, the network node includes a core network; the processor 391 executes the program to implement the following steps:

transmitting the third data of the second service to the UE through the first PDU session and transmitting the fourth data of the second service to the UE through the second PDU session, in a way including:

informing, by the core network, the UE of a reception mode of the first PDU session and the second PDU session;

determining, by the core network, some or all UEs in a broadcast or multicast group, which can not only use a broadcast or multicast PDU session established for a broadcast or multicast service to receive data, but also use a unicast PDU session established for the broadcast or multicast service to receive data;

where the data received by the UE from the broadcast or multicast PDU session established for the broadcast or multicast service and the data received by the UE from the unicast PDU session established for the broadcast or multicast service may be simultaneous or time-sharing.

Optionally, the network node includes a core network; the processor 391 executes the program to implement the following steps:

transmitting the third data of the second service to the UE through the first PDU session and transmitting the fourth data of the second service to the UE through the second PDU session, in a way including:

according to quality requirements of a service, and/or arrival characteristics of the service, and/or new radio channel, selecting for the UE, by the core network, a PDU session type and/or specific time for receiving the broadcast or multicast service.

The core network can obtain specific information from the UE, the base station and/or the network management side. The specific information includes at least one of the following: channel quality of air interface, hybrid automatic repeat request (HARQ) feedback for UE, automatic repeat request (ARQ) feedback for UE, timeout of PDCP discard timer of UE, or status of UE receiving data packets. The specific time is in the time form of bitmap format or absolute/relative time information.

Optionally, the network node includes a core network; the processor 391 executes the program to implement the following steps:

transmitting the third data of the second service to the UE through the first PDU session and transmitting the fourth data of the second service to the UE through the second PDU session, in a way including:

informing, by the core network, a base station of a PDU session type selected for the UE to receive broadcast or multicast services; then, informing, by the base station, the UE of the PDU session type which is selected by the network node for the UE to receive broadcast or multicast service; or, informing, by the core network, a base station of specific time and a PDU session type selected for the UE to receive broadcast or multicast services; then, informing, by the base station, the UE of the specific time and the PDU session type which is selected by the network node for the UE to receive broadcast or multicast service; or, informing, by the core network, a base station of a PDU session type selected for the UE to receive broadcast or multicast services; or, informing, by the core network, the UE of a PDU session type selected for the UE to receive broadcast or multicast services; or, informing, by the core network, a base station of specific time and a PDU session type selected for the UE to receive broadcast or multicast services; or, informing, by the core network, the UE of specific time and a PDU session type selected for the UE to receive broadcast or multicast services.

Optionally, the network node includes a core network; the processor 391 executes the program to implement the following steps:

transmitting the third data of the second service to the UE through the first PDU session and transmitting the fourth data of the second service to the UE through the second PDU session, in a way including:

establishing, by the network node, a broadcast or multicast PDU session and a unicast PDU session for the same broadcast or multicast service, for a UE to receive data; and using signaling or a special data packet to activate a to-be-used broadcast or multicast PDU session and/or unicast PDU session established for the same broadcast or multicast service;

and/or, using, by the network node, signaling or a special data packet to deactivate the broadcast or multicast PDU session and/or unicast PDU session established for the same broadcast or multicast service;

where the network node may be a node on core network side and/or radio access network side.

Optionally, the processor 391 executes the program to implement the following steps:

transmitting the third data of the second service to the UE through the first PDU session and transmitting the fourth data of the second service to the UE through the second PDU session, in a way including:

transmitting the broadcast or multicast PDU session established for the broadcast or multicast service at the network node on the radio access network side, to the UE by using a point-to-point (PTP) and/or point-to-multipoint (PTM) transmission mode; or, receiving a PDU session type reported by the UE, where the PDU session type is determined by the UE itself for receiving the multicast service according to quality requirements of a service, and/or arrival characteristics of the service, and/or new radio channel.

Figure 40:
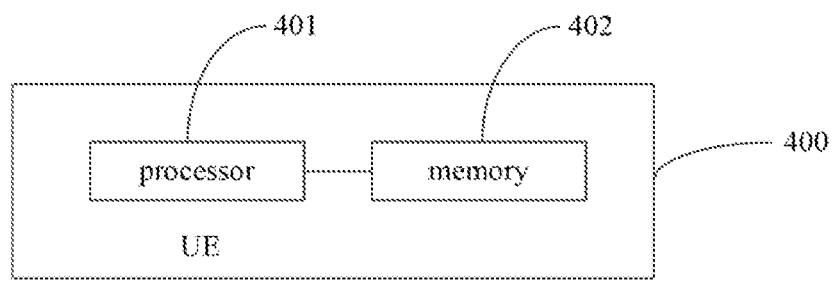
FIG. 40 is a schematic diagram of a terminal according to an embodiment of the present disclosure.

Referring to FIG. 40, FIG. 40 is a schematic diagram of a UE according to an embodiment of the present disclosure. The UE 400 includes a processor 401, a memory 402, and a program stored in the memory 402 and executable on the processor 401. The processor 401 executes the program to implement the following steps:

receiving second configuration information transmitted by a network node;

establishing two or more PDU sessions for the second service according to the second configuration information.

The first PDU session is used to transmit third data of the second service to the UE.

The second PDU session is used to transmit fourth data of the second service to the UE.

The second service is a broadcast or multicast service.

The first PDU session is one of a unicast PDU session and a broadcast or multicast PDU session; and the second PDU session is the other one of the unicast PDU session and the broadcast or multicast PDU session.

The unicast PDU session is separately established for all or part of UE which receive the second service.

Optionally, the fourth data is the same as the third data, or the fourth data is a subset of the third data, or, the fourth data and the third data have no intersection, or, the fourth data is partially the same as the third data.

Figure 41:
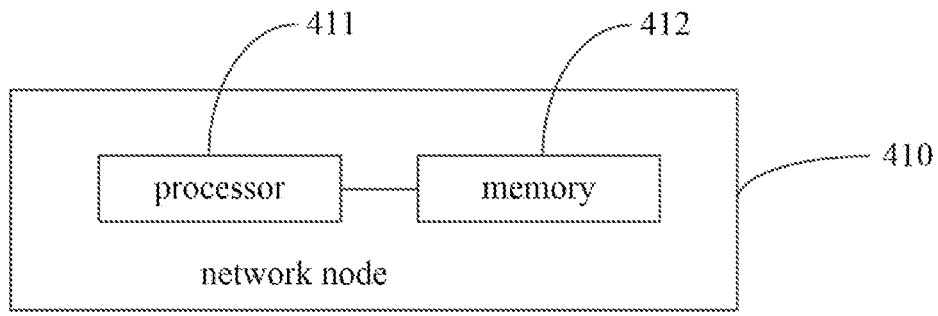
FIG. 41 is a schematic diagram of a network node according to an embodiment of the present disclosure.

Referring to FIG. 41, FIG. 41 is a schematic diagram of a network node according to an embodiment of the present disclosure. The network node 410 includes a processor 411, a memory 412, and a program stored in the memory 412 and executable on the processor 411. The processor 411 executes the program to implement the following steps:

transmitting PDSCH to a UE; where the PDSCH includes a first transport block and a second transport block, the first transport block is used to transmit data of a unicast service, and the second transport block is used to transmit data of a broadcast or multicast service data.

Optionally, the processor 411 executes the program to further implement the following steps: before transmitting the PDSCH to the UE, transmitting first information to the UE, where the first information is used to determine a first HARQ feedback resource and a second HARQ feedback resource;

and/or, transmitting second information to the UE, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 42:
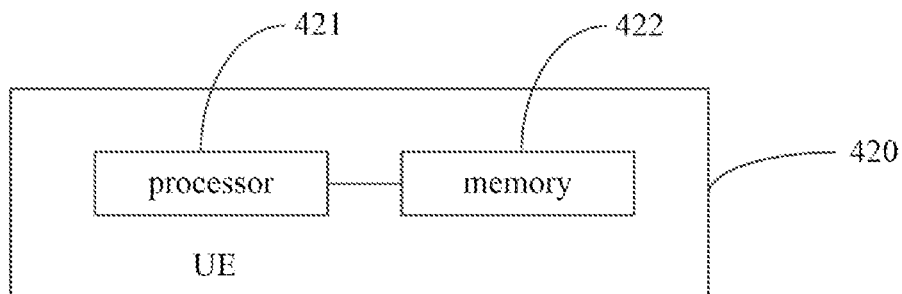
FIG. 42 is a schematic diagram of a terminal according to an embodiment of the present disclosure.

Referring to FIG. 42, FIG. 42 is a schematic diagram of a UE according to an embodiment of the present disclosure. The UE 420 includes a processor 421, a memory 422, and a program stored in the memory 422 and executable on the processor 421. The processor 421 executes the program to implement the following steps:

receiving PDSCH transmitted by a network node, where the PDSCH includes a first transport block and a second transport block, the first transport block is used to transmit data of a unicast service, and the second transport block is used to transmit data of a broadcast or multicast service.

Optionally, the processor 421 executes the program to further implement the following steps: before receiving the PDSCH transmitted by the network node, receiving first information transmitted by the network node, where the first information is used to determine a first HARQ feedback resource and a second HARQ feedback resource; and/or, receiving second information transmitted by the network node, where the second information is used to determine a first slot interval and a second slot interval;

where the first slot interval is a time domain interval between the first HARQ feedback resource and the PDSCH, and the second slot interval is a time domain interval between the second HARQ feedback resource and the PDSCH.

The first HARQ feedback resource is used to transmit HARQ feedback information for the first transport block, and the second HARQ feedback resource is used to transmit HARQ feedback information for the second transport block.

Optionally, the first information includes information of the first PUCCH set and information of the second PUCCH set; or, the first information includes information of the first PUCCH set and offset information between the first PUCCH set and the second PUCCH set;

where the first HARQ feedback resource is a resource in the first PUCCH set, and the second HARQ feedback resource is a resource in the second PUCCH set.

Optionally, the information of the first PUCCH set and/or the information of the second PUCCH set are pre-specified identification information of the PUCCH set.

Figure 43:
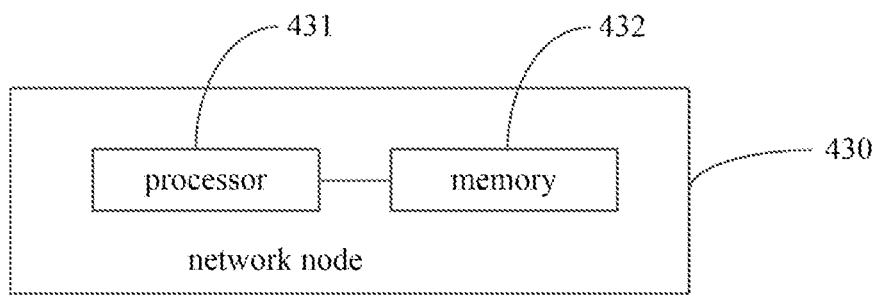
FIG. 43 is a schematic diagram of a network node according to an embodiment of the present disclosure.

Referring to FIG. 43, FIG. 43 is a schematic diagram of a network node according to an embodiment of the present disclosure. The network node 430 includes a processor 431, a memory 432, and a program stored in the memory 432 and executable on the processor 431. The processor 431 executes the program to implement the following steps:

transmitting data of a unicast service to a UE through a first BWP, and transmitting data of a broadcast or multicast service to the UE through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the processor 431 executes the program to further implement the following steps:

before transmitting data of a unicast service to a UE through a first BWP, and transmitting data of a broadcast or multicast service to the UE through a second BWP, in case that the second BWP is a BWP that has an association relationship with the initial BWP, transmitting a system message including third information;

where the third information is used to indicate the association relationship between the second BWP and the initial BWP.

Figure 44:
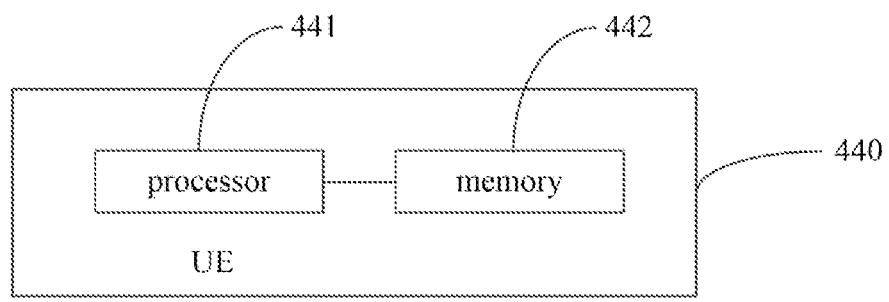
FIG. 44 is a schematic diagram of a terminal according to an embodiment of the present disclosure.

Referring to FIG. 44, FIG. 44 is a schematic diagram of a UE according to an embodiment of the present disclosure. The UE 440 includes a processor 441, a memory 442, and a program stored in the memory 442 and executable on the processor 441. The processor 441 executes the program to implement the following steps:

receiving data of a unicast service transmitted by a network node through a first BWP, and data of a broadcast or multicast service transmitted through a second BWP.

Optionally, the first BWP is one or more dedicated activation BWPs.

The second BWP is an initial BWP, or the second BWP is a BWP that is associated with an initial BWP.

Configurations of the initial BWP may be: an initial downlink BWP broadcast in SIB1, and/or, an initial downlink BWP in a serving cell configuration, and/or, an initial BWP corresponding to coreset 0.

Optionally, the processor 441 executes the program to further implement the following steps: before receiving data of a unicast service transmitted by a network node through a first BWP, and data of a broadcast or multicast service transmitted through a second BWP, receiving a system message including third information;

where the third information is used to indicate an association relationship between the second BWP and the initial BWP.

One embodiment of the present disclosure provides a readable storage medium including a program stored thereon. The program is executed by a processor to implement the steps in any of the foregoing data transmission methods, which can refer to the description of the method steps in the above corresponding embodiments.

The base station in the embodiment of the present disclosure may be a base transceiver station (BTS) in global system of mobile communication (GSM) or code division multiple access (CDMA), or a NodeB (NB) in wideband code division multiple access (WCDMA), or an evolutional Node B (eNB or eNodeB) in LTE, or a relay station or an access point, or a base station in the future 5G network, etc., which is not limited here.

The UE in the embodiment of the present disclosure may be a wireless terminal or a wired terminal, and the wireless terminal may be a device that provides voice and/or other service data connectivity to a user, a handheld device with a wireless connection function, or other processing devices connected to a wireless modem. The wireless terminal may communicate with one or more core networks via a radio access network (RAN), and the wireless terminal may be a mobile terminal, such as a mobile phone (or "cellular" phone) and a computer with a mobile terminal, for example, a portable, pocket-sized, hand-held, computer-built-in or vehicle-mounted mobile device that exchanges language and/or data with the radio access network, such as a personal communication service (PCS) phone, a cordless phone, a session initiation protocol (SIP) phone, a wireless local loop (WLL) station, a personal digital assistant (PDS) and other devices. The wireless terminal may also be referred to as a system, a subscriber unit, a subscriber station, a mobile station, a mobile, a remote station, a remote terminal, an access terminal, a user terminal, a user agent, and a user device or user equipment (UE), which are not limited here.

The foregoing readable storage medium includes a computer-readable storage medium. The computer-readable storage media includes persistent and non-permanent, movable and non-removable media, which can store information by mean of any method or technology. The information may be computer readable instructions, data structures, modules of programs, or other data. Examples of the storage media include, but are not limited to, a phase-change memory (PRAM), a static random access memory (SRAM), a dynamic random access memory (DRAM), other types of random access memory (RAM), a read only memory (ROM), an electrically erasable programmable read only memory (EEPROM), a flash memory or other memory technology, a compact disk read only memory (CD-ROM), digital versatile disc (DVD) or other optical storage, magnetic cartridge, magnetic tape, magnetic tape storage or other magnetic storage device or any other non-transmission medium that can be used to store information which can be accessed by a computing device.

The above are optional embodiments of the present disclosure. It is to be pointed out that for those skilled in the art, without departing from the principles of the present disclosure, several improvements and modifications can be made and these improvements and modifications should also be considered as falling within the protection scope of the present disclosure.

What is claimed is:

1. A data transmission method, performed by a network node, comprising:
configuring a first radio channel and a second radio channel for a first PDU session, or configuring a first radio channel and a second radio channel for at least one same QoS flow of a first PDU session;
wherein the first radio channel is configured to transmit first data to a UE;
the second radio channel is configured to transmit second data to the UE;
the first radio channel is one of a unicast radio channel, a broadcast or multicast radio channel, and the second radio channel is the other one of the unicast radio channel and the broadcast or multicast radio channel;
the first data represents first data of the first PDU session or first data of at least one Qos flow of the first PDU session;
the second data represents second data of the first PDU session or second data of at least one QoS flow of the first PDU session, wherein the method further includes:
transmitting indication information to the UE, wherein the indication information is used to instruct the UE to report concurrent demand information, and the concurrent demand information includes first concurrent demand information for unicast service and broadcast or multicast service and/or second concurrent demand information for multiple broadcast or multicast services;
receiving the concurrent demand information transmitted by the UE according to the indication information; and
allocating resources to the UE according to the concurrent demand information.

2. The method according to claim 1, wherein the configuring a first radio channel and/or a second radio channel for a first PDU session, or configuring a first radio channel and/or a second radio channel for at least one same QoS flow of a first PDU session, includes:
configuring at least one of a first SDAP configuration, a first PDCP configuration, a first RLC configuration, a first MAC configuration or a first physical configuration corresponding to the first radio channel; configuring at least one of a second SDAP configuration, a second PDCP configuration, a second RLC configuration, a second MAC configuration or a second physical configuration corresponding to the second radio channel;
wherein at least the first physical configuration is different from the second physical configuration;
the first radio channel and the second radio channel share one radio bearer or two independent radio bearers.

3. The method according to claim 2, wherein the configuring at least one of a first SDAP configuration, a first PDCP configuration, a first RLC configuration, a first MAC configuration or a first physical configuration corresponding to the first radio channel;
configuring at least one of a second SDAP configuration, a second PDCP configuration, a second RLC configuration, a second MAC configuration or a second physical configuration corresponding to the second radio channel, includes:
configuring the first SDAP configuration, the first PDCP configuration, the first RLC configuration, the first MAC configuration and the first physical configuration corresponding to the first radio channel, and configuring the second PDCP configuration, the second RLC configuration, the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second PDCP configuration, the second RLC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second RLC configuration, the second MAC configuration and the second physical configuration corresponding to the second radio channel; or,
configuring the first SDAP configuration, the first PDCP configuration, the first RLC configuration, the first MAC configuration and the first physical configuration corresponding to the first radio channel, and configuring the second RLC configuration and the second physical configuration corresponding to the second radio channel; or, configuring the first SDAP configuration, the first PDCP configuration, the first RLC configuration, the first MAC configuration and the first physical configuration corresponding to the first radio channel, and configuring the second MAC configuration and the second physical configuration corresponding to the second radio channel; or, configuring the first SDAP configuration, the first PDCP configuration, the first RLC configuration, the first MAC configuration and the first physical configuration corresponding to the first radio channel, and configuring the second physical configuration corresponding to the second radio channel.

4. The method according to claim 1, wherein before transmitting the second data to the UE through the second radio channel, the method further includes:

obtaining a PDCP transmission status report of the first radio channel.

5. The method according to claim 1, wherein the network node includes a base station of a first cell and a base station of a second cell; the first cell is a cell to which the first radio channel belongs, and the second cell is a cell to which the second radio channel belongs; the method further includes at least one of the following:

the base station of the first cell informs, the base station of the second cell, of sequence indexes of packets that have been transmitted, and/or sequence indexes of packets successfully received by the UE, and then the base station of the second cell uses a unicast connection to transmit to the UE, packets which are out of sync between the first cell and the second cell;

the base station of the second cell informs, the base station of the first cell, of sequence indexes of the next one or more packets to be transmitted and/or sequence indexes of packets still stored in an cache;

the base station of the second cell informs, the base station of the first cell, of sequence indexes of the next one or more packets to be transmitted and/or sequence indexes of packets still stored in an cache, together with carrying time information corresponding to transmission of the packets;

according to the received information, the base station of the first cell forwards packets which are out of sync between the first cell and the second cell;

according to the received information, the base station of the first cell forwards packets which are out of sync between the first cell and the second cell and which are not stored in a cache of the second cell;

the UE informs, the base station of the second cell, of sequence indexes of data packets successfully received in the first cell, and then the base station of the second cell uses a unicast connection to transmit to the UE, packets which are out of sync between the first cell and the second cell;

the UE maintains connection with the first cell and the second cell at the same time, and does not interrupt the connection with the first cell until the UE has received, from the first cell, packets which are out of sync between the first cell and the second cell;

the base station of the second cell informs, the base station of the first cell, of sequence indexes of the next one or more packets to be transmitted and/or sequence indexes of packets still stored in an cache, optionally together with carrying time information corresponding to transmission of the packets; the first cell informs the UE in handover information; the UE maintains connection with the first cell and the second cell at the same time, and does not interrupt the connection with the first cell until the UE has received, from the first cell, packets which are out of sync between the first cell and the second cell;

after the UE switches to the second cell, the UE continues to maintain the connection with the first cell and does not interrupt the connection with the first cell until the UE finds that packets received in the second cell are continuous or repeated with packets received from the first cell.

6. The method according to claim 1, wherein the method further includes:

transmitting another indication information to the UE, wherein the other indication information is used to indicate the broadcast or multicast service which is being transmitted by the network node;

receiving the concurrent demand information transmitted by the UE according to the other indication information or according to the indication information and the other indication information; and allocating resources to the UE according to the concurrent demand information.

7. The method according to claim 6, wherein the concurrent demand information includes at least one of the following: demand information of a unicast service being transmitted, demand information of a broadcast or multicast service being transmitted, demand information of a unicast service to be transmitted in the future, or demand information of a broadcast or multicast service to be transmitted in the future.

8. The method according to claim 1, wherein before transmitting the second data to the UE through the second radio channel, the method further includes at least one of the following:

determining whether there is a condition or factor for switching between the first radio channel and the second radio channel, wherein the condition or factor includes at least one of the following:

the number of participating UEs, quality of service (QOS) information, quality of experience (QoE), channel quality information, a status of UE receiving data packets, or transmission mode information selected by UE, a big data analysis node, a core network, an artificial intelligence analysis node and/or a network management node;

in case that most of participating UEs of a multicast or broadcast are concentrated in a first beam and a second beam, if one or more UEs are unable to receive information on the first beam and the second beam, a unicast radio channel is used for these UEs which are unable to receive information on the first beam and the second beam;

the number of data packets that the UE fails to receive is greater than or equal to a certain threshold or the number of data packets that the UE successfully receives is less than or equal to the certain threshold, multicast transmission is switched to unicast transmission; or, if the number of data packets that the UE fails to receive is less than or equal to a certain threshold or the number of data packets that the UE successfully receives is greater than or equal to the certain threshold, unicast transmission is switched to multicast transmission.

9. A data transmission method, performed by a UE, comprising:
- receiving first configuration information transmitted by a network node; and
- according to the first configuration information, establishing and/or configuring a first radio channel and a second radio channel for a first PDU session, or, establishing and/or configuring a first radio channel and a second radio channel for at least one QoS flow of the first PDU session;
- wherein the first radio channel is configured to receive first data transmitted by the network node through the first radio channel;
- the second radio channel is configured to receive second data transmitted by the network node through the second radio channel;
- the first radio channel is one of a unicast radio channel, a broadcast or multicast radio channel, and the second radio channel is the other one of the unicast radio channel and the broadcast or multicast radio channel;
- the first data represents first data of the first PDU session or first data of at least one Qos flow of the first PDU session;
- the second data represents second data of the first PDU session or second data of at least one QoS flow of the first PDU session,
- wherein the method further includes:
- receiving indication information from the network node, wherein the indication information is used to instruct the UE to report concurrent demand information, and the concurrent demand information includes first concurrent demand information for unicast service and broadcast or multicast service and/or second concurrent demand information for multiple broadcast or multicast services;
- transmitting the concurrent demand information to the network node according to the indication information, such that the network node is enable to allocate resources to the UE according to the concurrent demand information.

10. The method according to claim 9, wherein the method further includes:
- establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel;
- wherein at least the first physical configuration is independent from the second physical configuration;
- the first radio channel and the second radio channel share one radio bearer or two independent radio bearers.

11. The method according to claim 10, wherein the establishing and/or configuring at least one of a first SDAP entity, a first PDCP configuration, a first RLC entity, a first MAC entity or a first physical layer, to be corresponding to the first radio channel; establishing and/or configuring at least one of a second SDAP entity, a second PDCP entity, a second RLC entity, a second MAC entity or a second physical layer, to be corresponding to the second radio channel, includes:
- establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration, the second MAC configuration and the second physical configuration corresponding to the second radio channel; or,
- establishing and/or configuring the first SDAP configuration, the first PDCP configuration, the first RLC configuration, the first MAC configuration and the first physical configuration corresponding to the first radio channel, and establishing and/or configuring the second PDCP configuration, the second RLC configuration and the second physical configuration corresponding to the second radio channel; or,
- establishing and/or configuring the first SDAP configuration, the first PDCP configuration, the first RLC configuration, the first MAC configuration and the first physical configuration corresponding to the first radio channel, and establishing and/or configuring the second RLC configuration, the second MAC configuration and the second physical configuration corresponding to the second radio channel; or,
- establishing and/or configuring the first SDAP configuration, the first PDCP configuration, the first RLC configuration, the first MAC configuration and the first physical configuration corresponding to the first radio channel, and establishing and/or configuring the second RLC configuration and the second physical configuration corresponding to the second radio channel; or,
- establishing and/or configuring the first SDAP configuration, the first PDCP configuration, the first RLC configuration, the first MAC configuration and the first physical configuration corresponding to the first radio channel, and establishing and/or configuring the second MAC configuration and the second physical configuration corresponding to the second radio channel; or,
- establishing and/or configuring the first SDAP configuration, the first PDCP configuration, the first RLC configuration, the first MAC configuration and the first physical configuration corresponding to the first radio channel, and establishing and/or configuring the second physical configuration corresponding to the second radio channel.

12. The method according to claim 10, wherein when the second radio channel and the first radio channel belong to the same cell, relevant parameters of the first PDCP layer and the second PDCP layer are the same; the relevant parameters include at least one of security context information, security key, integrity protection configuration information, header compression algorithm and header compression context information.

13. The method according to claim 9, wherein relevant parameters of PDCP layers corresponding to unicast radio channels of the UE are the same as those of a first UE; the relevant parameters include at least one of security context information, security key, integrity protection configuration information, header compression algorithm and header compression context information; the first UE and the UE are UEs corresponding to the broadcast or multicast radio channel.

14. The method according to claim 9, wherein bandwidth parts (BWPs) corresponding to the broadcast or multicast radio channel include a first BWP and a second BWP;
- the first BWP is a dedicated BWP, and the second BWP is an initial BWP; or, both the first BWP and the second BWP are initial BWPs;
- configurations of the initial BWP include: an initial downlink BWP broadcast in SIB1, and/or, an initial downlink BWP in a serving cell configuration, and/or, an initial BWP corresponding to control resource set (coreset) 0.

15. The method according to claim 9, wherein the method further includes at least one of the following:
    receiving an RRC message, MAC CE and/or physical control signaling, which is transmitted by the network node and is used to activate the first radio channel or the second radio channel, and activating the first radio channel or the second radio channel;
    receiving an RRC message, MAC CE and/or physical control signaling, which is transmitted by the network node and is used to activate the first radio channel and the second radio channel, and activating the first radio channel and the second radio channel;
    receiving an RRC message, MAC CE and/or physical control signaling, which is transmitted by the network node and is used to activate the first radio channel and deactivate the second radio channel, and activating the first radio channel and deactivating the second radio channel;
    receiving an RRC message which is transmitted by the network node and is used to simultaneously establish and/or configure the first radio channel and the second radio channel of the first PDU session, and simultaneously establishing and/or configuring the first radio channel and the second radio channel of the first PDU session;
    receiving an RRC message which is transmitted by the network node and is used to establish and/or configure the first radio channel or the second radio channel of the first PDU session, and establishing and/or configuring the first radio channel or the second radio channel of the first PDU session;
    receiving an RRC message which is transmitted by the network node and is used to establish and/or configure the first radio channel of the first PDU session and delete the second radio channel, and establishing and/or configuring the first radio channel of the first PDU session and deleting the second radio channel;
    receiving an RRC message which is transmitted by the network node and is used to establish and/or configure the second radio channel of the first PDU session and delete the first radio channel, and establishing and/or configuring the second radio channel of the first PDU session and deleting the first radio channel.

16. The method according to claim 9, wherein before receiving the second data transmitted by the network node through the second radio channel, the method further includes: transmitting a PDCP status report of the first radio channel.

17. The method according to claim 9, wherein the receiving the second data transmitted by the network node through the second radio channel, includes:
    within a preset time period of starting to receive the second data through the second radio channel, receiving a first PDCP PDU including an IR packet, wherein the first PDCP PDU is used to carry the second data.

18. The method according to claim 9, wherein in case that the second radio channel and the first radio channel belong to different cells, the receiving the second data transmitted by the network node to the UE through the second radio channel, includes:
    receiving a second PDCP PDU configured to carry the second data; wherein a packet header of the second PDCP PDU includes information for indicating encryption with a new key; or, the second PDCP PDU is packaged using a logical channel identifier corresponding to the second radio channel;
    or,
    in case that the second radio channel and the first radio channel belong to different cells, before receiving the second data transmitted by the network node to the UE through the second radio channel, the method further includes:
    receiving an end packet transmitted by the network node, wherein the end packet is used to indicate that data of the first PDU session or data of at least one Qos flow of the first PDU session has been switched from the first radio channel to the second radio channel and is carried by the second radio channel.

19. A UE for performing the method according to claim 9, comprising: a transceiver and a processor;
    wherein the transceiver is configured to receive first configuration information transmitted by a network node;
    the transceiver is configured to, according to the first configuration information, establish and/or configure a first radio channel and/or a second radio channel for a first PDU session, or, establish and/or configure a first radio channel and/or a second radio channel for at least one QoS flow of the first PDU session;
    the first radio channel is configured to receive first data transmitted by the network node through the first radio channel;
    the second radio channel is configured to receive second data transmitted by the network node through the second radio channel;
    the first radio channel is one of a unicast radio channel, a broadcast or multicast radio channel, and the second radio channel is the other one of the unicast radio channel and the broadcast or multicast radio channel;
    the first data represents first data of the first PDU session or first data of at least one Qos flow of the first PDU session;
    the second data represents second data of the first PDU session or second data of at least one QoS flow of the first PDU session.

20. A network node, comprising: a transceiver and a processor;
    where in the transceiver is configured to configure a first radio channel and a second radio channel for a first PDU session, or configure a first radio channel and a second radio channel for at least one same QoS flow of a first PDU session;
    the first radio channel is configured to transmit first data to a UE;
    the second radio channel is configured to transmit second data to the UE;
    the first radio channel is one of a unicast radio channel, a broadcast or multicast radio channel, and the second radio channel is the other one of the unicast radio channel and the broadcast or multicast radio channel;
    wherein the transceiver is further configured to
    transmit indication information to the UE, wherein the indication information is used to instruct the UE to report concurrent demand information, and the concurrent demand information includes first concurrent demand information for unicast service and broadcast or multicast service and/or second concurrent demand information for multiple broadcast or multicast services;

receive the concurrent demand information transmitted by the UE according to the indication information; and
allocate resources to the UE according to the concurrent demand information.

\* \* \* \* \*